US012761774B2

(12) United States Patent
Zhao et al.

(10) Patent No.: US 12,761,774 B2
(45) Date of Patent: Oct. 13, 2026

(54) NOTIFICATION MESSAGE PROCESSING METHOD AND DEVICE

(71) Applicant: HUAWEI TECHNOLOGIES CO., LTD., Shenzhen (CN)

(72) Inventors: Bin Zhao, Nanjing (CN); Zhanwei Guo, Nanjing (CN); Ankun Gao, Nanjing (CN); Qiliang Chen, Nanjing (CN); Shaohang Song, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 18/686,778

(22) PCT Filed: Aug. 19, 2022

(86) PCT No.: PCT/CN2022/113742
§ 371 (c)(1),
(2) Date: Feb. 26, 2024

(87) PCT Pub. No.: WO2023/030056
PCT Pub. Date: Mar. 9, 2023

(65) Prior Publication Data
US 2025/0130689 A1 Apr. 24, 2025

(30) Foreign Application Priority Data
Aug. 30, 2021 (CN) ......................... 202111007062.1

(51) Int. Cl.
*G06F 3/0484* (2022.01)
*G06F 3/0482* (2013.01)
(Continued)

(52) U.S. Cl.
CPC .......... *G06F 3/0482* (2013.01); *G06F 3/0484* (2013.01); *G06F 9/542* (2013.01); *G06F 9/546* (2013.01); *G06F 9/452* (2018.02)

(58) Field of Classification Search
CPC ........ G06F 9/542; G06F 9/546; G06F 3/0482; G06F 3/0484
See application file for complete search history.

(56) References Cited

U.S. PATENT DOCUMENTS

2009/0234935 A1* 9/2009 Watson ............... H04L 12/1831 709/219
2019/0138186 A1 5/2019 Rolih et al.
(Continued)

FOREIGN PATENT DOCUMENTS

CN 111400595 A 7/2020
CN 113204656 A 8/2021

*Primary Examiner* — Andrea C Leggett
(74) *Attorney, Agent, or Firm* — Leydig, Voit & Mayer, Ltd.

(57) ABSTRACT

A notification message processing method and a device are provided. The method includes: an electronic device obtains a target notification message of a target application, wherein the target notification message includes first rich media information, and the first rich media information includes one or more of voice information, video information, or an animated image; the electronic device displays a first interface, where the first interface includes notification messages of at least two applications, the at least two applications include the target application, and the notification messages of the at least two applications include the target notification message; and the electronic device plays the first rich media information in the target notification message in response to a trigger operation performed by a user on the target notification message.

20 Claims, 46 Drawing Sheets

(51) Int. Cl.
*G06F 9/54* (2006.01)
*G06F 9/451* (2018.01)

(56) References Cited

U.S. PATENT DOCUMENTS

| | | | | |
|---|---|---|---|---|
| 2020/0327996 | A1* | 10/2020 | Barkol | G16H 80/00 |
| 2021/0089178 | A1 | 3/2021 | Ge et al. | |
| 2024/0134496 | A1* | 4/2024 | Liu | G06F 3/04842 |

* cited by examiner

CONT. FROM FIG. 11(a)

TO FIG. 11(c)

CONT. FROM FIG. 11(b)

TO FIG. 11(d)

CONT.
FROM

CONT. FROM FIG. 12(a)

CONT.
FROM

CONT. FROM FIG. 12(a)

CONT. FROM FIG. 13(a)

CONT. FROM FIG. 14(a)

CONT. FROM FIG. 15(a)

CONT.
FROM

TO FIG. 18(b)

CONT. FROM FIG. 18(a)

TO FIG. 18(c)

CONT.
FROM

CONT. FROM FIG. 19(a)

CONT. FROM FIG. 20A(a)

CONT. FROM FIG. 20A(c)

CONT.
FROM

NOTIFICATION MESSAGE PROCESSING METHOD AND DEVICE

CROSS-REFERENCE TO RELATED APPLICATIONS

This application is a national stage of International Application No. PCT/CN2022/113742, filed on Aug. 19 2022, which claims priority to Chinese Patent Application No. 202111007062.1 filed on Aug. 30, 2021. Both of the aforementioned applications are hereby incorporated by reference in their entireties

TECHNICAL FIELD

Embodiments of this application relate to the field of electronic technologies, and in particular, to a notification message processing method and a device.

BACKGROUND

With development of electronic technologies, more applications (APPs) are used by users on electronic devices such as mobile phones. An APP server may push a notification message to an electronic device, and the electronic device may display the notification message to the user in a notification panel. If the user is interested in the notification message, the user may tap the notification message to start an APP and view the notification message.

For example, for a schematic diagram of the notification message, refer to FIG. 1. The notification message may usually include an application icon 11, an application name 12, a notification title 13, notification content 14, and the like. Currently, because the notification message is unattractive to the user, it is difficult to attract the user to open the notification message, and it is also difficult to attract, by pushing the notification message, the user to start the APP.

SUMMARY

Embodiments of this application provide a notification message processing method and a device, to push, to a user, rich media information such as a voice in a notification message pushed by an APP, so that a form and content of the notification message are novel and vivid, and therefore are attractive to the user. After playing the rich media information such as the voice in the notification message, the user is more likely to get interested and starts the APP. This can improve usage of the APP.

To achieve the foregoing objectives, the following technical solutions are used in embodiments of this application.

According to an aspect, an embodiment of this application provides a notification message processing method, applied to an electronic device. The method includes: The electronic device obtains a target notification message of a target application. The target notification message includes first rich media information, and the first rich media information includes one or more of voice information, video information, or an animated image. Then, the electronic device displays a first interface. The first interface includes notification messages of at least two applications, the at least two applications include the target application, and the notification messages of the at least two applications include the target notification message. The electronic device plays the first rich media information in the target notification message in response to a trigger operation performed by a user on the target notification message.

In this solution, the electronic device can push rich media information such as a voice to the user in the notification message of the target application, so that a form and content of the notification message are novel and vivid, and therefore are attractive to the user. After playing the rich media information such as the voice in the notification message, the user is more likely to get interested and starts the target application. This can improve usage of the target application.

In a possible design, on the first interface, the target notification message includes a prompt identifier. The prompt identifier is for prompting that the notification message includes rich media information.

In this way, the electronic device may intuitively remind, by using the prompt identifier, the user that the current notification message includes the rich media information.

In another possible design, that the electronic device plays the first rich media information in the target notification message in response to a trigger operation performed by a user on the target notification message includes: The electronic device plays the first rich media information in the target notification message in response to an operation of tapping the prompt identifier in the target notification message by the user.

In this way, the user may indicate, by triggering the prompt identifier, the electronic device to play the first rich media information in the notification message.

In another possible design, the target notification message includes a notification title, and that the electronic device plays the first rich media information in the target notification message in response to a trigger operation performed by a user on the target notification message includes: The electronic device plays the first rich media information in the target notification message in response to an operation of tapping the notification title in the target notification message by the user.

In this way, the user may indicate, by tapping the notification title in the notification message, the electronic device to play the first rich media information in the notification message.

In another possible design, the target notification message includes a play control, and that the electronic device plays the first rich media information in the target notification message in response to a trigger operation performed by a user on the target notification message includes: The electronic device plays the first rich media information in the target notification message in response to an operation of tapping the play control in the target notification message by the user.

In this way, the user may indicate, by tapping the play control in the notification message, the electronic device to play the first rich media information in the notification message.

In another possible design, the first rich media information in the target notification message is determined by a server of the target application based on a user feature corresponding to the electronic device, and the user feature includes user behavior information or a user profile.

In other words, the first rich media information is accurately determined based on the user feature. According to this solution, a personalized message can be pushed to the user.

In another possible design, the first rich media information in the target notification message corresponds to a target media resource, the target media resource corresponds to a plurality of pieces of rich media information, and the first rich media information is one piece of rich media information determined, based on the user feature corresponding to the electronic device, by the server from the plurality of pieces of rich media information corresponding to the target media resource.

In other words, in this solution, the first rich media information to be pushed to the user may be accurately determined, based on the user feature, from the plurality of pieces of rich media information corresponding to the target media resource, so that the personalized message is pushed to the user.

In another possible design, the target media resource is a media resource reserved by the user, the target media resource corresponds to rich media information of a plurality of associated persons, and the first rich media information is rich media information that is of a favorite associated person of the user corresponding to the electronic device and that is determined, based on the user feature corresponding to the electronic device, from the plurality of pieces of rich media information corresponding to the target media resource.

In other words, in this solution, the rich media information of the favorite associated person of the user may be accurately determined, based on the user feature, from the plurality of pieces of rich media information corresponding to the target media resource reserved by the user, so that the rich media information is pushed to the user in the notification message.

In another possible design, on the first interface, the target notification message includes first prompt information, and the first prompt information is for prompting play duration of the first rich media information included in the notification message.

That is, the electronic device may prompt the user with the play duration of the first rich media information on the interface.

In another possible design, the method further includes: The electronic device displays second prompt information after starting to play the first rich media information in the target notification message, where the second prompt information is for prompting play progress of the first rich media information.

In other words, in a process of playing the first rich media information, the electronic device may further prompt the user with the play progress in real time.

In another possible design, the target notification message further includes a switching control, and the method further includes: The electronic device plays, in response to an operation performed by the user on the switching control in the target notification message, second rich media information corresponding to the target media resource.

In other words, based on an indication operation of the user, the electronic device may switch between and play different rich media information included in the notification message.

In another possible design, the prompt identifier on the first interface is in a first state, and that the electronic device plays the first rich media information in the target notification message includes: The electronic device displays a second interface, and plays the first rich media information in the target notification message. The second interface also includes the prompt identifier, and the prompt identifier on the second interface is in a second state. The second state is different from the first state.

In this solution, a display status of the prompt identifier in the process of playing the first rich media information is different from a display status that is of the prompt identifier and that corresponds to a case in which the first rich media information is not played. The user may intuitively determine, based on the display status of the prompt identifier, whether the first rich media information is in a play state.

In another possible design, that the electronic device plays the first rich media information in the target notification message in response to a trigger operation performed by a user on the target notification message includes: The electronic device displays a third interface in response to the trigger operation performed by the user on the target notification message, where the third interface is an application interface of the target application. The electronic device plays the first rich media information in the target notification message by using the target application.

In this solution, the electronic device may play, based on the indication operation of the user, the rich media information in the notification message by using the target application for pushing the notification message.

In another possible design, the target notification message includes a notification title and prompt information of the target application, and the prompt information of the target application includes an icon and/or a name of the target application. That the electronic device displays a third interface in response to the trigger operation performed by the user on the target notification message, where the third interface is an application interface of the target application includes: The electronic device displays the third interface in response to an operation of tapping the notification title or the prompt information of the target application in the target notification message by the user, where the third interface is the application interface of the target application.

In this solution, the user may indicate, by tapping the notification title or the prompt information of the target application in the notification message, the electronic device to play the rich media information in the notification message by using the target application.

In another possible design, the target notification message includes the notification title, and that the electronic device displays a third interface in response to the trigger operation performed by the user on the target notification message, where the third interface is an application interface of the target application includes: The electronic device displays the third interface in response to an operation of touching and holding the notification title in the target notification message by the user, where the third interface is the application interface of the target application.

In this solution, the user may indicate, by touching and holding the notification title in the notification message, the electronic device to play the rich media information in the notification message by using the target application.

In another possible design, that the electronic device plays the first rich media information in the target notification message in response to a trigger operation performed by a user on the target notification message includes: The electronic device displays a play mode list in response to the trigger operation performed by the user on the target notification message, where the play mode list includes at least one application for playing the rich media information. The electronic device plays, in response to an operation of selecting an application from the play mode list by the user, the first rich media information in the target notification message by using the selected application.

In this solution, the user may select, from the play mode list, the application for playing the rich media information, and the electronic device plays the first rich media information by using the application selected by the user. In this way, a play mode of the first rich media information is flexible.

In another possible design, the first interface further includes another switching control, and the method further includes: The electronic device displays a play mode list in response to an operation performed by the user on the another switching control in the target notification message, where the play mode list includes one or more of a play mode corresponding to an operating system basic capability, the target application, and a second application. In response to an operation of selecting a target play mode from the play mode list by the user, the electronic device plays the first rich media information in the target notification message in the target play mode.

In this solution, the user may trigger the switching control, so that the electronic device displays the play mode list. Then, the user may select, from the play mode list, the application for playing the rich media information, and the electronic device plays the first rich media information by using the application selected by the user. In this way, a play mode of the first rich media information is flexible.

In another possible design, the electronic device stores a correspondence that is preset by the user and that is between an application and a rich media information type. The rich media information type includes a voice information type, a video information type, or an animated image type, and a first rich media information type is consistent with a rich media information type corresponding to the target application in the correspondence.

In this way, the user may preset the correspondence between the application and the rich media type in the notification message, and the electronic device may display, to the user based on setting of the user for the application, a notification message including the rich media information type corresponding to the application.

In another possible design, the target notification message that is of the target application and that is obtained by the electronic device includes a resource identifier of the first rich media information, and that the electronic device plays the first rich media information in the target notification message includes: The electronic device obtains data content of the first rich media information based on the resource identifier of the first rich media information in the target notification message. The electronic device plays the first rich media information based on the data content of the first rich media information.

For example, the resource identifier may be a resource link. The electronic device may download the data content of the first rich media information from a network based on the resource link, to perform playing.

In another possible design, the target notification message further includes one or more of identification information of the target application, icon information of the target application, the notification title, a type of the notification message, or a device identifier corresponding to the electronic device.

In this way, the electronic device may obtain, from the notification message, information such as the identification information of the target application, the icon information of the target application, the notification title, the type of the notification message, or the device identifier corresponding to the electronic device.

According to another aspect, an embodiment of this application provides a notification message processing method, applied to a server. The method includes: The server generates a target notification message of a target application, where the target notification message includes first rich media information, and the first rich media information includes one or more of voice information, video information, or an animated image. The server pushes the target notification message to an electronic device.

In this solution, the server can push rich media information such as a voice to the electronic device in the notification message of the target application, so that a form and content of the notification message are novel and vivid, and therefore are attractive to a user. After playing the rich media information such as the voice in the notification message, the user is more likely to get interested and starts the target application. This can improve usage of the target application.

In a possible design, the first rich media information in the target notification message corresponds to a target media resource, and the method further includes: The server determines, based on a user feature corresponding to the electronic device, the first rich media information from a plurality of pieces of rich media information corresponding to the target media resource.

In this solution, the server may accurately determine, based on the user feature and from the plurality of pieces of rich media information corresponding to the target media resource, the first rich media information to be pushed to the user, to push a personalized message to the user.

In another possible design, the target media resource is a media resource reserved by the user, and the target media resource corresponds to rich media information of a plurality of associated persons. The server determines, based on the user feature corresponding to the electronic device and from the plurality of pieces of rich media information corresponding to the target media resource, the first rich media information of a favorite associated person of the user corresponding to the electronic device (for example, corresponding to a device identifier of the electronic device).

In this solution, the server may accurately determine, based on the user feature and from the plurality of pieces of rich media information corresponding to the target media resource reserved by the user, the first rich media information that is of the favorite associated person of the user and that is to be pushed to the user, to push the personalized message to the user.

According to another aspect, an embodiment of this application provides a message processing apparatus. The apparatus is included in an electronic device, and the apparatus has a function of implementing behavior of the electronic device in any method according to the foregoing aspects and the possible designs of the foregoing aspects. The function may be implemented by hardware, or may be implemented by hardware executing corresponding software. The hardware or the software includes at least one module or unit corresponding to the function, for example, an obtaining module or unit, a display module or unit, and a playing module or unit.

According to another aspect, an embodiment of this application provides an electronic device. The electronic device may include a screen, configured to display an interface: one or more processors: a memory; and one or more computer programs. The one or more computer programs are stored in the memory, and the one or more computer programs include instructions. When the instructions are executed by the processor, the electronic device is enabled to perform the notification message processing method according to any one of the possible designs of the foregoing aspects.

According to another aspect, an embodiment of this application provides an electronic device. The electronic device may include one or more processors, a memory, and one or more computer programs. The one or more computer programs are stored in the memory, and the one or more computer programs include instructions. When the instructions are executed by the processor, the electronic device is enabled to perform the notification message processing method according to any one of the possible designs of the foregoing aspects.

According to another aspect, an embodiment of this application provides a computer-readable storage medium, including computer instructions. When the computer instructions are run on an electronic device, the electronic device is enabled to perform the notification message processing method according to any one of the possible designs of the foregoing aspects.

According to another aspect, an embodiment of this application provides a computer program product. When the computer program product runs on a computer, the computer is enabled to perform the notification message processing method performed by the electronic device according to any one of the possible designs of the foregoing aspects.

According to another aspect, an embodiment of this application provides a server. The server may include one or more processors, a memory, and one or more computer programs. The one or more computer programs are stored in the memory, and the one or more computer programs include instructions. When the instructions are executed by the processor, the server is enabled to perform the notification message processing method according to any one of the possible designs of the foregoing aspects.

According to another aspect, an embodiment of this application provides a computer-readable storage medium, including computer instructions. When the computer instructions are run on a server, the server is enabled to perform the notification message processing method according to any one of the possible designs of the foregoing aspects.

According to another aspect, an embodiment of this application provides a computer program product. When the computer program product runs on a computer, the computer is enabled to perform the notification message processing method performed by the server according to any one of the possible designs of the foregoing aspects.

For beneficial effects of other aspects in this application, refer to related descriptions of beneficial effects in the foregoing method aspects. Details are not described again.

DESCRIPTION OF EMBODIMENTS

The following describes the technical solutions in embodiments of this application with reference to the accompanying drawings in embodiments of this application. In description in embodiments of this application, "/" means "or" unless otherwise specified. For example, A/B may indicate A or B. In this specification, "and/or" describes only an association relationship for describing associated objects and indicates that three relationships may exist. For example, A and/or B may indicate the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

In embodiments of this application, the word "example". "for example", or the like is used to indicate giving an example, an illustration, or a description. Any embodiment or design scheme described as "example" or "for example" in embodiments of this application should not be explained as being more preferred or having more advantages than another embodiment or design scheme. Exactly, use of the word "example", "for example", or the like is intended to present a relative concept in a specific manner.

Figure 1:
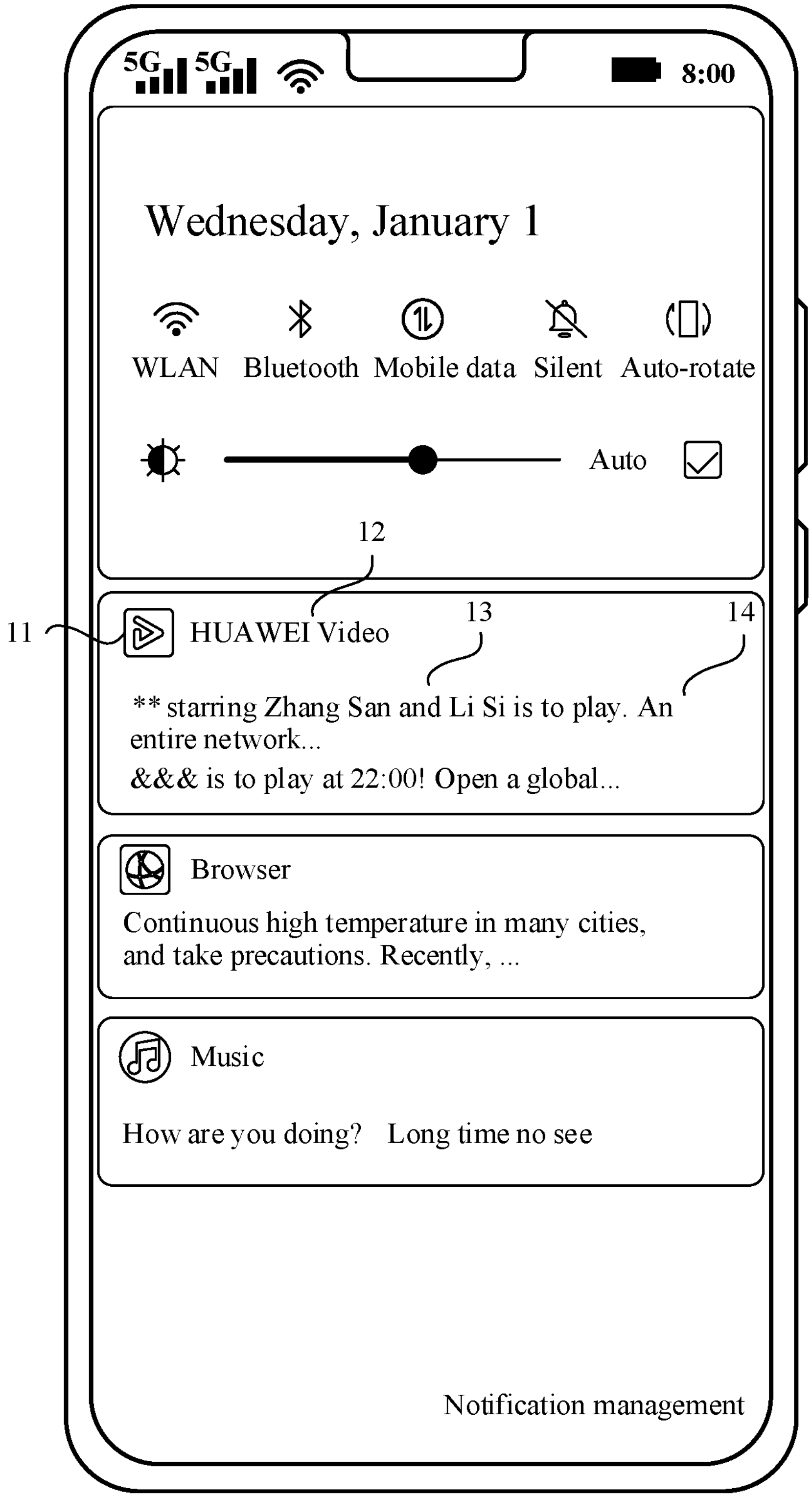
FIG. 1 is a schematic diagram of a display effect of a notification message according to the conventional technology.

Currently, in a notification message pushed by an APP server and displayed by an electronic device, as shown in FIG. 1, notification content is usually displayed in a form of text description, and is unattractive to a user. In addition, limited by a display range of a screen, text content in the notification message is usually concise and refined, has a small quantity of words, and has a small amount of information. As a result, it is difficult to arouse interest of the user. In addition, as shown in FIG. 1, a plurality of different notification messages corresponding to a same APP or different APPs all are displayed in a form of a plain text, and display effects are similar (or referred to as homogenization). As a result, it is difficult for the user to find, from the plurality of notification messages, a notification message that the user is interested in, and most users directly ignore these notification messages.

Embodiments of this application provide a notification message processing method, to push, to a user, rich media information such as a voice in a notification message (which may also be understood as a notification message pushed by an APP) pushed by an APP server, so that a form and content of the notification message are novel and vivid, and therefore are attractive to the user. After playing the rich media information such as the voice in the notification message, the user is more likely to get interested and starts an application APP (which may also be referred to as an application). In this way, usage of the APP is high. The rich media information includes information such as an animation, a sound, and a video, or any combination thereof.

Figure 2:
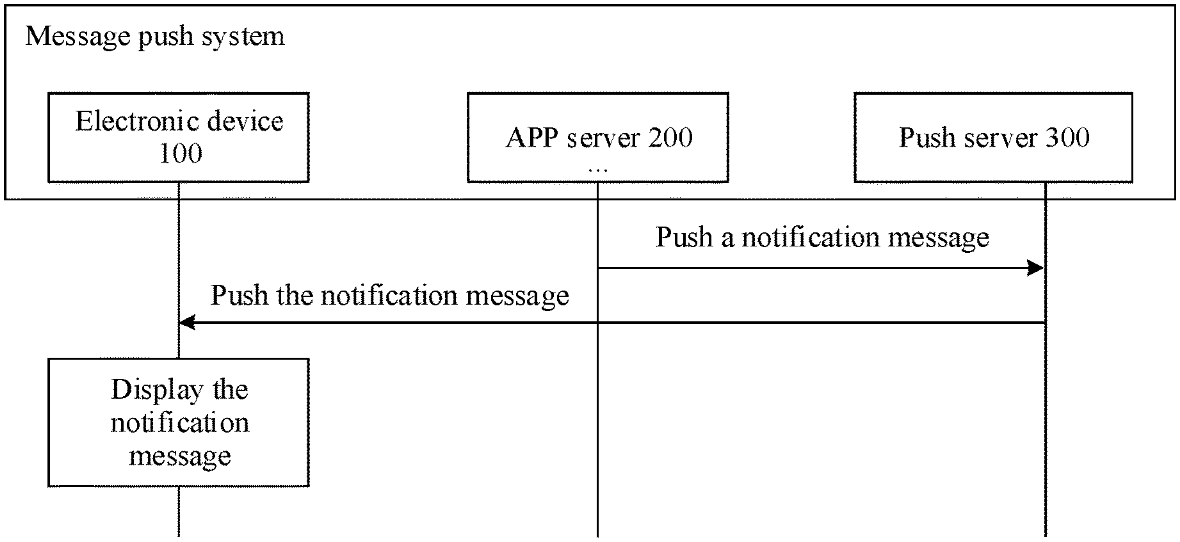
FIG. 2 is a schematic diagram of an architecture of a message push system according to an embodiment of this application.

The notification message processing method provided in embodiments of this application may be applied to a message push system. For example, as shown in FIG. 2, the message push system 10 may include an electronic device 100, at least one APP server 200, a push server 300, and the like. The electronic device may include a plurality of APPS that may provide experience of a plurality of different functions for a user. For example, the APPs included in the electronic device may be a video playing APP, an audio playing APP, a music playing APP, a news APP, a game APP, an e-book APP, a financial APP, or the like. One APP may correspond to one APP server. One APP server may correspond to one or more APPS and provide corresponding service support for a corresponding APP function. The at least one APP server in the push system 10 may include a server corresponding to the video playing APP, a server corresponding to the news APP, a server corresponding to the audio playing APP, and the like. The APP server is configured to: push a notification message of a corresponding APP, and store and process related data for a provided APP function. The push server is configured to forward, to the electronic device, the notification message pushed by the APP server, and may further have functions such as message link management and message construction.

To be specific, in the message push system, as shown in FIG. 2, the APP server may push the notification message to the push server, the push server sends the notification message to the electronic device, and the electronic device displays the notification message on a screen, to display the notification message to the user. The notification message pushed by the APP server (through forwarding of the push server) may also be understood as a notification message corresponding to an APP, a notification message from an APP, a notification message of an APP, or the like.

The notification message pushed by the APP server is automatically pushed by the APP server. However, in an advertisement, a notification message can be obtained only after being requested from the server. In addition, when the electronic device does not start an APP, a notification message of the APP may also be displayed on the screen of the electronic device. For example, when an APP 1 is not started, the electronic device displays a notification panel in response to a pull-down operation performed by the user on the top of the electronic device, and displays a notification message of the APP 1 in the notification panel. It may be understood that the electronic device may display notification messages of one or more APPs on the screen (for example, the notification panel on the screen), and there are also a plurality of notification messages for a same APP.

In addition, the user can disable the notification message of the APP in the APP through setting. In this case, the electronic device no longer displays the notification message of the APP to the user on the screen, and the electronic device may further receive the notification message pushed by the APP server, or may no longer receive the notification message pushed by the APP server. Subsequently, after the user enables the notification message of the APP in the APP through setting, the electronic device may re-display the notification message of the APP to the user on the screen.

In an embodiment of this application, there may be a plurality of policies for pushing the notification message by the APP server. For example, the APP server may periodically push the notification message. For example, the APP server may push a notification message at 8:00 AM every day, or the APP server pushes a notification message when a media resource (for example, a movie) reserved by the user is about to be available. For another example, the APP server may push the notification message in response to event triggering. For example, after the user purchases a membership or a voucher, or executes another event by using the APP, the APP may be triggered to push a notification message. For another example, the APP server may push a notification message in response to active triggering of an APP operation person. For example, for the news APP, when there is major news, the APP operation person may actively trigger the APP server to push a notification message. A specific policy for pushing the notification message by the APP server is not limited in embodiments of this application.

The electronic device in the message push system shown in FIG. 2 may be a mobile phone, a tablet computer, a wearable device, a smart home device, a vehicle-mounted device, or an augmented reality (AR)/virtual reality (VR) device, a notebook computer, an ultra-mobile personal computer (UMPC), a netbook, a personal digital assistant (PDA), or another device. A device type of the electronic device is not limited in embodiments of this application.

Figure 3:
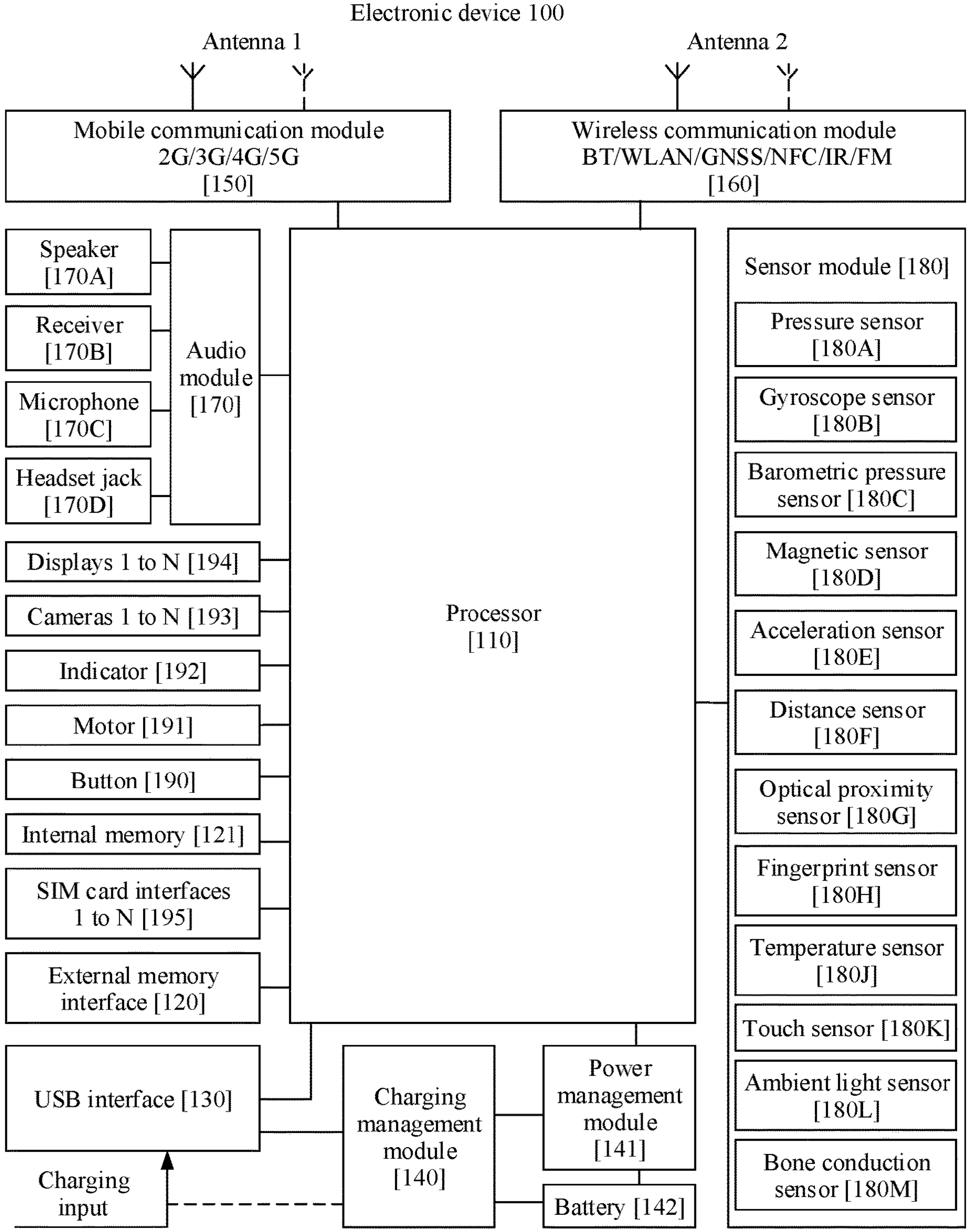
FIG. 3 is a schematic diagram of a hardware structure of an electronic device according to an embodiment of this application.

For example. FIG. 3 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, to improve system efficiency.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a solution, applied to the electronic device 100, to wireless communication including 2G/3G/4G/5G, or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules in the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in the same device as the mobile communication module 150 or another functional module.

The wireless communication module 160 may provide a solution, applied to the electronic device 100, to wireless communication including a wireless local area network (WLAN) (for example, a wireless fidelity (Wi-Fi) network). Bluetooth (BT), a global navigation satellite system (GNSS), frequency modulation (FM), a near field communication (NFC) technology: an infrared (IR) technology: or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE). BT, a GNSS, a WLAN. NFC. FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS)

In embodiments of this application, the mobile communication module 150 or the wireless communication module

160 may be configured to receive a notification message pushed by an APP server through the push server.

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (. OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1. In this embodiment of this application, the display 194 may be configured to display, in the notification panel or in another location like at the top of the display 194, the notification message pushed by the APP server. Notification content of the notification message may include rich media information such as a voice. When the notification content of the notification message includes an animated image or a video (including an animation), the display 194 may be further configured to display the animated image or video content in the notification message.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 100, and the like. In addition, the internal memory 121 may include a high-speed random access memory, and may further include a non-volatile memory, for example, at least one magnetic disk storage device, a flash memory, or a universal flash storage (UFS).

The electronic device 100 may implement an audio function, for example, music playing or recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110. In embodiments of this application, when the notification content of the notification message includes rich media information such as a voice or a video, the audio module 170 may be further configured to play the voice or video content in the notification message.

The speaker 170A, also referred to as a "loudspeaker", is configured to convert an audio electrical signal into a sound signal. The electronic device 100 may be configured to listen to music or answer a call in a hands-free mode through the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal.

The headset interface 170D is configured to connect to a wired headset, and may specifically include a plurality of different interfaces (for example, a USB interface).

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 100 at a location different from that of the display 194.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

In embodiments of this application, the mobile communication module 150 or the wireless communication module 160 may be configured to receive the notification message pushed by the APP server through the push server. The display 194 may be configured to display: in the notification panel or in another location, the notification message pushed by the APP server. The notification content of the notification message may include rich media information such as a voice. In this way, a form and content of the notification message are novel and vivid, and therefore are attractive to a user. When the notification content of the notification message includes an animated image or a video, the display 194 may be further configured to display the animated image or video content in the notification message. When the notification content of the notification message includes rich media information such as a voice or a video, the audio module 170 may be further configured to play the voice or video content in the notification message.

Figure 4:
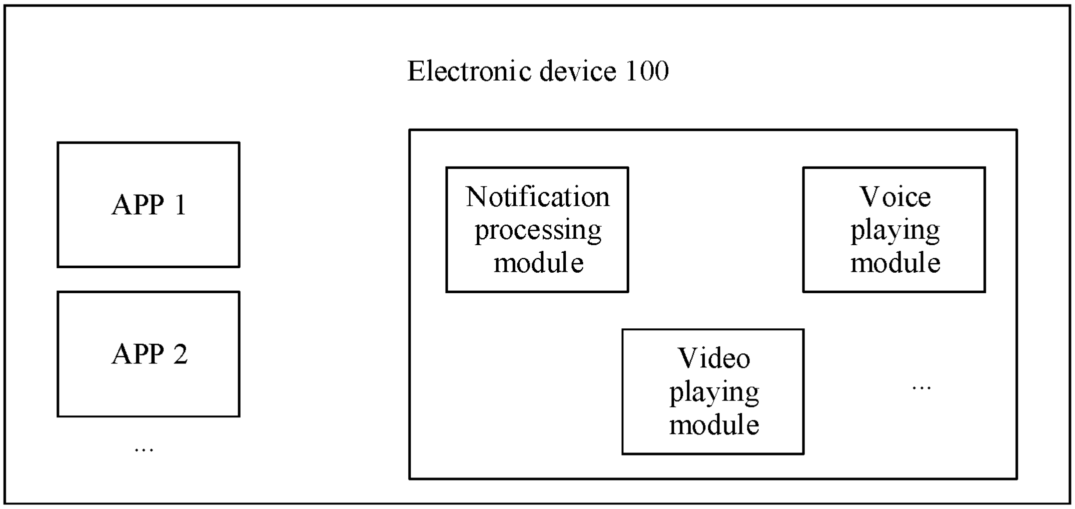
FIG. 4 is a schematic diagram of a software module of an electronic device according to an embodiment of this application.

From a perspective of a software module, as shown in FIG. 4, the electronic device may include various APPs (such as an APP 1 and an APP 2) and a plurality of modules such as an operating system basic service module. The operating system basic service module may include a notification processing module (which is also referred to as a software development kit (SDK) for notification processing, a push agent module, or the like). The notification processing module may be configured to: receive a notification message pushed by the APP server through the push server, parse the notification message, and display the notification message in the notification panel or in another location like at the top of a screen of the electronic device. The operating system basic service module may further include a voice playing module (which may also be referred to as an SDK for voice playing), a video playing module, or some other basic service modules. The voice playing module in the operating system basic service module may be configured to play voice information in the notification message by using an operating system basic capability of the electronic device, so that the user can quickly hear the voice information without starting a specific APP to perform voice playing. The video playing module in the operating system basic service module may be configured to play video information in the notification message by using the operating system basic capability of the electronic device, so that the user can quickly view the video information without starting a specific APP to perform video playing.

In this way, in the message push system, the APP server may push the notification message to the push server, the push server sends the notification message to the notification processing module in the electronic device, and the electronic device displays, to the user, the notification message obtained by the notification processing module.

Figure 5A:
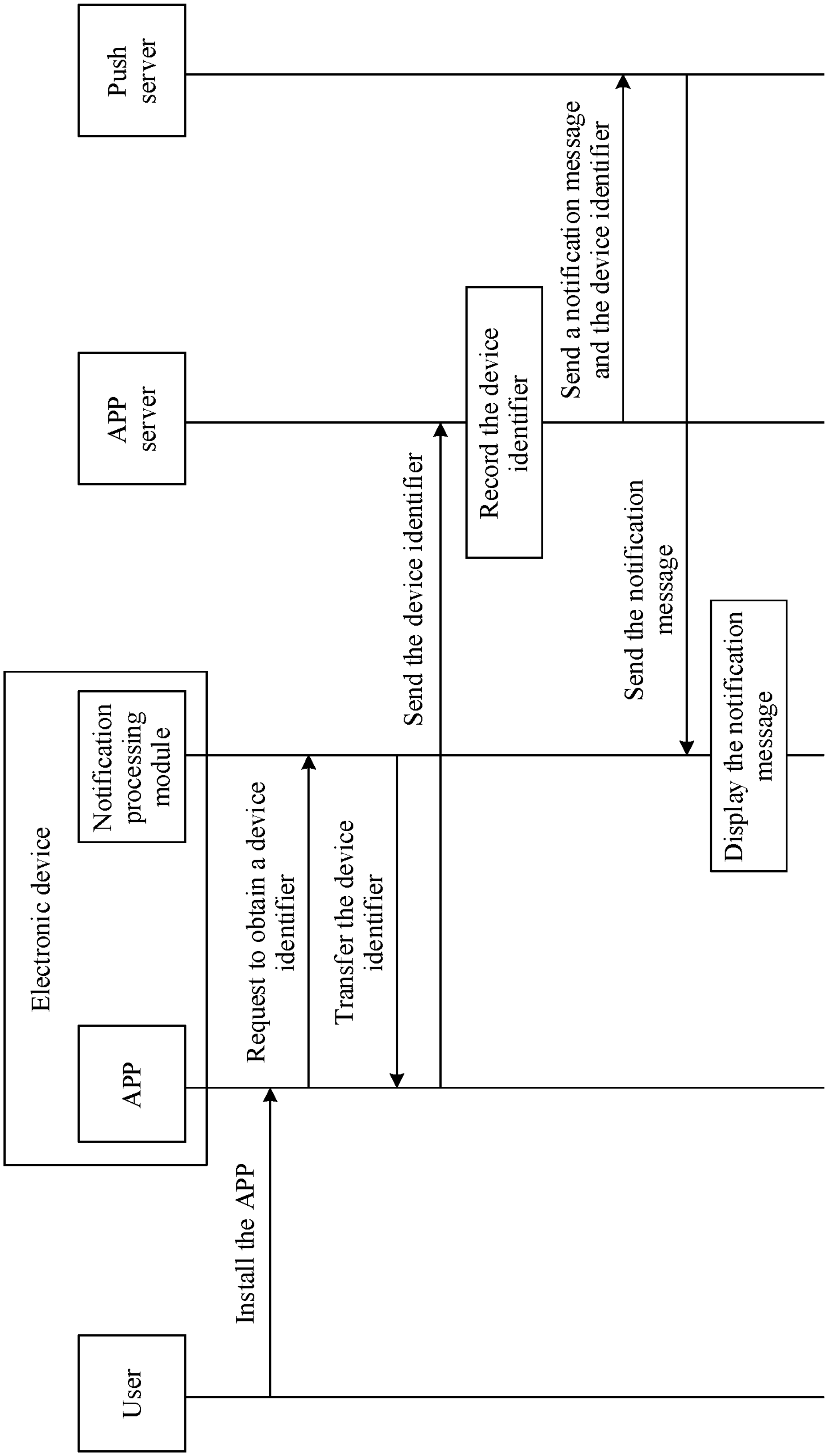
FIG. 5A is a schematic diagram of a notification message push process according to an embodiment of this application.

When the user does not log in to an APP, as shown in FIG. 5A, a message push process in an embodiment of this application may include: When the user installs the APP on the electronic device and starts(a page of) the APP, the APP on the electronic device requests, from the notification processing module, to obtain a device identifier (for example, a serial number of a device upon delivery, an international mobile equipment identity (IMEI), a media access control (MAC) address, an open advertising identifier (OAID), or the like) of the electronic device. The notification processing module transfers the device identifier to the APP, and the APP sends the device identifier to the APP server. The APP server records the device identifier of the electronic device. Subsequently, when the APP server needs to push the notification message, the APP server sends the notification message and the recorded device identifier of the electronic device to the push server. The push server sends the notification message to the electronic device corresponding to the device identifier. After obtaining the notification message, the notification processing module in the electronic device displays the notification message to the user in the notification panel or in another location displayed on the screen.

In some other embodiments, the message push system may further include an authentication server, configured to perform authentication and verification on information such as a user name, a password, and a login token after the user logs in to the APP.

Figure 5B:
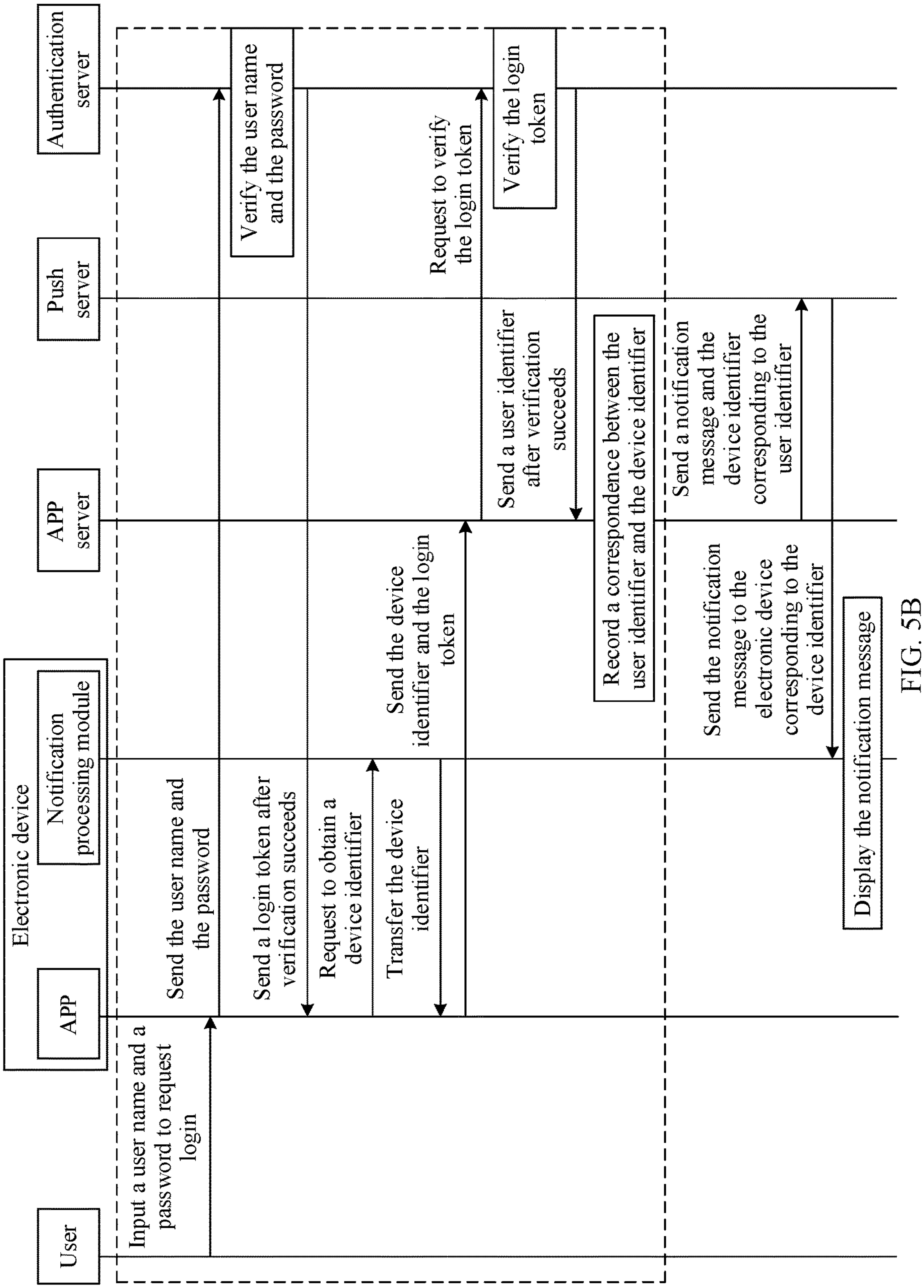
FIG. 5B is a schematic diagram of another notification message push process according to an embodiment of this application.

For example, when the user logs in to the APP, as shown in FIG. 5B, a message push process in an embodiment of this application may include: The user starts the APP installed on the electronic device, and inputs a user name and a password to request login, and then the APP sends the user name and the password to the authentication server. After verification on the user name and the password succeeds, the authentication server sends a user login token to the APP on the electronic device. The APP requests, from the notification processing module, to obtain the device identifier of the electronic device. The notification processing module transfers the device identifier to the APP, and the APP sends the device identifier and the login token to the APP server. The APP server requests, from the authentication server, to verify validity of the login token. If verification on the validity of the login token succeeds, the authentication server sends a user identifier (user id) to the APP server, and the APP server records a correspondence between the user identifier and the device identifier. Subsequently, when the APP server needs to push a notification message (for example, a media resource reserved by the user is about to be available) to a user, the APP server may send, to the push server, the notification message and the device identifier corresponding to the user identifier of the user. The push server sends the notification message to the electronic device corresponding to the device identifier. The notification processing module in the electronic device receives the notification message, and displays the notification message to the user in the notification panel or in another location displayed on the screen.

The notification message processing method provided in embodiments of this application is described below by using an example in which the electronic device is a mobile phone having the structures shown in FIG. 3 and FIG. 4. The method includes the following steps.

An APP 1 is installed and started on the mobile phone. The APP 1 may be a system application, or may be a third-party application. The APP 1 may be a video playing application (for example. Huawei Video), an audio playing application, a music playing application, a news application, a game application, an e-book application, a financial application, or the like. A specific type of the APP 1 is not limited in embodiments of this application. Then, an APP 1 server pushes a notification message to the mobile phone on which the APP 1 is installed and started.

As described above, the APP 1 server may push the notification message to the mobile phone periodically, or in response to event triggering, or in response to triggering of an APP 1 operation person. As described above, when a user logs in to or does not log in to the APP 1, the mobile phone may receive the notification message pushed by the APP 1 server. In addition, as described above, the notification message may include rich media information such as a voice, an animation, or a video.

In addition, the APP 1 server may further accurately push the notification message to the user, to push notification content that the user is interested in as much as possible. For example, the APP 1 server may determine a preference of the user based on user behavior information, to accurately push the notification message to the user. For another example, the APP 1 server may accurately push the notification message to the user based on a user profile. The user profile may indicate a preference or habit of the user, or the like. The APP 1 server may accurately push the notification message to the user based on the preference or habit of the user, to push the notification content that the user is interested in as much as possible. The user profile may be obtained by the APP 1 server by analyzing behavior information of the user for the APP 1, or may be obtained by the mobile phone or a cloud server by analyzing behavior information of the user using the mobile phone, or may be obtained by the mobile phone by analyzing identity information, preference information, or other information input by the user.

An example in which the APP 1 is a video playing application, the APP 1 is logged in on the mobile phone, the APP 1 server pushes a notification message to the mobile phone used by the user when a movie reserved by the user is about to be available, and the notification message includes voice information is used for description. Refer to a procedure shown in a dashed box in FIG. 5B that corresponds to a case in which the user logs in to the APP 1. The APP 1 server records the correspondence between the user identifier and the device identifier, including a correspondence between a user identifier 1 corresponding to a user 1 and a device identifier 1 of a mobile phone 1. For the notification message processing method implemented after the procedure shown in the dashed box in FIG. 5B, refer to a procedure shown in FIG. 6.

Figure 6:
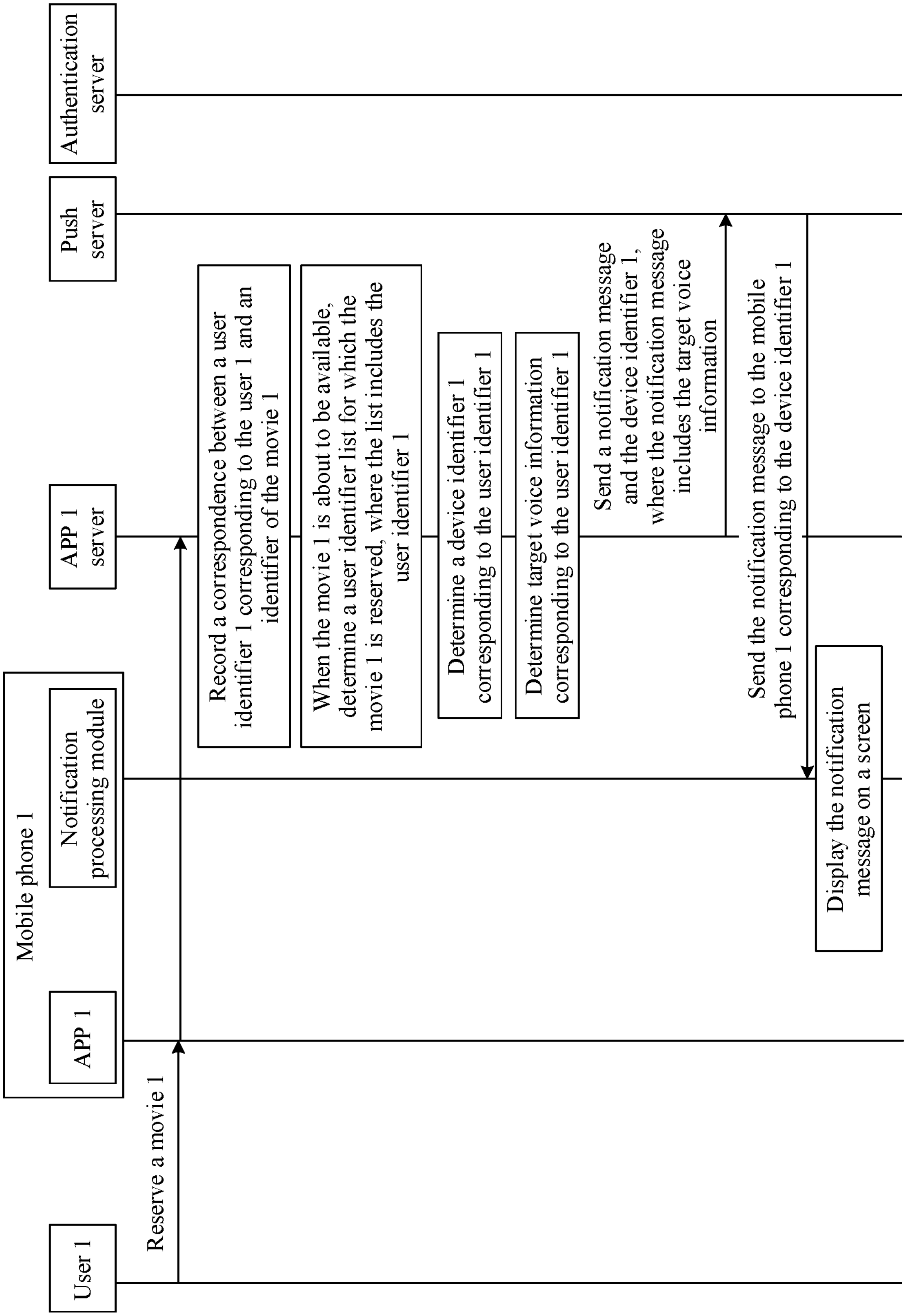
FIG. 6 is a schematic diagram of another notification message push process according to an embodiment of this application.

As shown in FIG. 6, the user 1 reserves a movie 1 on the APP 1, and the APP 1 server (for example, a reservation notification module in the APP 1 server) records a correspondence between the user identifier 1 corresponding to the user 1 and an identifier of the reserved movie 1. In this way, when the movie 1 is about to be available, a notification message related to the movie 1 is pushed to the mobile phone corresponding to the user identifier 1, and then the notification message related to the movie 1 is pushed to the user 1.

Still as shown in FIG. 6, when determining that the movie 1 is about to be available (for example, one day before the movie 1 is available), the APP 1 server (for example, the reservation notification module in the APP 1 server) determines, by querying the correspondence between the movie 1 and the user identifier, a user identifier list for which the movie 1 is reserved. The APP 1 server determines that the user identifier list includes the user identifier 1, and the user corresponding to the user identifier 1 reserves the movie 1. The APP 1 server determines, based on the previously recorded correspondence between the user identifier and the device identifier, a device identifier list corresponding to the user identifier list for which the movie 1 is reserved. The device identifier list includes the device identifier 1 corresponding to the user identifier 1.

As shown in FIG. 6, the APP 1 server accurately determines target voice information to be pushed to the user 1 corresponding to the user identifier 1, where the target voice information meets a preference of the user 1 corresponding to the user identifier 1. The target voice information is pushed to the user 1 by using the notification message, so that the notification message that the user 1 is interested in can be pushed as accurately as possible.

The voice information in the notification message that may be pushed by the APP 1 server is a voice related to the movie 1, for example, a publicity voice of the movie 1. For example, the voice information may be a publicity voice recorded by a related filmmaker like an actor, a director, or a producer of the movie 1, or may be an opening song, an ending song, or an episode of the movie. For example, for the voice related to the movie 1, refer to (a) in FIG. 7. The voice information (for example, the publicity voice) in the notification message may be specifically pushed in a plurality of manners. For example, the notification message carries a resource identifier (for example, a resource link) of the voice information for push. For another example, the notification message carries data content (for example, streaming media data) of the voice information for push.

The APP 1 server may accurately determine, based on a user feature of the user 1 corresponding to the user identifier 1, the target voice information in the notification message to be pushed to the user 1. The user feature may include information such as user behavior information or a user profile. For example, the APP 1 server may perform analysis to determine a person that the user 1 likes based on a behavior of liking a specific person, a behavior of watching clips including only a specific person, a behavior of following a specific person, a behavior of searching for a specific person, a behavior of making a comment on a specific person, or the like that is conducted by the user 1 corresponding to the user identifier 1 in a process of using the APP 1. Then, the APP 1 server determines that the target voice information in the to-be-pushed message is a voice of the person that the user 1 likes. For example, the user 1 follows an actor 1 in the APP 1 on the mobile phone 1, or boosts popularity for the actor 1 in the APP 1, or watches a large quantity of works of the actor 1 in the APP 1, or searches for the actor 1 in the APP 1, or searches for the actor 1 a large quantity of times in the APP 1, or chooses to watch clips including only the actor 1 in a video in the APP 1, or makes comments on the actor 1 in the APP 1 a large quantity of times, or the like. The APP 1 server analyzes the user behavior information of the user 1 corresponding to the user identifier 1, to determine that the user 1 likes the actor 1. In this way, the APP 1 server may push, in the notification message, a voice of the actor 1 in the movie 1 to the user 1, for example, a publicity voice recorded by the actor 1. In other words, in the to-be-pushed notification message determined by the APP 1 server, the target voice information is the publicity voice recorded by the actor 1.

Figure 7:
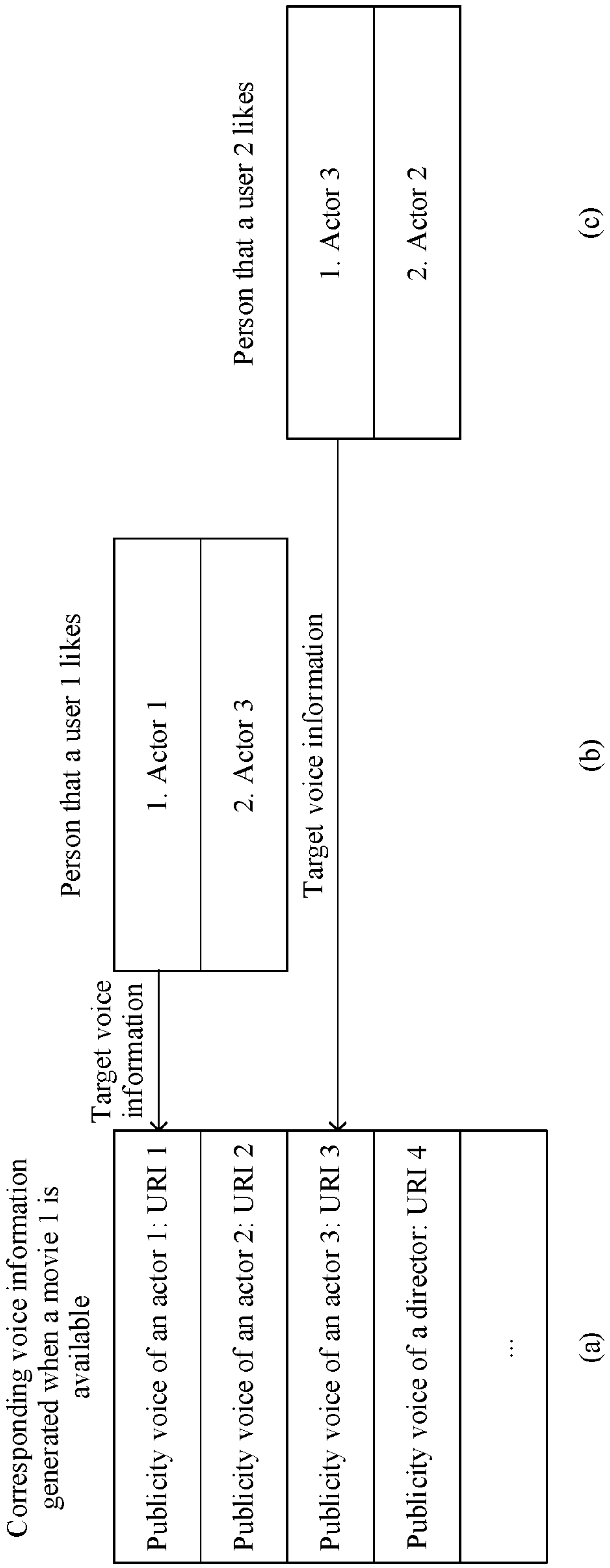
FIG. 7 is a schematic diagram of a correspondence between voice information in a notification message and a user according to an embodiment of this application.

If the APP 1 server determines, based on the user feature, that the user 1 corresponding to the user identifier 1 likes a plurality of persons related to the movie 1, in an implementation, the APP 1 server performs priority sorting based on a degree of preference of the user 1 for actors, selects a favorite person of the user (for example, as shown in (b) in FIG. 7, the favorite person of the user 1 is the actor 1), and uses a voice of the person as the target voice information in the to-be-pushed notification message. In another implementation, the APP 1 server uses, as the target voice information in the to-be-pushed notification message, voices of the plurality of persons (for example, as shown in (b) in FIG. 7, favorite persons of the user 1 include the actor 1 and an actor 3) that the user 1 likes. The APP 1 server may separately use, as the target voice information, a voice of each person that the user 1 likes, and then separately push the target voice information to the user 1 by using one notification message: or may use, as the target voice information, the voices of the plurality of persons that the user 1 likes, and then push, by using one notification message, the target voice information to the mobile phone 1 used by the user 1, to push the target voice information to the user 1.

If the APP 1 server cannot determine a person that is associated with the movie 1 and that the user 1 corresponding to the user identifier 1 likes, the APP 1 server may use, as the target voice information, first N (which is a positive integer) pieces of voice information that are arranged in a preset sequence and that are in voice information corresponding to the movie 1, to push the target voice information to the mobile phone 1 and the user 1. For example, the voice information corresponding to the movie 1 may be arranged in a sequence of a director, a leading actor, and a producer. For another example, the voice information corresponding to the movie 1 may be arranged in descending order from the most popular person to the least popular person determined based on statistics collected by the APP 1 server. For another example, the voice information corresponding to the movie 1 may be arranged in a sequence of name initials of persons.

Still as shown in FIG. 6, after determining the target voice information in the notification message to be pushed to the user 1 corresponding to the user identifier 1, the APP 1 server sends, to the push server, the notification message including the target voice information and the device identifier 1 corresponding to the user identifier 1. In some embodiments, the notification message includes a resource identifier of the target voice information. For example, the resource identifier may be a uniform resource identifier (URI), a uniform resource locator (URL), or the like. A specific type of the resource identifier is not limited in embodiments of this application. In some other embodiments, the notification message includes data content (streaming media data of the target voice information) of the target voice information.

It may be understood that, in addition to the user 1 corresponding to the user identifier 1, another user may also reserve the movie 1, and the APP 1 may accurately push the notification message to the another user based on user behavior information or a user profile corresponding to the another user identifier. For example, as shown in (c) in FIG. 7, the APP 1 server determines that the user 1 corresponding to the user identifier 1 likes the actor 1 most, the target voice information in the to-be-pushed notification message corresponding to the user identifier 1 is the voice recorded by the actor 1, and a corresponding resource identifier is a URI 1. The APP 1 server determines that a user 2 corresponding to a user identifier 2 likes the actor 3 most, the target voice information in the to-be-pushed notification message corresponding to the user identifier 2 is a voice recorded by the actor 3, and a corresponding resource identifier is a URI 3.

Figure 8:
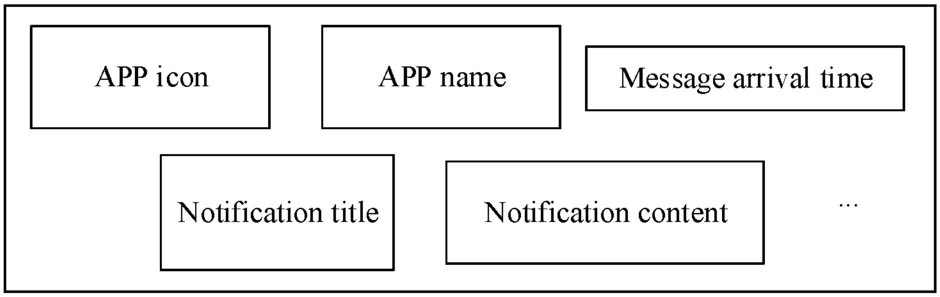
FIG. 8 is a schematic diagram of a structure of a notification message according to an embodiment of this application.

In an embodiment of this application, as shown in FIG. 8, the notification message may usually include one or more of the following: an application icon, an application name, a notification title, notification content, message arrival time, or the like. The notification message forwarded by the APP 1 server to the mobile phone through the push server may be carried by using a specific data structure. For example, the APP 1 server may use a structure in the following JS object notation (JavaScript object notation, json) format for carrying.

```
{
  "message":{
    "android":{
          "notification":{
                "title": "Actor 1: ** is coming!" ,
                "body": " ",
              "icon": "http://video.xxx.com/data2/icon123.png ",
              "type": type1,
              "click_action": {
                  "type": type2,
                  "rich_resource":
"http://message.xxx.com/data2/tang3_wbq.mp3 "
              }
              "buttons": [ ]
                }
          }
        "token":["oaid/push token" ]
      }
}
```

The following describes meanings of fields in the structure in sequence.

An information (message) field is a message root node, and indicates that a message is described.

An android field indicates a type of an operating system. The message is available in the Android operating system.

A notification field is a notification message root node, and indicates a notification message displayed in the notification panel on a device side.

A title field indicates a notification title of the notification message, and is information that can be viewed by the user in a prominent location in the notification panel.

A body field indicates notification content of the notification message, and is usually followed by the notification title. However, if the title is extremely long, the notification content cannot be completely displayed. In addition, not all notification messages may carry notification content.

An icon field indicates an application image of a notification, and is used to determine an application icon to be displayed in the notification panel.

A type (type1) field indicates a type of the notification message, for example, a pure text type (or referred to as a text information type) (type1=1), an audio type (or referred to as a voice information type) (type1=2), a video type (or referred to as a video information type) (type1=3), or another rich media type.

A tap action (click_action) field indicates an opening mode type of a notification after tapping.

A type (type2) field indicates an opening mode type. For example, the URI (type2=1) is opened in a default manner of the operating system, the URI (type2=2) is opened, after tapping, by using an application APP to which the notification belongs, an application APP list is opened after tapping for user selection (type2=3), or the like.

A rich media (rich_resource) field indicates a rich media storage path or a specified URI.

A button (buttons) field indicates an attachment button in the notification panel, and may be used to perform operations, such as "Learn more", "Ignore", "Save", or "Share", for the notification in addition to "Tap". For another example, the button may be displayed in the notification panel in different forms based on different type 1 types. For example, a play control (for example, a horn-shaped control), a pause control, or the like may be added to an audio.

A token (token) field is an authorization ticket used for sending a notification message. The authorization ticket is obtained from a ticket server and checked by the push server (by invoking an interface of the ticket server), to avoid indiscriminate sending of notification messages.

As shown in FIG. 6, after receiving the notification message and the device identifier 1 that are sent by the APP 1 server, the push server sends the notification message to the mobile phone 1 corresponding to the device identifier 1. In some embodiments, after receiving the notification message and the device identifier 1 that are sent by the APP 1 server, the push server may determine the APP 1 that applies for the device identifier 1 (for example, an OAID), and send, in the notification message, an application name (or an identifier of the APP 1) of the APP 1 to the mobile phone 1. In some other embodiments, the notification message sent by the APP 1 server to the push server carries an application name of the APP 1 (or an identifier of the APP 1), and the push server sends the notification message and the carried application name of the APP 1 to the mobile phone 1.

Still as shown in FIG. 6, after receiving the notification message sent by the push server, the mobile phone 1 displays the notification message on the screen, to display the notification message to the user. Specifically, after receiving the notification message sent by the push server, the mobile phone 1 obtains corresponding voice information based on the resource identifier in the notification message, parses the notification message based on an agreed notification message format, and displays a parsed notification message on the screen. For example, the mobile phone 1 may display the parsed notification message in the notification panel or in another location like at the top of the screen of the mobile phone 1. This is not limited. The notification panel may be invoked by the user by pulling down from the top of the screen, or may be located on a leftmost screen of the mobile phone 1, or may be displayed on a lock screen, or the like. Descriptions are provided below by using an example in which the mobile phone 1 displays the notification message in the notification panel.

Figure 9A:
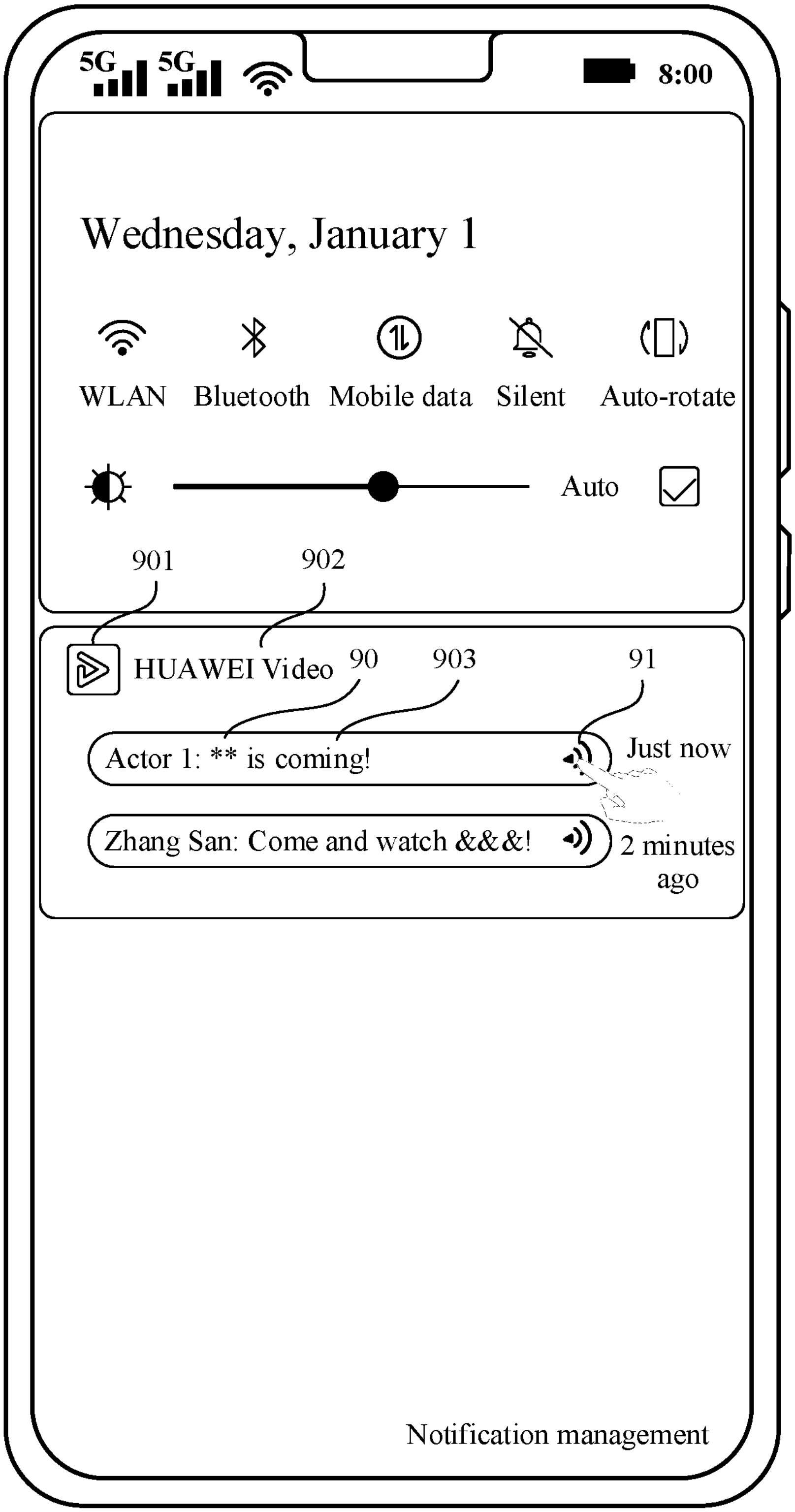
FIG. 9(*a*) to FIG. 9(*c*) are a schematic diagram of a group of interfaces according to an embodiment of this application.
Figure 9B:
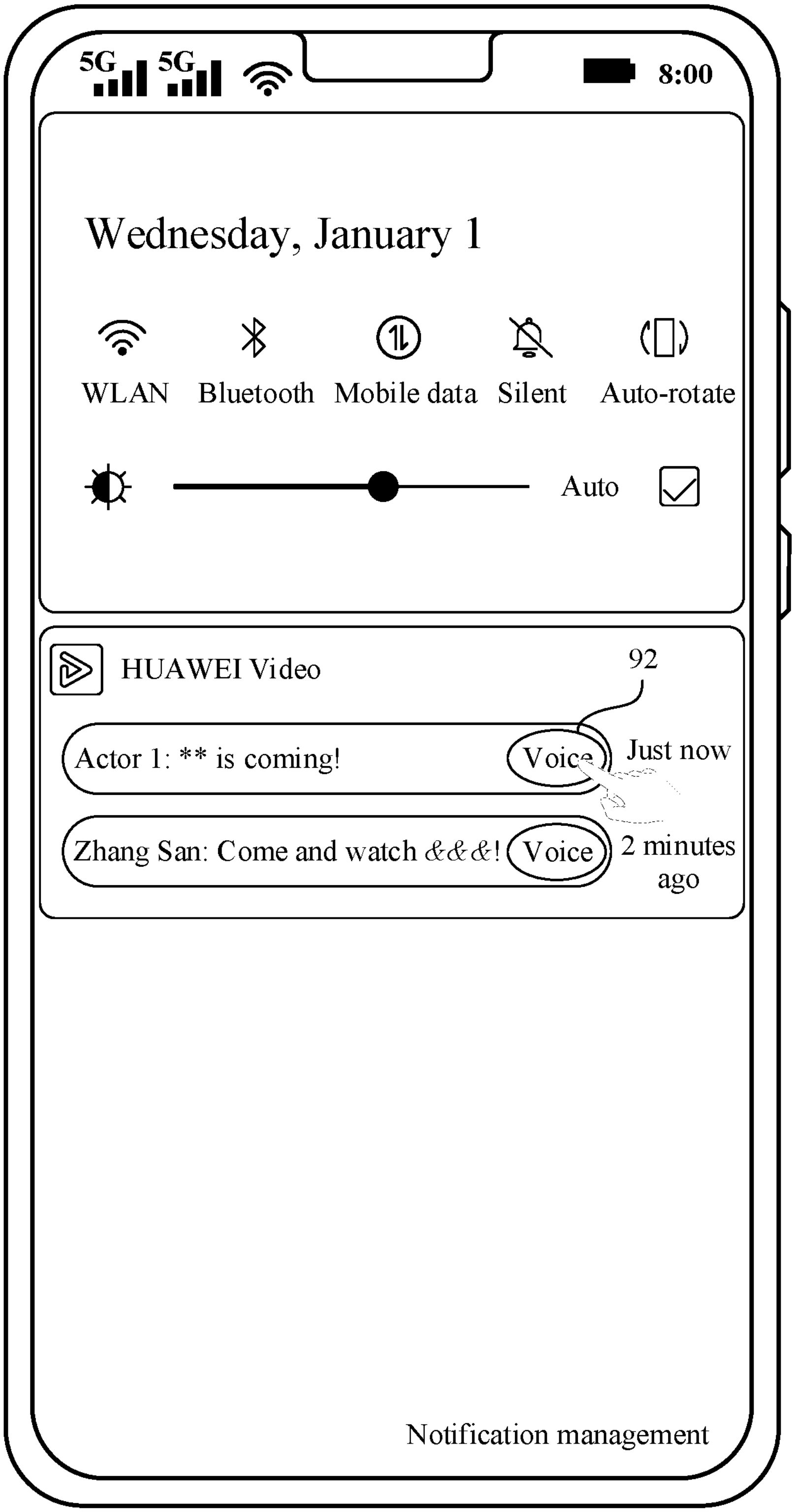
Figure 9C:
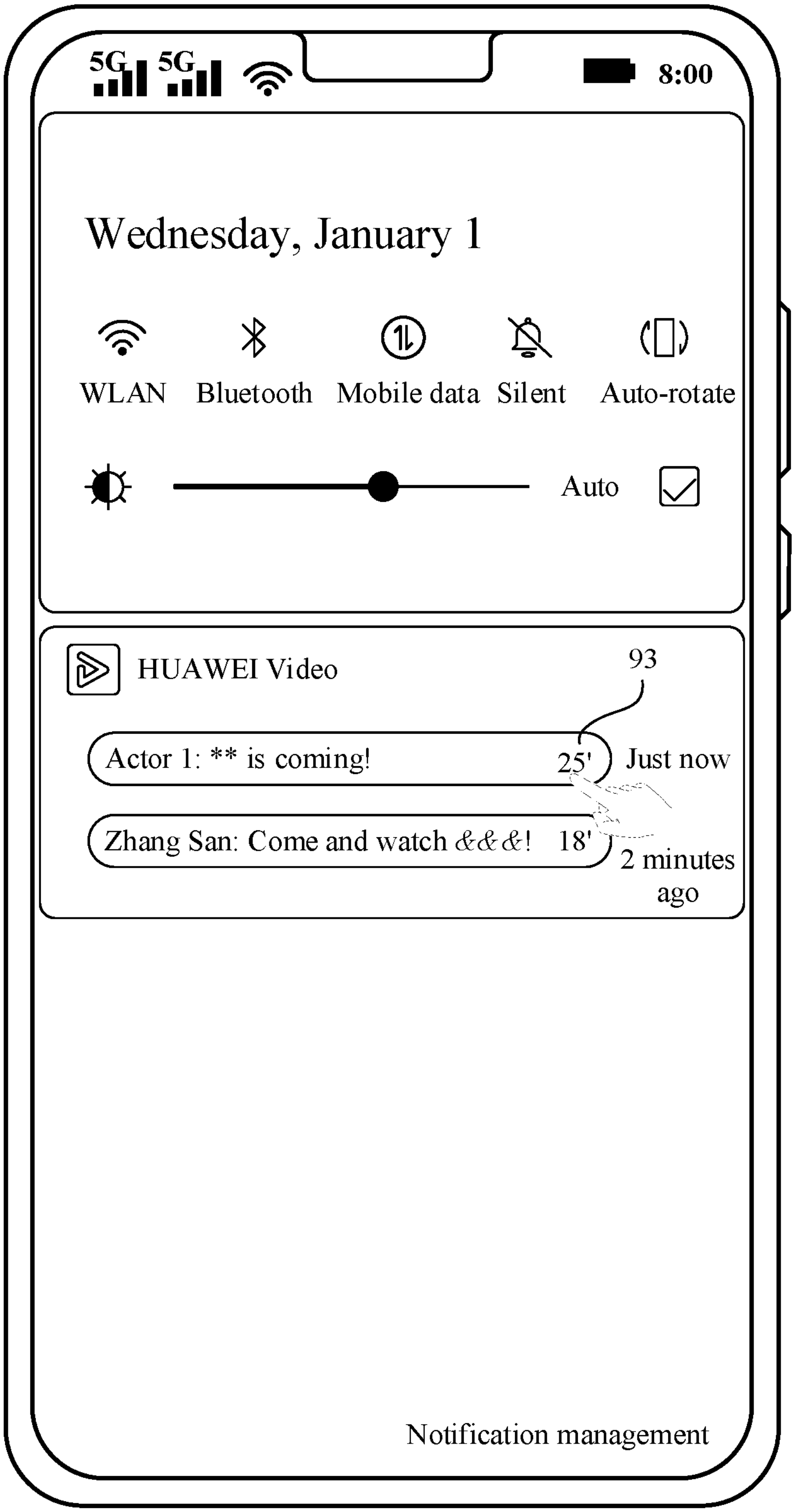

In some embodiments, for the notification message displayed by the mobile phone 1 to the user in the notification panel, refer to FIG. 9(*a*). As shown in FIG. 9(*a*), the notification message includes an application icon 901, an application name 902, and a notification title 903, and may further include prompt information 904 (for example, just now: two minutes ago, or 08:10) of message arrival time, or other information. In addition, the mobile phone 1 may further add a notification icon or some other information to the notification message.

The application icon 901 may correspond to the icon field in the foregoing structure, and the notification title 903 may correspond to the title field in the foregoing structure. When the notification message includes voice information, a value of type1 in the type field in the foregoing structure is 2. That is, it indicates that notification content of the notification message is in an audio form.

In some embodiments, when the notification message includes voice information, the mobile phone 1 may display, in the notification message, a person corresponding to the voice information. For example, as shown in FIG. 9(*a*), on the mobile phone 1, the notification title of the notification message may include person information 90 corresponding to the voice information.

In some embodiments, when the notification message includes voice information, the mobile phone 1 may prompt, in a specific manner, the user that the current notification message includes the voice information. For example, as shown in FIG. 9(*a*), the notification message displayed on the mobile phone 1 includes a voice identifier 91. For another example, as shown in FIG. 9(*b*), the notification message displayed on the mobile phone 1 includes a voice identifier 92, where the voice identifier is prompt information "Voice". In this way, when the notification message includes the voice information, a form and content of the notification message are novel and vivid, and therefore are attractive to the user. In this way, the user is more likely to be interested in playing the voice information in the notification message.

In some embodiments, the notification message displayed by the mobile phone 1 to the user in the notification panel further includes play duration of the voice information. For example, for the play duration, refer to prompt information 93 shown in FIG. 9(*c*). The prompt information 93 may also be referred to as a voice identifier 93, and may also be for prompting the user that the current notification message includes the voice information.

In an embodiment of this application, in response to an operation 1 (namely, a trigger operation) performed by the user on the notification message, the mobile phone 1 plays the voice information included in the notification message. In this way, when the notification message includes the voice information, the notification message is novel and vivid, and therefore is attractive to the user. After playing the voice information in the notification message, the user is likely to get interested and starts the APP, so that usage of the APP is high.

In addition, the voice information in the notification message is accurately pushed based on a preference of the user, and therefore is attractive to the user. After playing the voice information in the notification message, the user easily gets interested and starts the APP to learn more content, so that usage of the APP is high.

In some embodiments, in response to the operation 1 performed by the user on the notification message, the mobile phone 1 may directly play the voice information included in the notification message without starting a specific APP to play the voice information. The mobile phone 1 may quickly and conveniently play the voice information in the notification message in a background by using a voice playing basic capability of the operating system. In this case, in the click_action field in the foregoing structure, a value of type2 may be 1. That is, it indicates that the voice information is played in the default manner of the operating system. For example, the mobile phone 1 may play the voice information by invoking the following API interfaces at the bottom layer of the operating system.

```
MediaPlayer mediaPlayer=new MediaPlayer( );
//Set a specified streaming media address
mediaPlayer.setDataSource (rich_resource_path);
//Set an audio stream type
```

mediaPlayer.setAudioStreamType(AudioManager-.STREAM_MUSIC)

In this way, compared with a method that is in the conventional technology and in which the mobile phone displays specific content of the notification message after starting the APP 1 in response to an operation of tapping the notification message by the user, in the method provided in embodiments of this application, the user can directly, quickly, and conveniently play the voice information in the notification message by using the basic capability of the operating system without waiting for a long time to start the APP 1, to obtain specific content of the notification message, and resources required for starting the APP 1 can be reduced.

In addition, in the conventional technology, in response to the operation of tapping the notification message by the user, after starting the APP 1, the mobile phone finds that the user is not interested in the specific content of the notification message, but spend much time in waiting for starting the APP 1. In this embodiment of this application, the mobile phone may directly play the voice information in the notification message in response to the operation 1 performed by the user on the notification message. If the user is indeed interested in the specific content of the voice information, the user may start the APP 1 for further understanding. If the user is not interested in the voice information, the user does not need to wait for starting the APP 1.

For example, the resource identifier in the notification message may be a resource link (or a hyperlink). In an implementation of this application, after receiving the notification message, the mobile phone 1 performs pre-downloading based on the resource link, to obtain corresponding voice information. After a play indication of the user is detected, the voice information obtained through downloading is played. To be specific, after receiving the notification message, the mobile phone 1 parses the notification message based on the agreed format, and downloads specific data content of the voice information from a network based on the resource link in the rich_resource field in the notification message. Then, in response to the operation 1 performed by the user on the notification message, the mobile phone 1 plays the voice information based on the obtained data content. In another implementation, after receiving the notification message, the mobile phone 1 does not immediately pre-download voice information from a network based on the resource link, but downloads and plays the voice information after detecting a play indication of the user. To be specific, in response to the operation 1 performed by the user on the notification message, the mobile phone 1 obtains data content of the voice information corresponding to the resource link in the rich_resource field in the notification message, and plays the voice information included in the notification message.

Figure 10A:
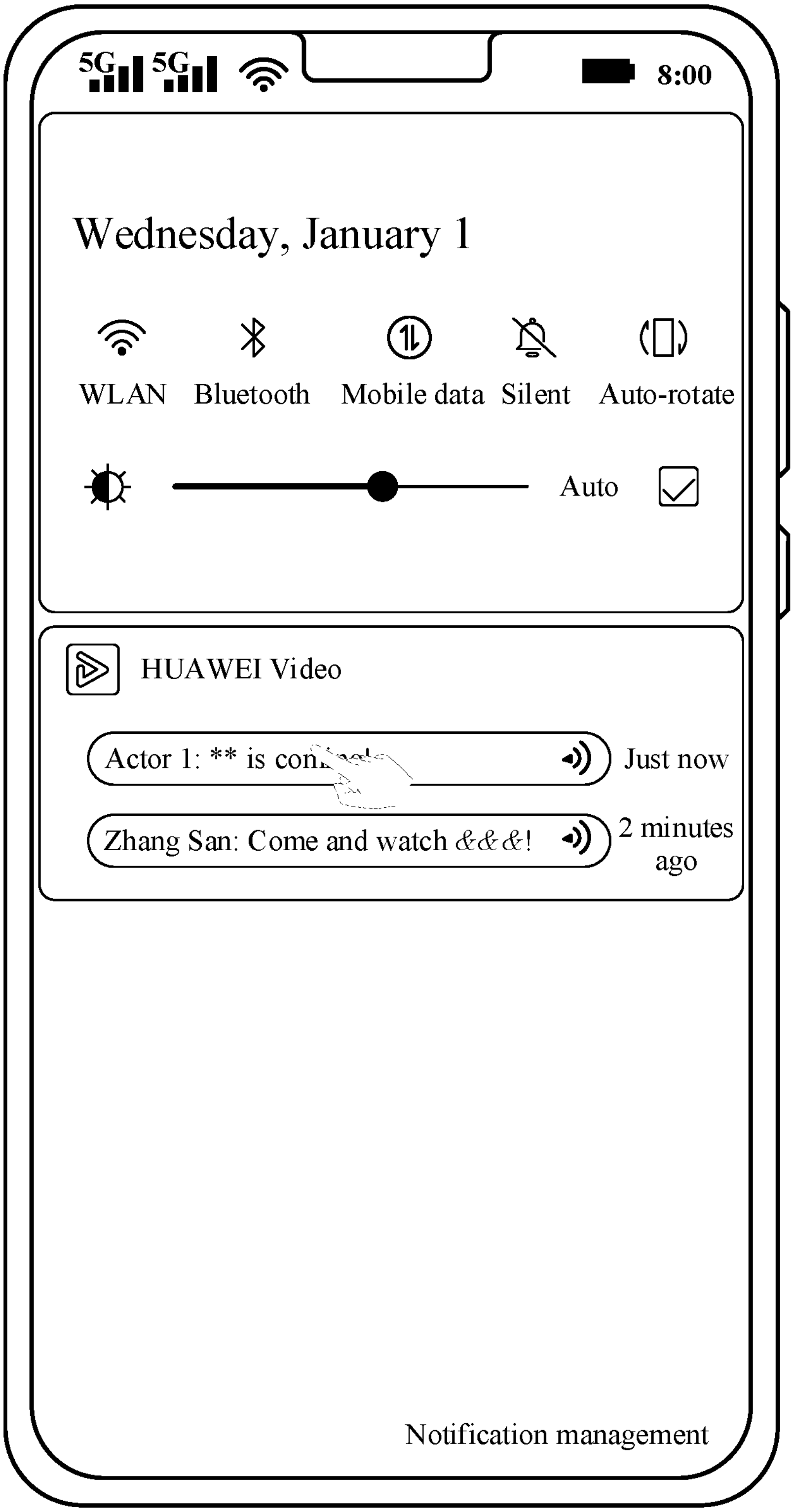
FIG. 10(*a*) and FIG. 10(*b*) are a schematic diagram of another group of interfaces according to an embodiment of this application.
Figure 10B:
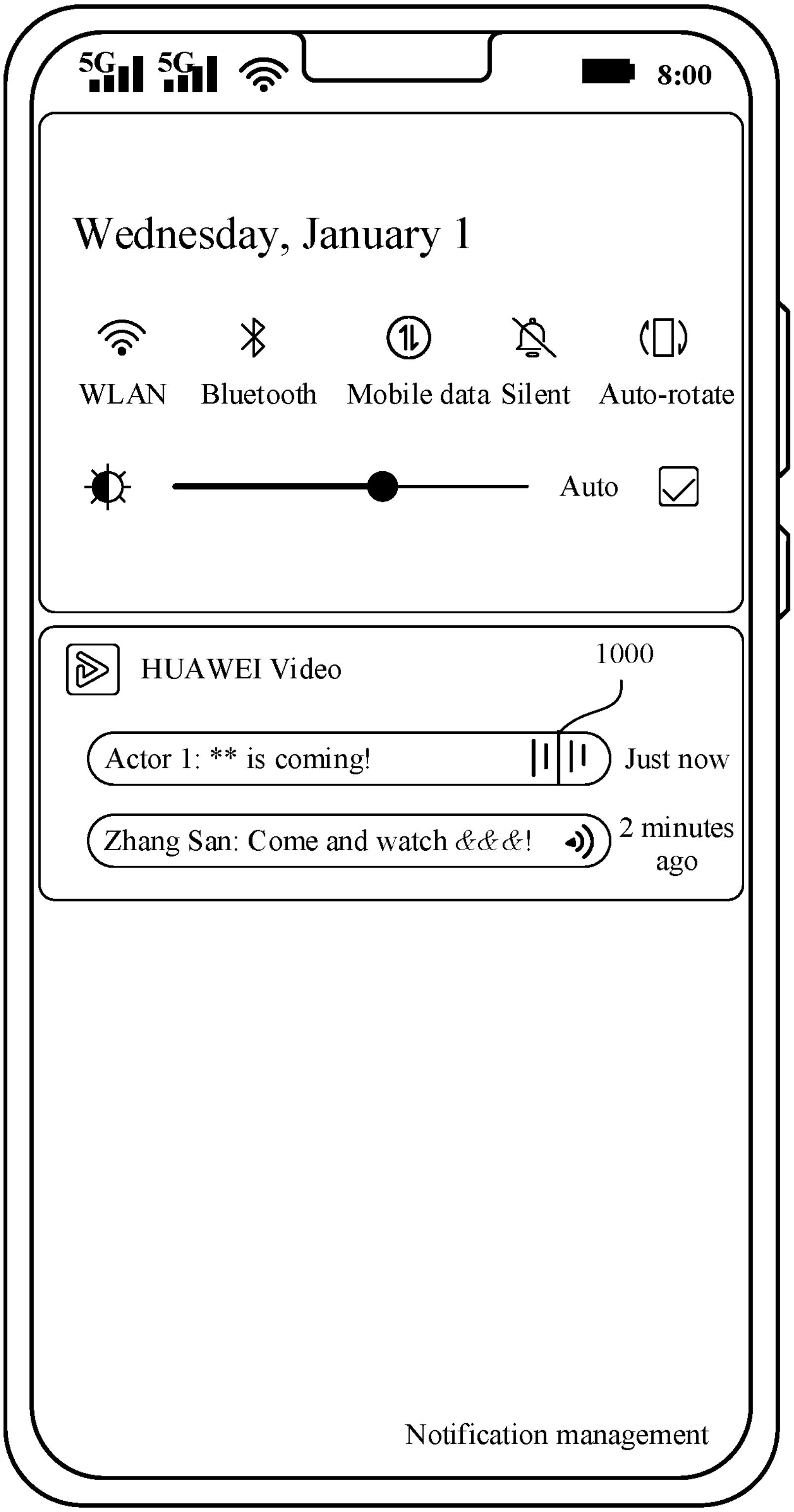
Figure 11A:
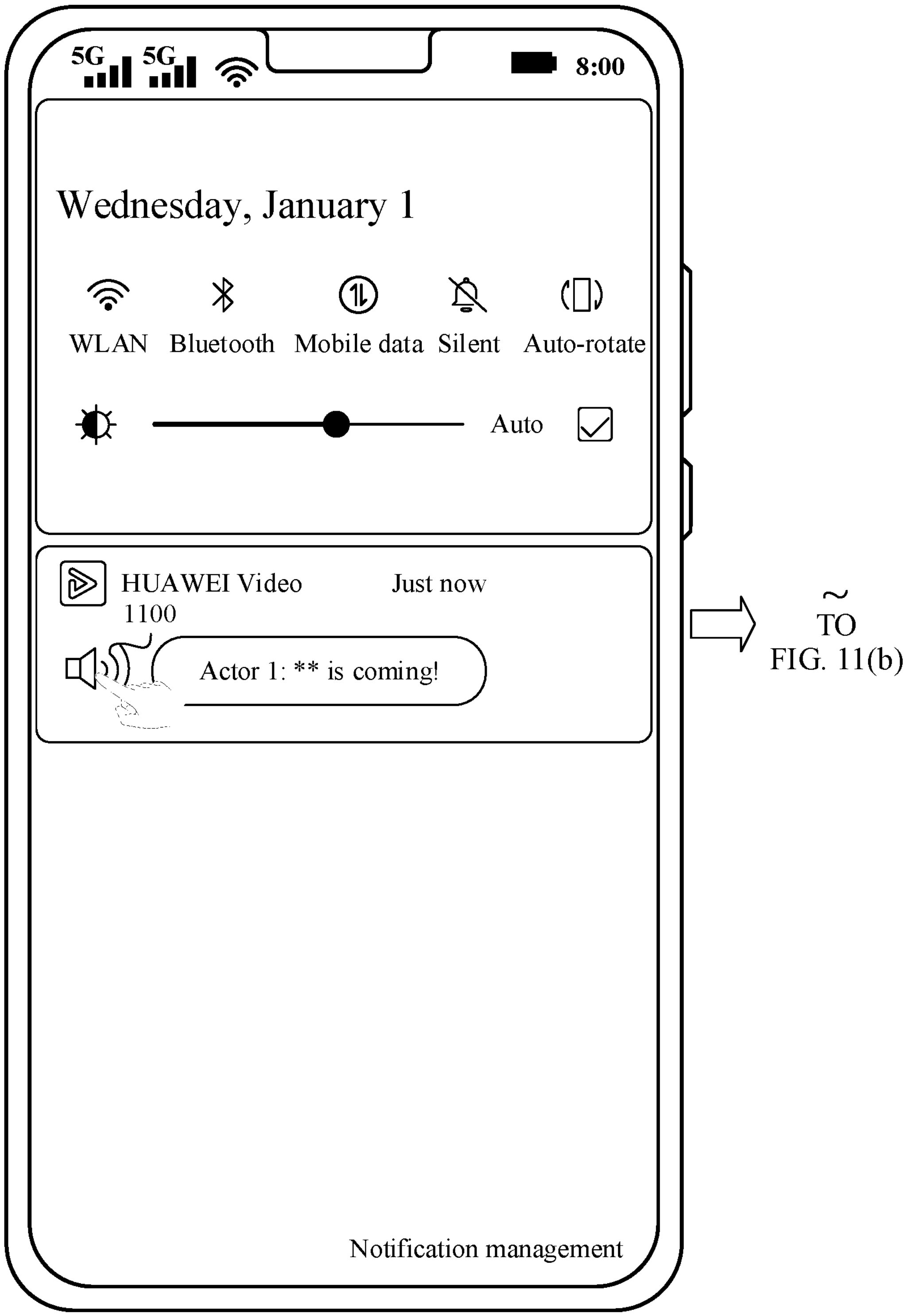
FIG. 11(*a*) to FIG. 11(*d*) are a schematic diagram of another group of interfaces according to an embodiment of this application.
Figure 11B:
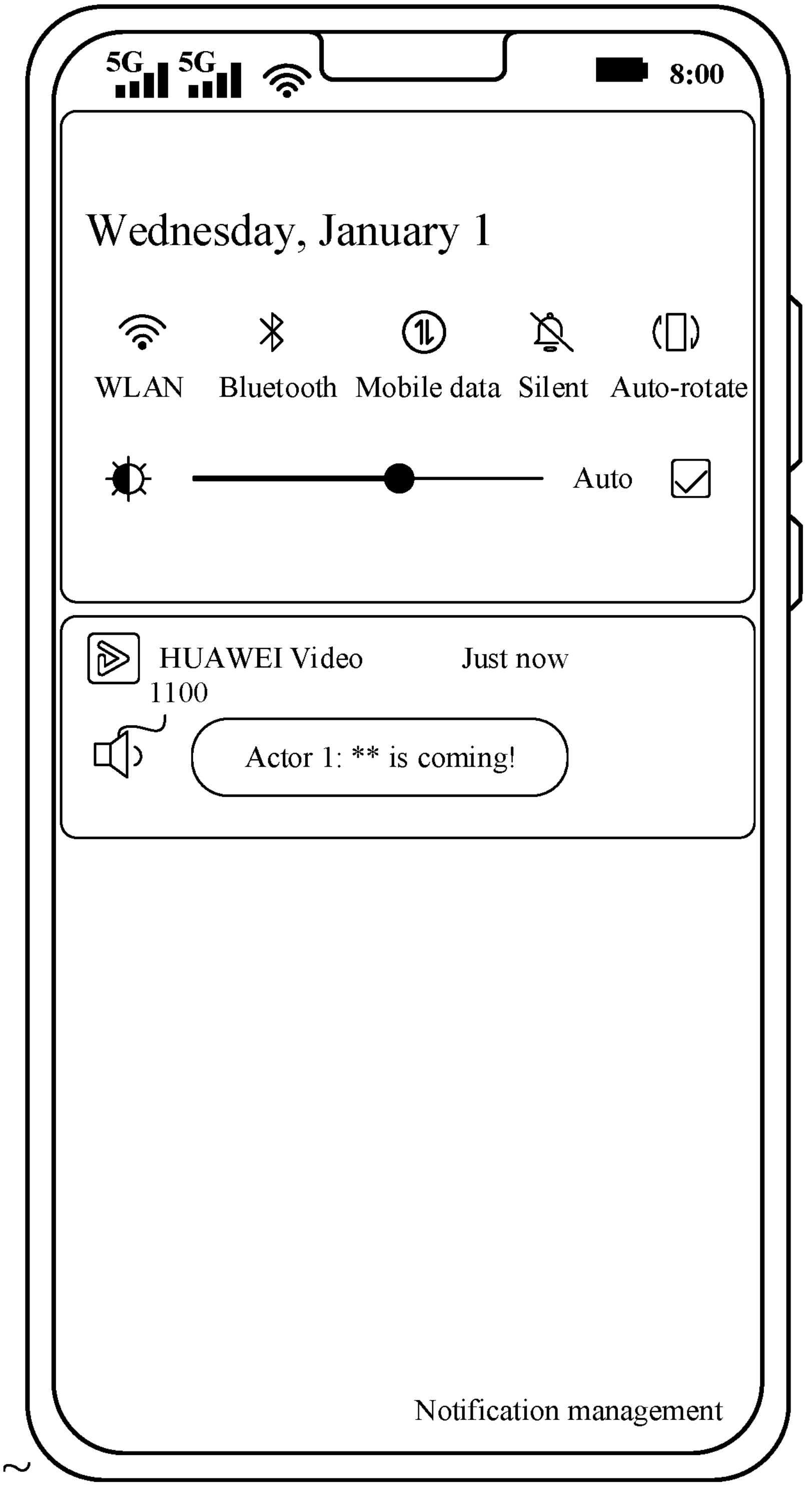
Figure 11C:
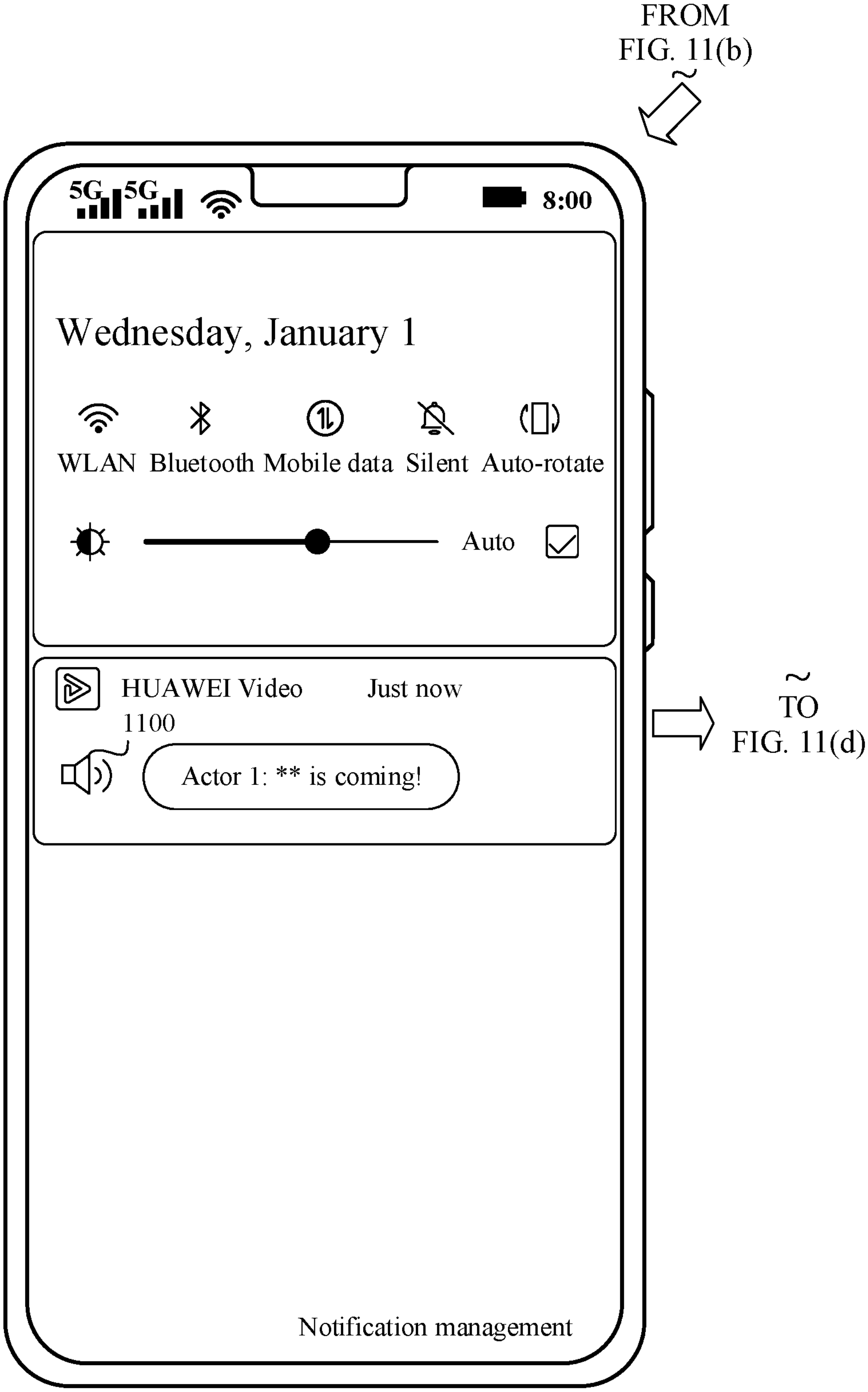
Figures 11C, 11D:
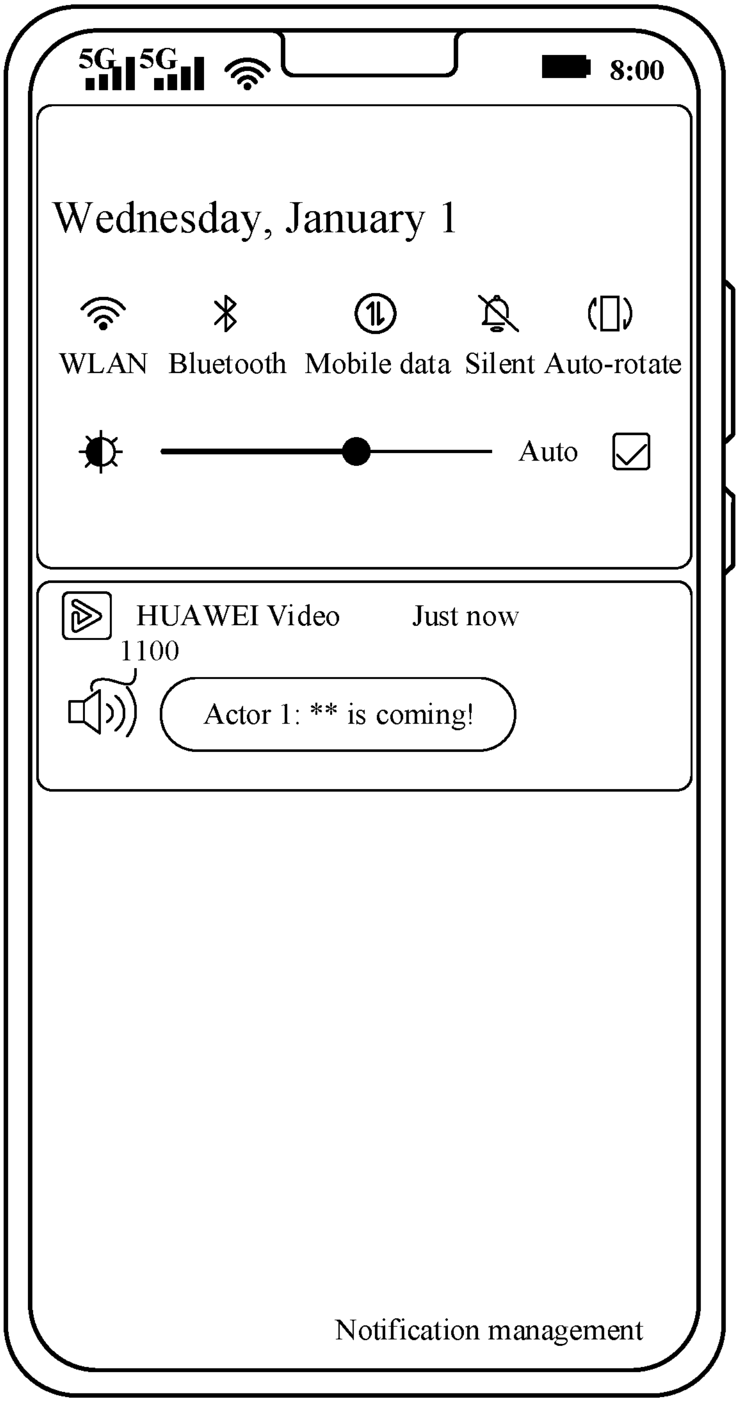
Figure 12A:
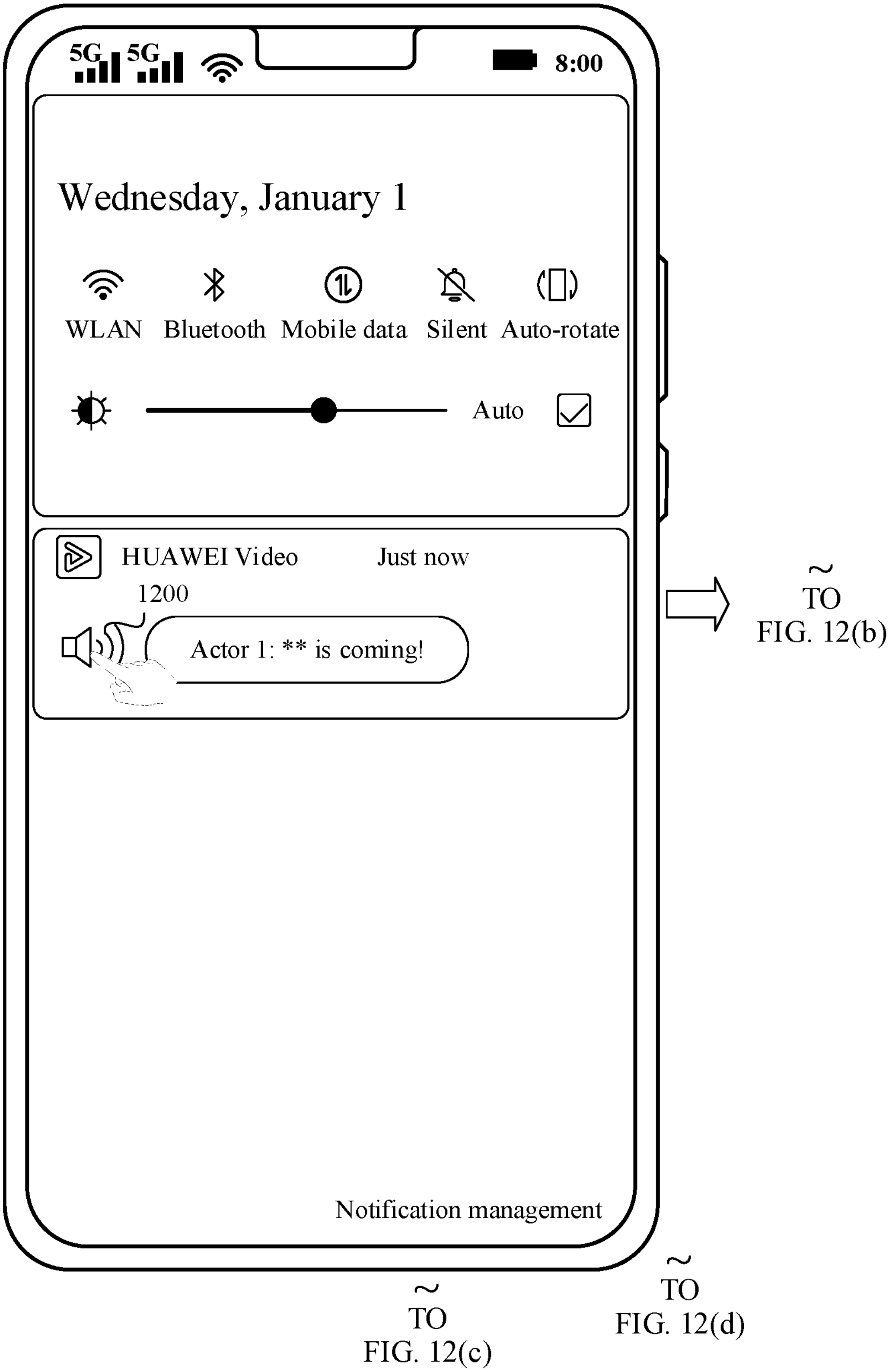
FIG. 12(*a*) to FIG. 12(*d*) are a schematic diagram of another group of interfaces according to an embodiment of this application.
Figure 12B:
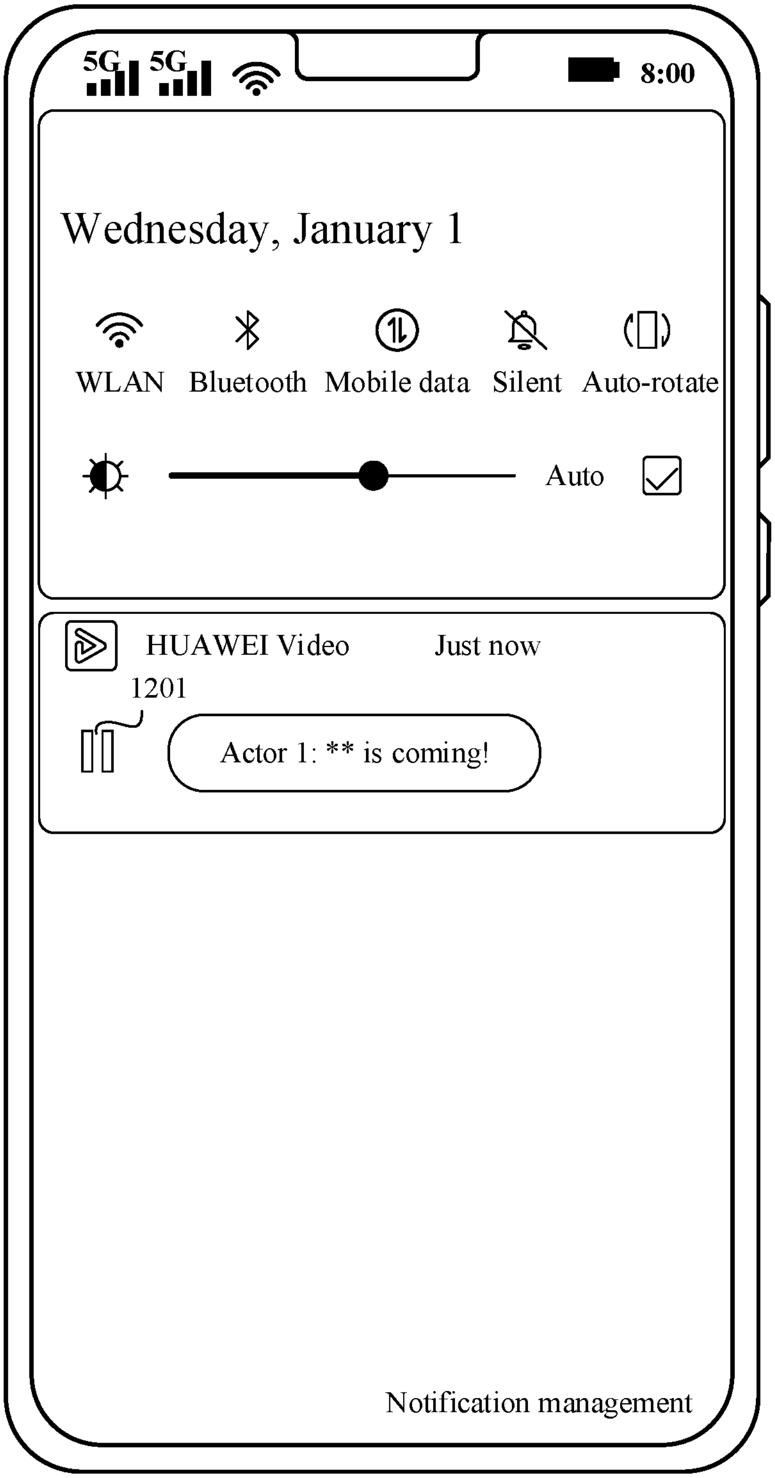
Figures 12A, 12C:
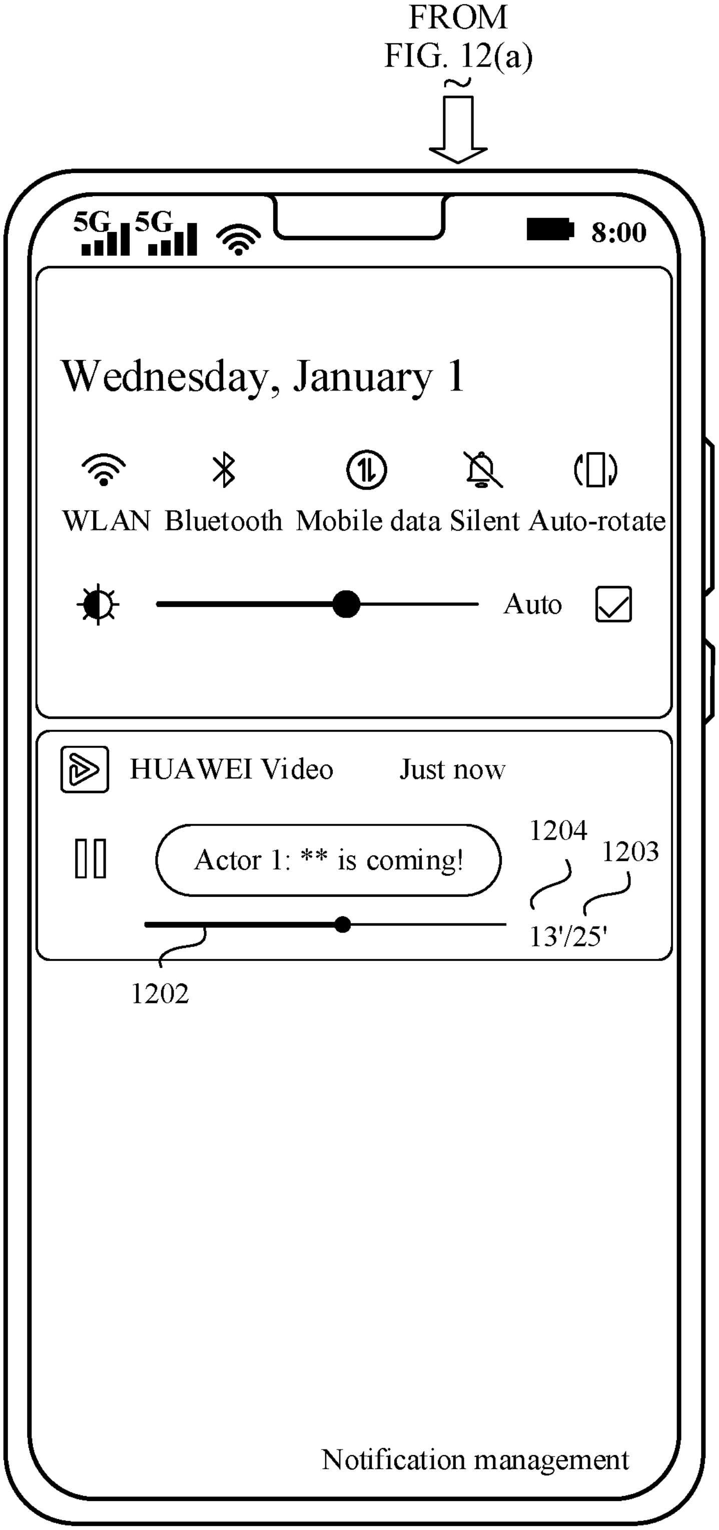
Figure 12D:
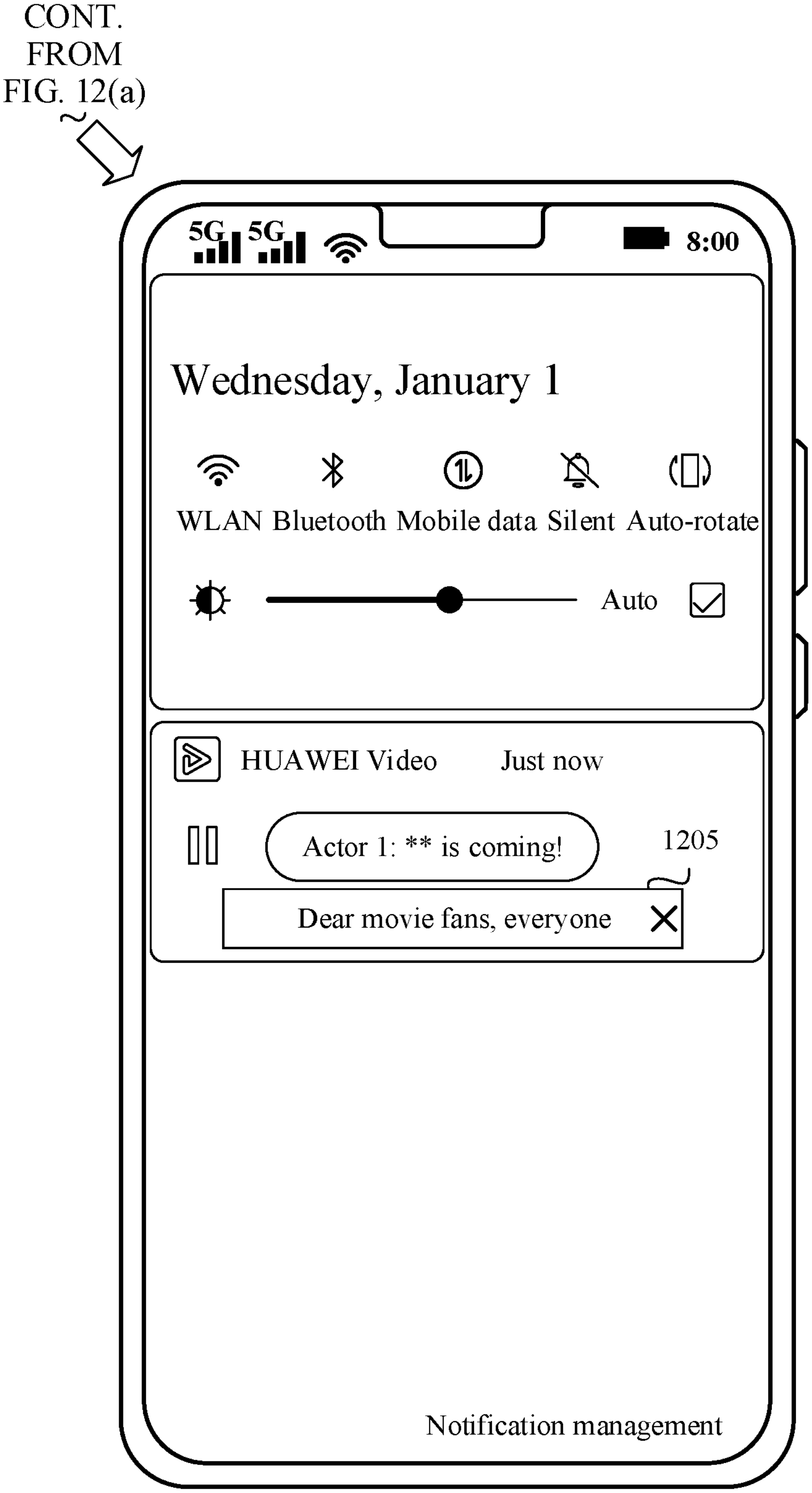

For example, the operation 1 performed by the user on the notification message may be an operation performed by the user on the notification title shown in FIG. 10(*a*), the operation performed on the voice identifier in the notification message shown in each of FIG. 9(*a*) to FIG. 9(*c*), an operation performed on a blank area in the notification message, or the like. This is not limited. For example, the operation 1 performed by the user on the notification title may be an operation of tapping the notification title by the user. The operation 1 performed by the user on the notification title may alternatively be another touch operation like double-tapping or touching and holding, a voice operation, a gesture operation, or the like. A specific manner of the operation 1 is not limited in embodiments of this application.

When the mobile phone 1 plays the voice information, the mobile phone 1 may prompt, by displaying prompt information, by using an indicator, or in another manner, the user that the voice information is being played currently. For example, as shown in FIG. 10(*b*), the mobile phone 1 may prompt, by using a prompt identifier 1000, the user that the voice information is being played currently.

When the mobile phone 1 plays the voice information, if the mobile phone 1 detects the operation 1 again, the mobile phone 1 may pause playing the voice information. Subsequently, after detecting the operation 1 again, the mobile phone 1 continues to play the voice information based on previous play progress. Alternatively, when the mobile phone 1 plays the voice information, if the mobile phone 1 detects the operation 1 again, the mobile phone 1 may stop playing the voice information. Subsequently, after detecting the operation 1 again, the mobile phone 1 replays the voice information.

In some embodiments, the mobile phone 1 in a screen-locked state plays the voice information in the notification message in response to the operation 1 performed by the user on the notification message. In some other embodiments, the mobile phone 1 can play the voice information in the notification message in response to the operation 1 performed on the user on the notification message only when the mobile phone 1 is in a screen-unlocked state. After the screen is locked, the mobile phone 1 may stop playing the voice information or may continue to play the voice information.

In some embodiments, the notification message displayed in the notification panel further includes a play control. After detecting an operation performed by the user on the play control, the mobile phone 1 plays the voice information in the notification message. For example, as shown in FIG. 11(*a*), after detecting an operation of tapping a play control 1100 by the user, the mobile phone 1 plays the voice information in the notification message. For another example, the play control may be the foregoing voice identifier. A specific disposing location and a specific form of the play control are not limited in embodiments of this application.

In some possible implementations, a display status of the play control 1100 in a process of playing the voice information is different from a display status that is of the play control 1100 and that corresponds to a case in which the voice information is not played. For example, the play control 1100 is in a first state when the voice information is not played, and is in a second state in the process of playing the voice information. For example, in the process of playing the voice information, the display status of the play control 1100 may dynamically change as shown in FIG. 11(*b*) to FIG. 11(*d*), to prompt the user that the voice information is being played currently.

In some other possible implementations, a display status of the play control 1100 in a process of playing the voice information is consistent with a display status that is of the play control 1100 and that corresponds to a case in which the voice information is not played.

In some other possible implementations, after the mobile phone 1 starts to play the voice information, in the notification message displayed in the notification panel, the play control may be switched to a pause control. For example, after detecting an operation of tapping a play control 1200 shown in FIG. 12(*a*) by the user, the mobile phone 1 starts to play the voice information, and the pause control 1200 is switched to a pause control 1201 shown in FIG. 12(*b*). If the mobile phone 1 detects an operation of tapping the pause control by the user, the mobile phone 1 may pause playing the voice information, and the pause control is switched to a resume control. Subsequently, after detecting an operation of tapping the resume control by the user, the mobile phone 1 continues to play the voice information based on previous play progress.

Alternatively, after the mobile phone 1 starts to play the voice information, the play control in the notification message may be switched to a stop control. If the mobile phone 1 detects an operation of tapping the stop control by the user, the mobile phone 1 may stop playing the voice information, and the stop control is switched back to the play control. Subsequently, after detecting the operation of tapping the play control by the user, the mobile phone 1 restarts to play the voice information.

In some embodiments, in the process of playing the voice information, the mobile phone 1 may further prompt the user with play progress. For example, as shown in FIG. 12(*c*), the mobile phone 1 may display one or more pieces of information such as a play progress bar 1202, total duration 1203, played duration 1204, or remaining play duration of the voice information, to prompt the user with play progress of the current voice information. In some other embodiments, in the process of playing the voice information, the mobile phone 1 may further perform a fast-forward or rewind operation in response to an indication operation of the user, to adjust the play progress.

In some embodiments, in the process of playing the voice information, the mobile phone 1 may further display text content of the voice information to the user on the screen, or display text content of the voice information to the user on the screen in response to an indication operation of the user. The text content may scroll along with the process of playing the voice information. After playing of the voice information is completed, the text content is automatically stopped from being displayed. Alternatively, the text content corresponds to a close control. After detecting an operation of tapping the close control by the user, the mobile phone 1 stops displaying the text content. For example, for the text content of the voice information, refer to text information 1205 shown in FIG. 12(*d*).

When the mobile phone 1 plays the voice information in the notification message, the notification message is usually slidden to a middle area of the screen. In some embodiments, if the mobile phone 1 moves the notification message to an upper part or a lower part of the screen in response to an operation of sliding up/down on the screen by the user, and moves out of the middle area of the screen (which may also be referred to as losing a focus), the mobile phone 1 may automatically stop playing the voice information without a user indication. After the notification message is moved back to the middle area of the screen (which may also be referred to as re-obtaining the focus), the mobile phone 1 may automatically continue to play the voice information or replay the voice information without a user indication. This can improve user experience. Alternatively, after the notification message is moved back to the middle area of the screen, the voice information is no longer played.

Figure 13A:
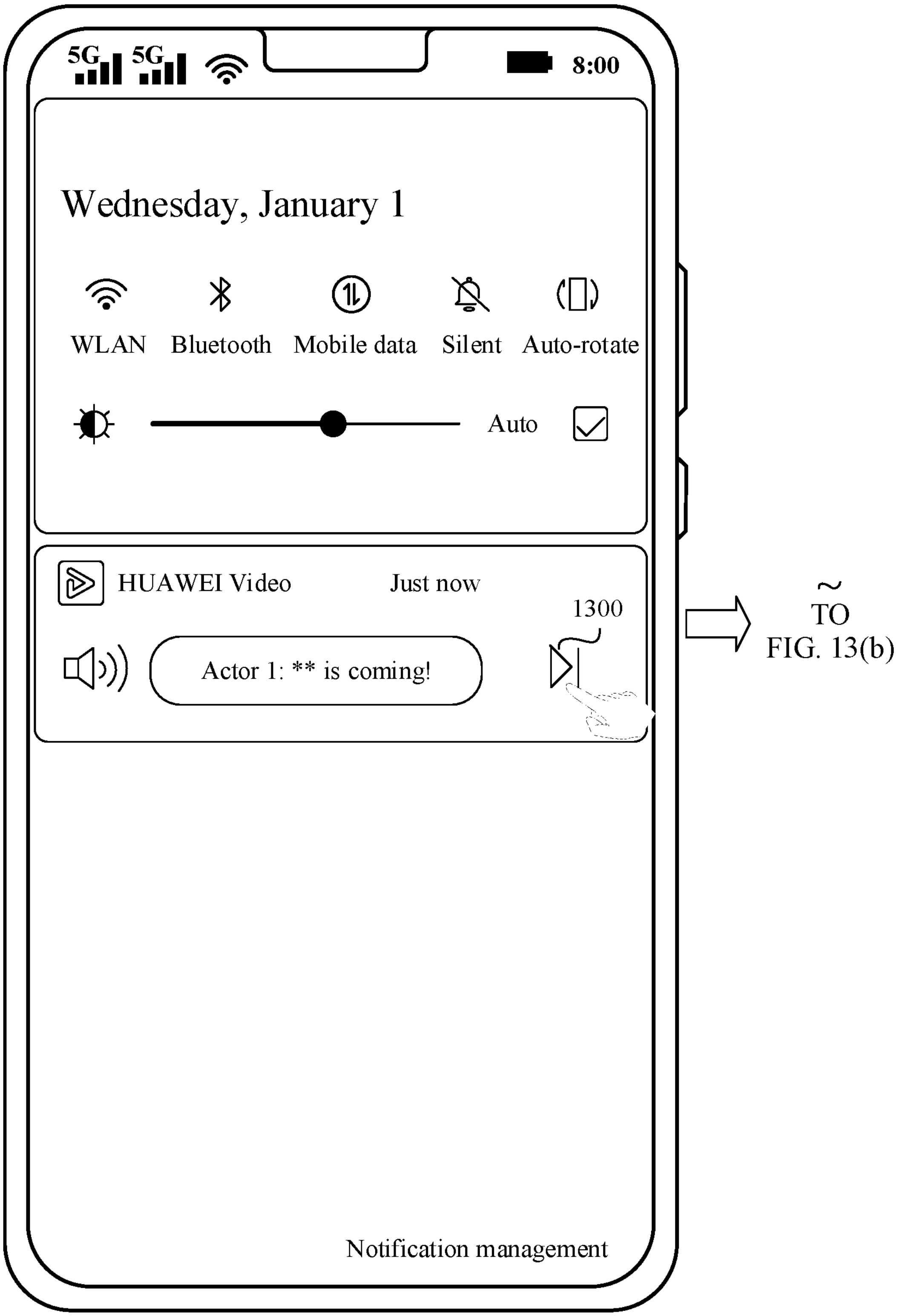
FIG. 13(*a*) and FIG. 13(*b*) are a schematic diagram of another group of interfaces according to an embodiment of this application.
Figure 13B:
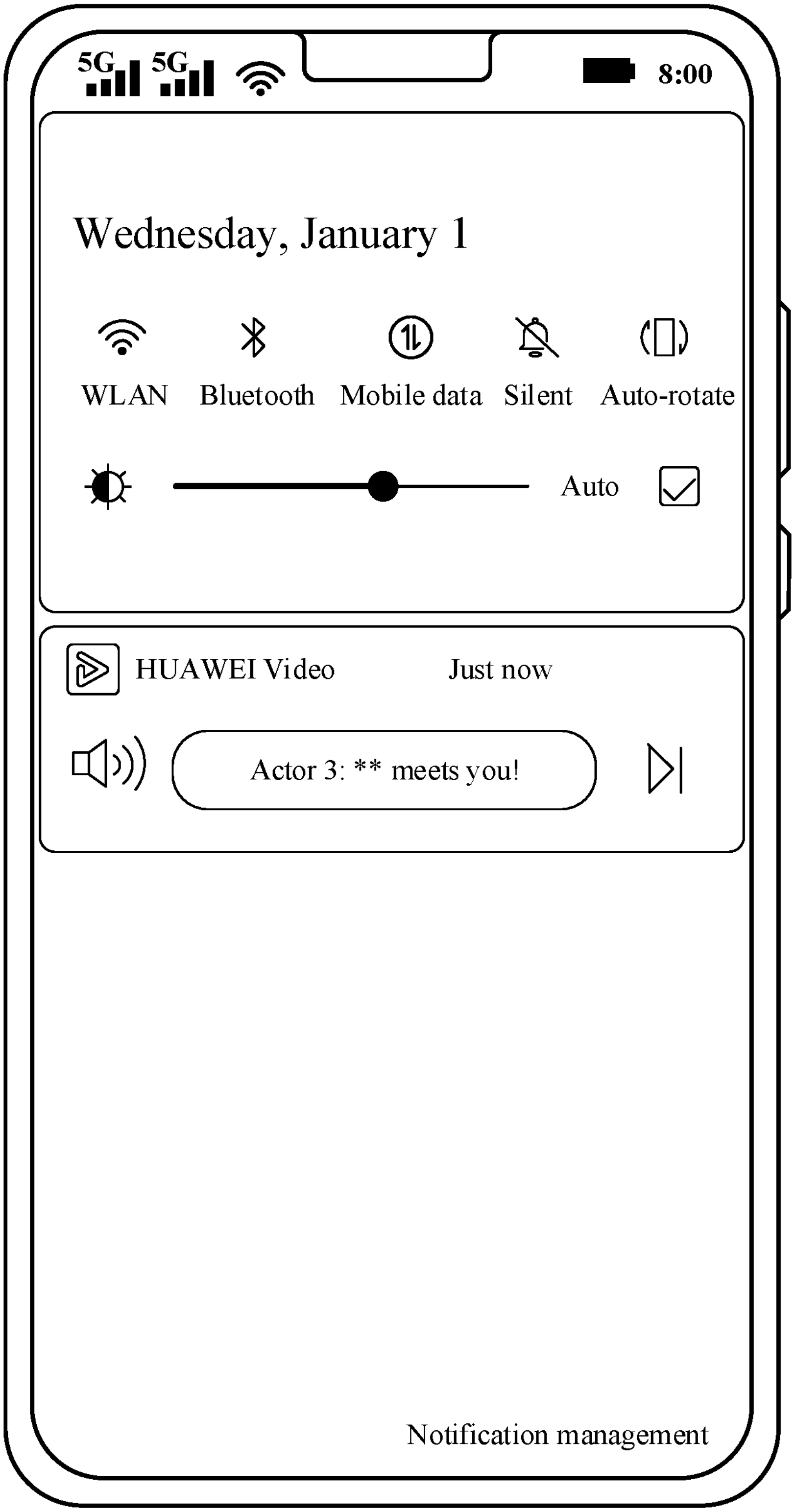

In some other embodiments, the notification message displayed by the mobile phone 1 to the user in the notification panel may further include a voice switching control (a switching control). The voice switching control is for switching between and playing voice information of different persons corresponding to a media resource reserved by the user. The voice switching control corresponds to the buttons field in the foregoing structure. In an implementation, the notification message (for example, the rich_resource field in the foregoing structure) received by the mobile phone 1 includes resource identifiers of a plurality of pieces of voice information. In response to the operation 1 of the user, the mobile phone 1 preferentially plays voice information of a favorite person of the user. Then, the mobile phone 1 plays other voice information in response to an operation performed by the user on the voice switching control. For example, a sequence of switching between and playing the other voice information by the mobile phone 1 may be sorted based on a preference degree of the user, or other voices between which the mobile phone 1 switches and that are played may be randomly selected by the mobile phone 1 from the plurality of pieces of received voice information. For example, as shown in FIG. 13(*a*), after detecting an operation of tapping a switching control 1300 by the user, the mobile phone 1 plays other voice information corresponding to the movie 1. In addition, as shown in FIG. 13(*b*), the notification title of the notification message also changes correspondingly, and then a changed notification title corresponds to voice information after switching.

Figure 14A:
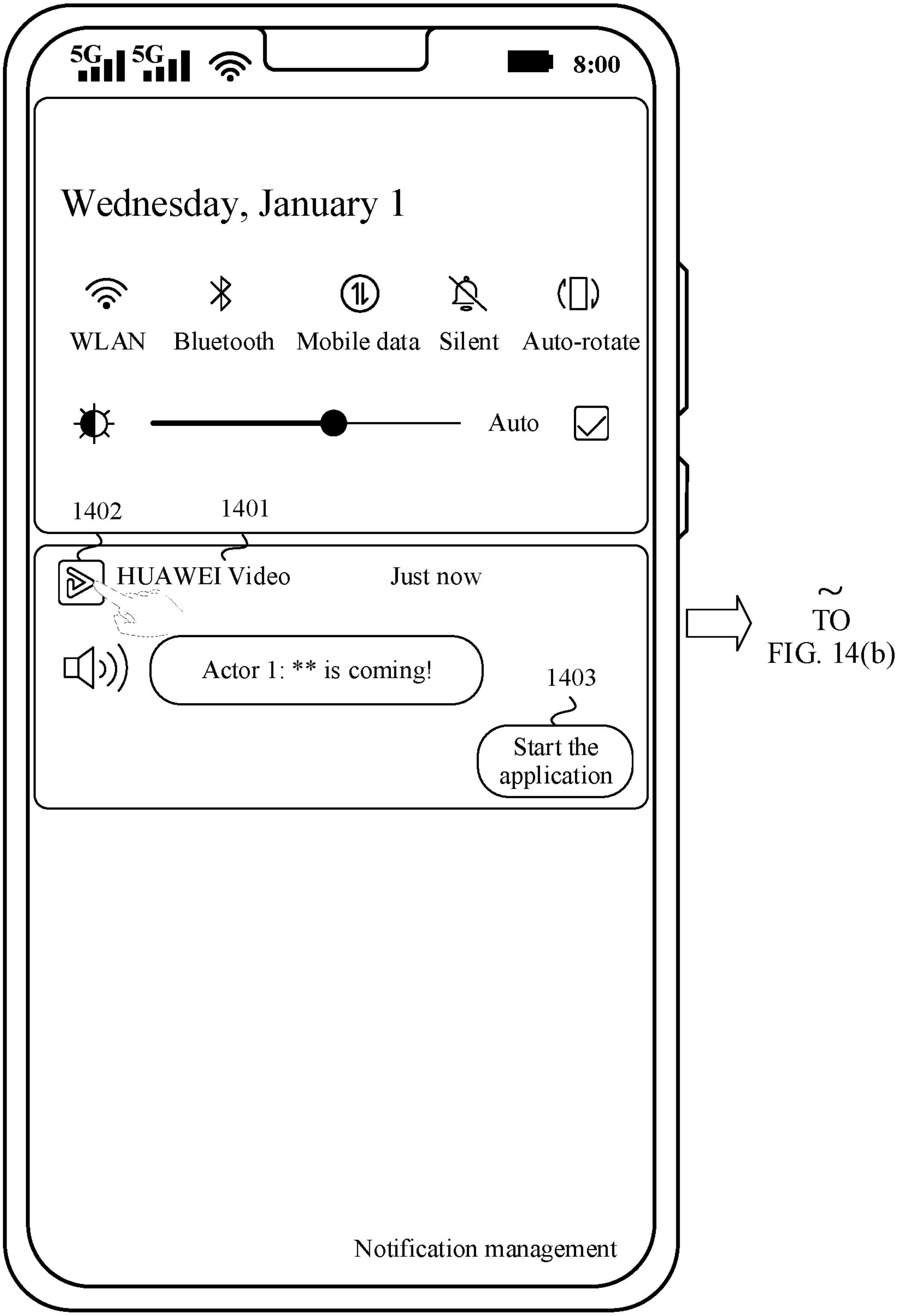
FIG. 14(*a*) and FIG. 14(*b*) are a schematic diagram of another group of interfaces according to an embodiment of this application.
Figure 14B:
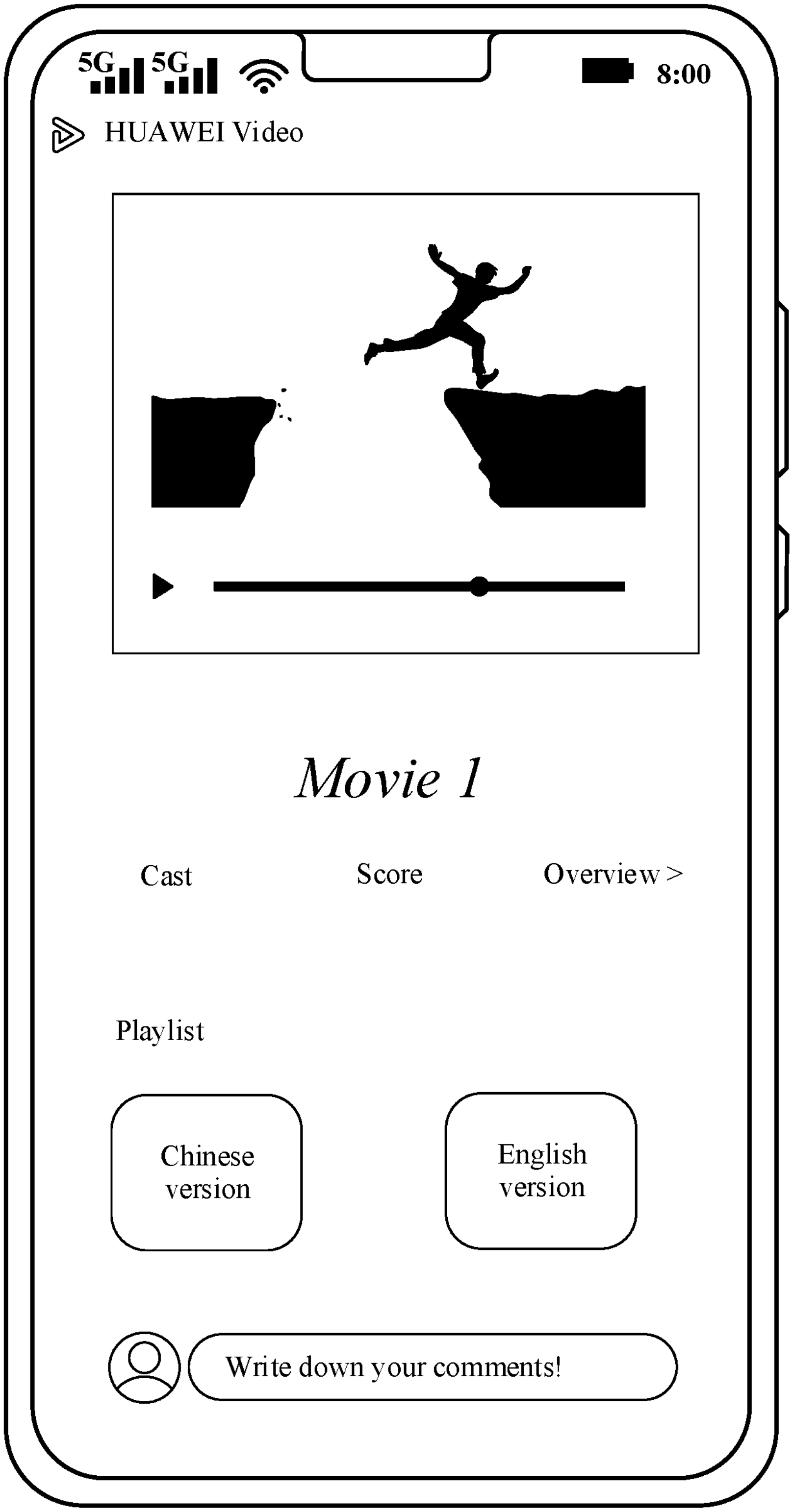

In some other embodiments, in response to an operation 2 performed by the user on the notification message, the mobile phone 1 starts the APP 1 and displays a page (which is also referred to as an application interface of the APP 1) of the APP 1. The page of the APP 1 displayed by the mobile phone 1 may be a home page of the APP 1, or may be a page corresponding to the movie 1 corresponding to the voice information, or may be another page. This is not limited. The operation 2 is different from the operation 1. For example, when the operation 1 is the operation of tapping the notification title by the user, the operation 2 is an operation of touching and holding the notification title, an operation of double-tapping the notification title, or the like that is performed by the user. For another example, as shown in FIG. 14(*a*), the operation 2 may be an operation of tapping a name 1401 of the APP 1 or an icon 1402 of the APP 1 by the user. For another example, as shown in FIG. 14(*a*), the notification panel includes a "Start the application" control 1403, and the operation 2 is an operation of tapping the control 1403 by the user. In response to the operation 2 of the user, as shown in FIG. 14(*b*), the mobile phone 1 jumps to display the page corresponding to the movie 1 in the APP 1.

Figure 15A:
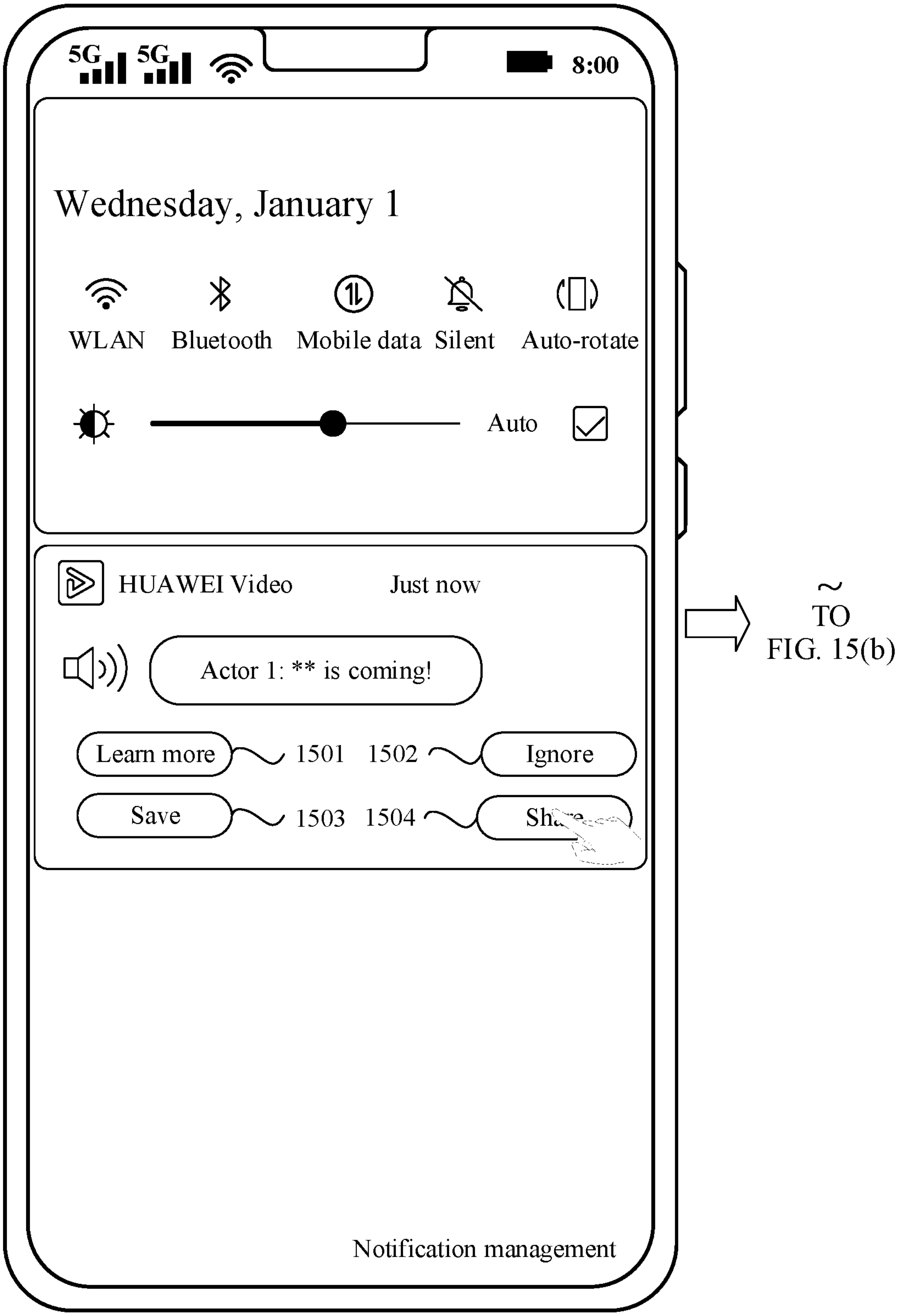
FIG. 15(*a*) and FIG. 15(*b*) are a schematic diagram of another group of interfaces according to an embodiment of this application.
Figure 15B:
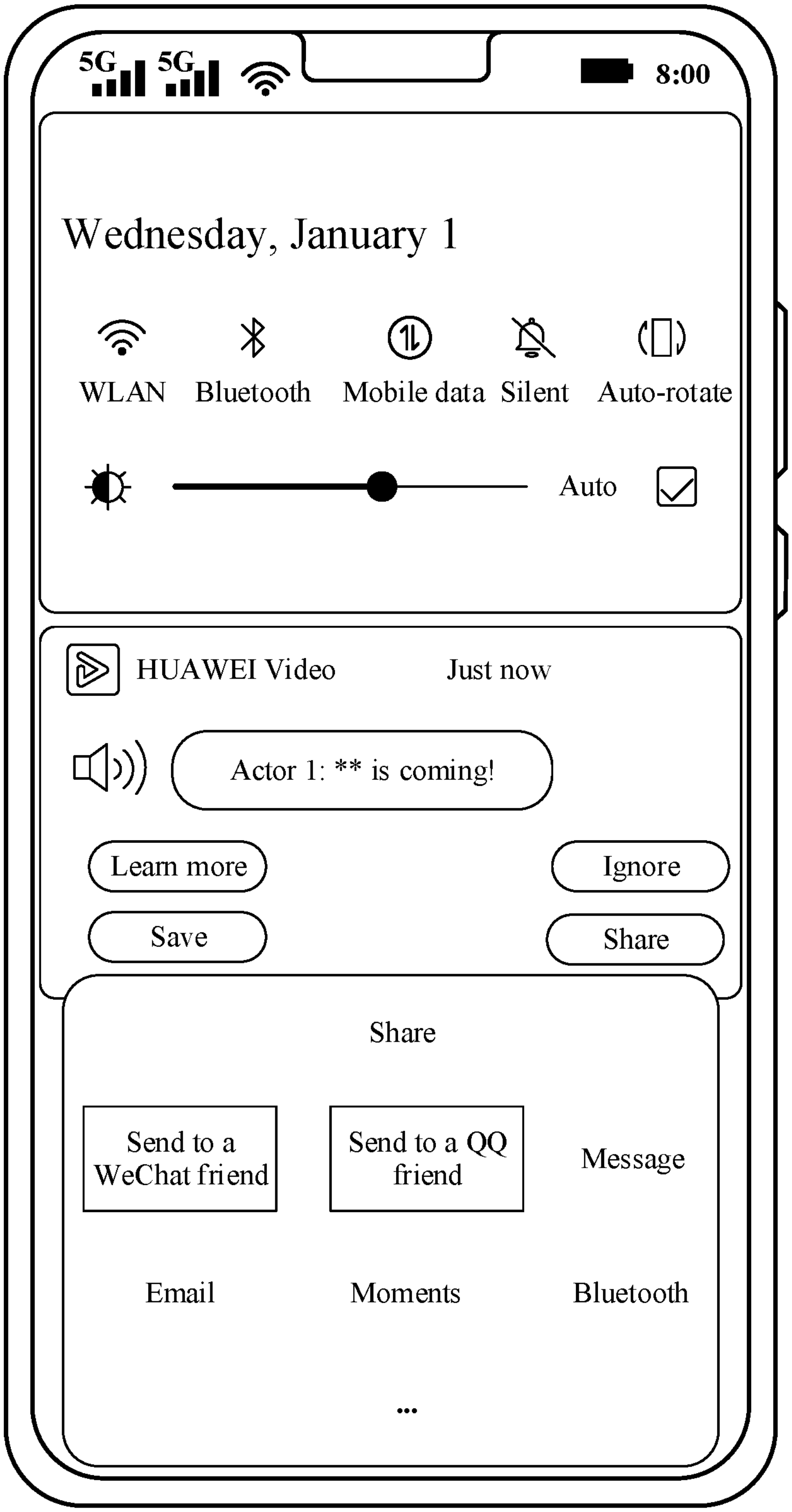

In some other embodiments, as shown in FIG. 15(*a*), the notification message displayed by the mobile phone 1 to the user in the notification panel may further include some other controls such as a Learn more control 1501, an Ignore control 1502, a Save control 1503, or a Share control 1504.

In response to an operation performed by the user on the Learn more control in the notification message, the mobile phone 1 may start the APP 1 to learn more content related to the movie 1.

In response to an operation performed by the user on the Ignore control in the notification message, the mobile phone 1 may clear the notification message from the screen, to ignore the notification message. In addition, in response to an operation of sliding left/right on the notification message by the user, the mobile phone 1 may clear the notification message from the screen, to ignore the notification message.

In response to an operation performed by the user on the Save control in the notification message, the mobile phone 1 may save the voice information in the notification message, to subsequently play the voice information again or share the voice information with another object (for example, another contact or another device).

The mobile phone 1 may share the voice information (or the notification message) with the another object in response to an operation performed by the user on the Share control in the notification message. For example, the mobile phone 1 shares the voice information (or the notification message) with another contact by using an APP (for example. WeChat R. Weibo®, or QQ®), shares the voice information (or the notification message) on Moments, or shares the voice information (or the notification message) on another public platform. Alternatively, the user may choose to share the voice information (or the notification message) with the another device by using a network (for example, a hotspot or Bluetooth) or in a transmission manner. For example, in response to an operation of tapping the Share control 1504 shown in FIG. 15(*a*) by the user, the mobile phone 1 may display a sharing list 1505 shown in FIG. 15(*b*), so that the user chooses, from the sharing list 1505, to share the voice information (or the notification message) with the another object.

Figure 16A:
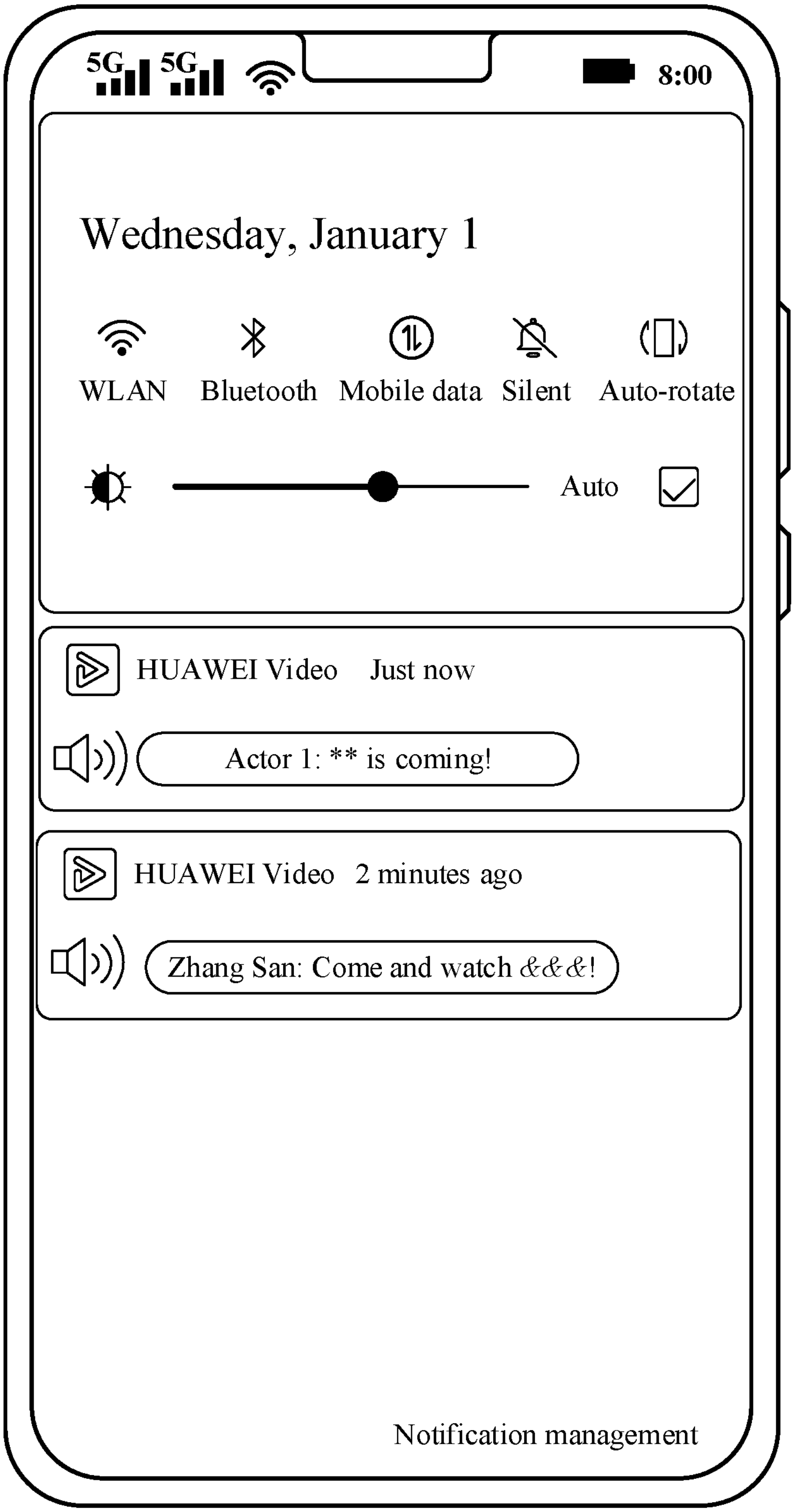
FIG. 16(*a*) to FIG. 16(*c*) are a schematic diagram of another group of interfaces according to an embodiment of this application.
Figure 16B:
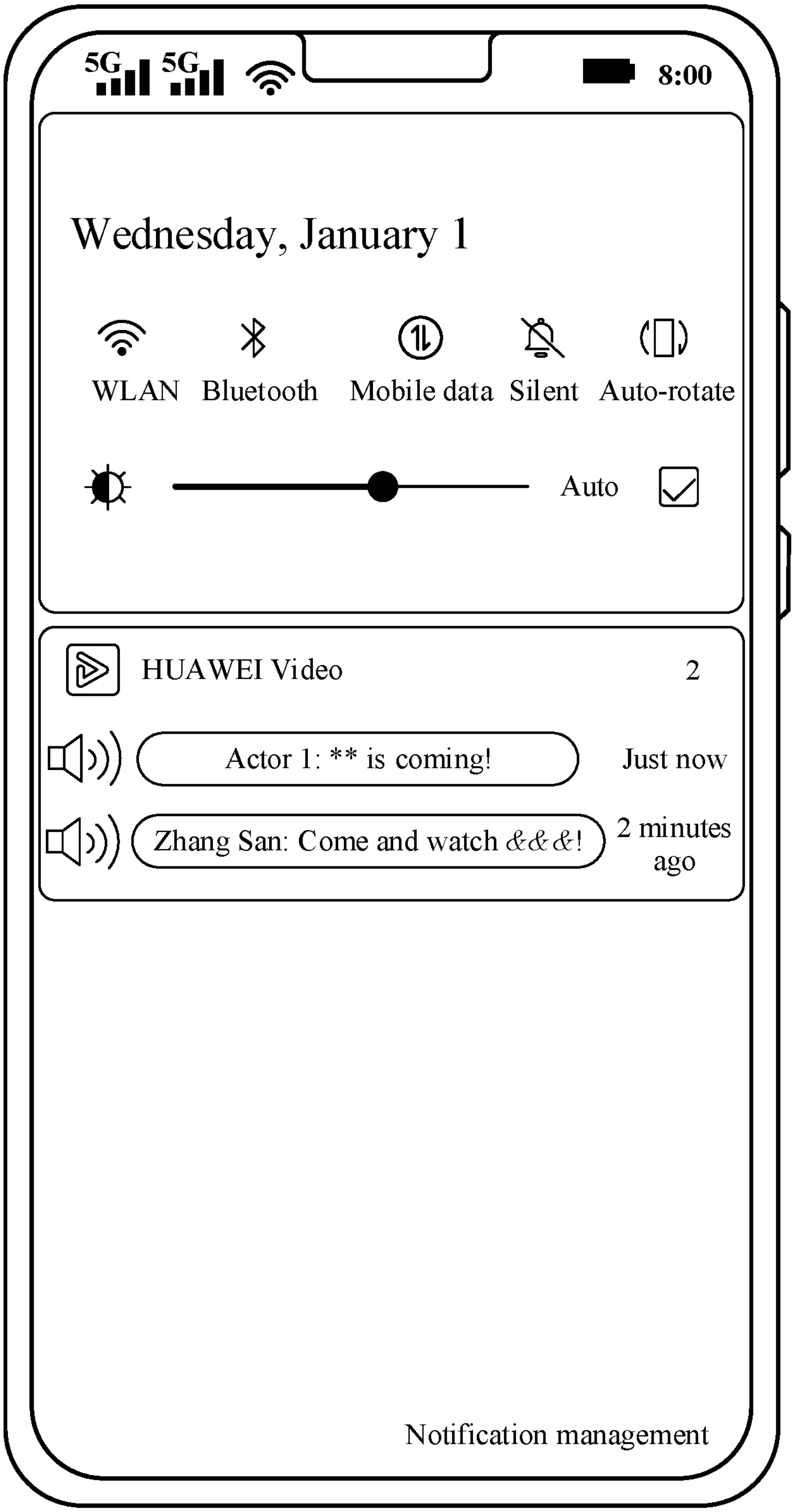
Figure 16C:
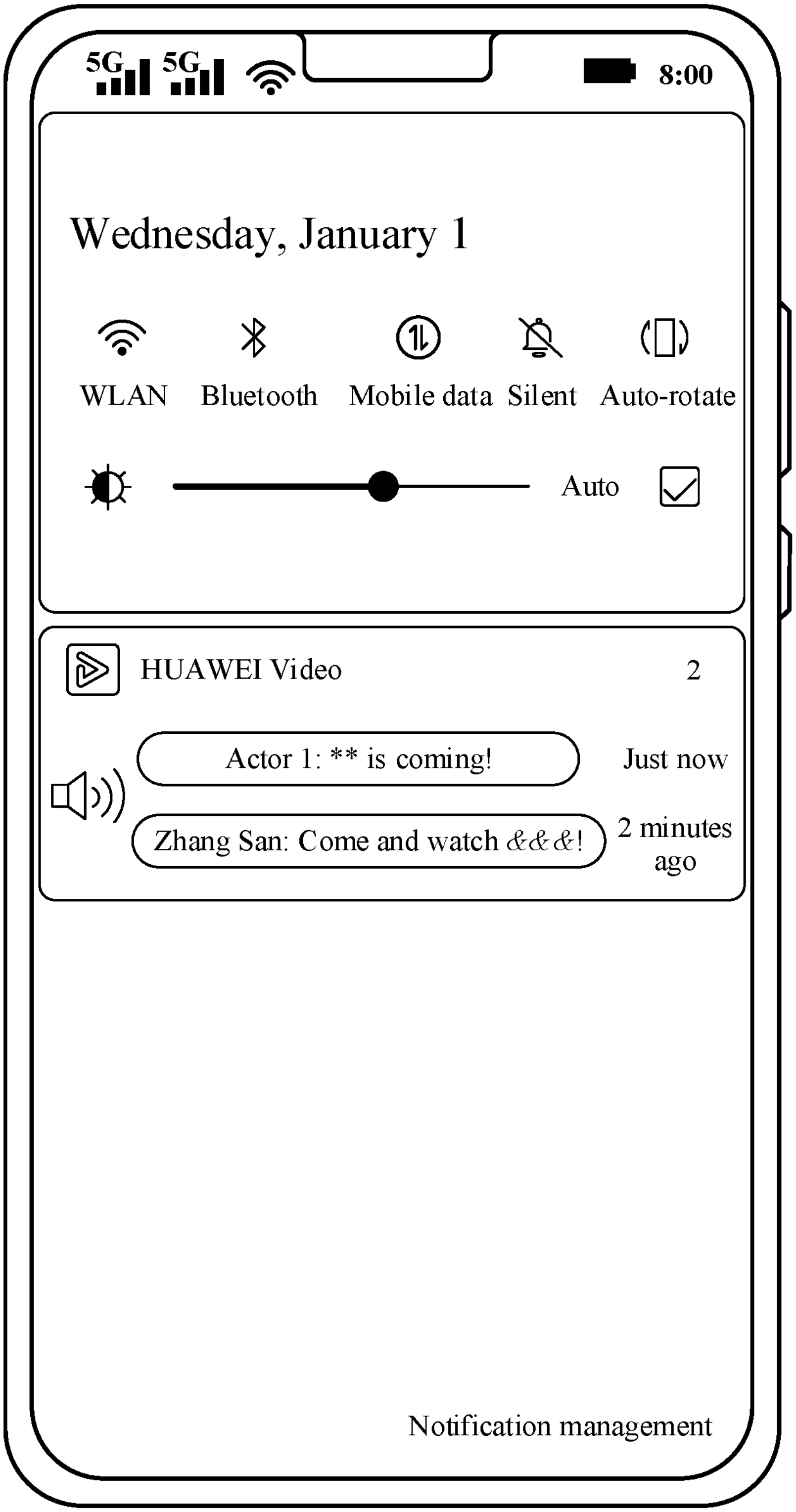

In some other embodiments, the mobile phone 1 may display, in a centralized manner, a plurality of notification messages pushed by a same APP server. For example, as shown in FIG. 16(*a*), each notification message may still be separately displayed as one card. Alternatively, the plurality of notification messages may be combined in one card for display. For example, as shown in FIG. 16(*b*) and FIG. 16(*c*), two notification messages pushed by the APP 1 may be combined for display, and a notification message after combination includes two notification titles respectively corresponding to the two notification messages before the combination. In an implementation, as shown in FIG. 16(*b*), each notification title corresponds to one play control for playing corresponding voice information. In another implementation, as shown in FIG. 16(*c*), the notification message after the combination includes one play control. After detecting an operation of tapping the play control by the user, the mobile phone 1 sequentially plays each piece of voice information in the notification message after the combination. In addition, a quantity of included messages may be further displayed in the notification message after the combination.

In some other embodiments, the notification panel includes a global play control. The mobile phone 1 may sequentially play voice information in the plurality of notification messages in the notification panel in response to an operation performed by the user on the global play control.

In some embodiments, in addition to the voice information, the notification message displayed by the mobile phone 1 to the user in the notification panel further includes notification content. The notification content may be text information corresponding to the voice information, a keyword or summary information corresponding to the voice information, or the like. The notification content may correspond to the body field in the foregoing structure. Alternatively, the notification content of the notification message includes the voice information, and the text information, the keyword, the summary information, or the like corresponding to the voice information.

In some other embodiments, the APP 1 server may also send, to the mobile phone 1 by using a notification message, voice information of a plurality of associated persons corresponding to the movie 1. The mobile phone 1/A cloud server determines a person that the user likes, and then displays, to the user in the notification panel, a notification message including a voice of the person that the user likes, but no longer displays, to the user, a notification message including a voice of another person. For example, the mobile phone 1/cloud server may determine the person that the user likes based on user behavior information in a process of using the mobile phone 1 (for example, in a process of using each APP) by the user. For example, the mobile phone 1 determines that videos related to a person 1 are played the largest quantity of times when the user plays videos by using various video playing APPs, to determine that the user likes the person 1. Then, the mobile phone 1 displays, to the user, a notification message including a voice of the person 1.

Figure 17A:
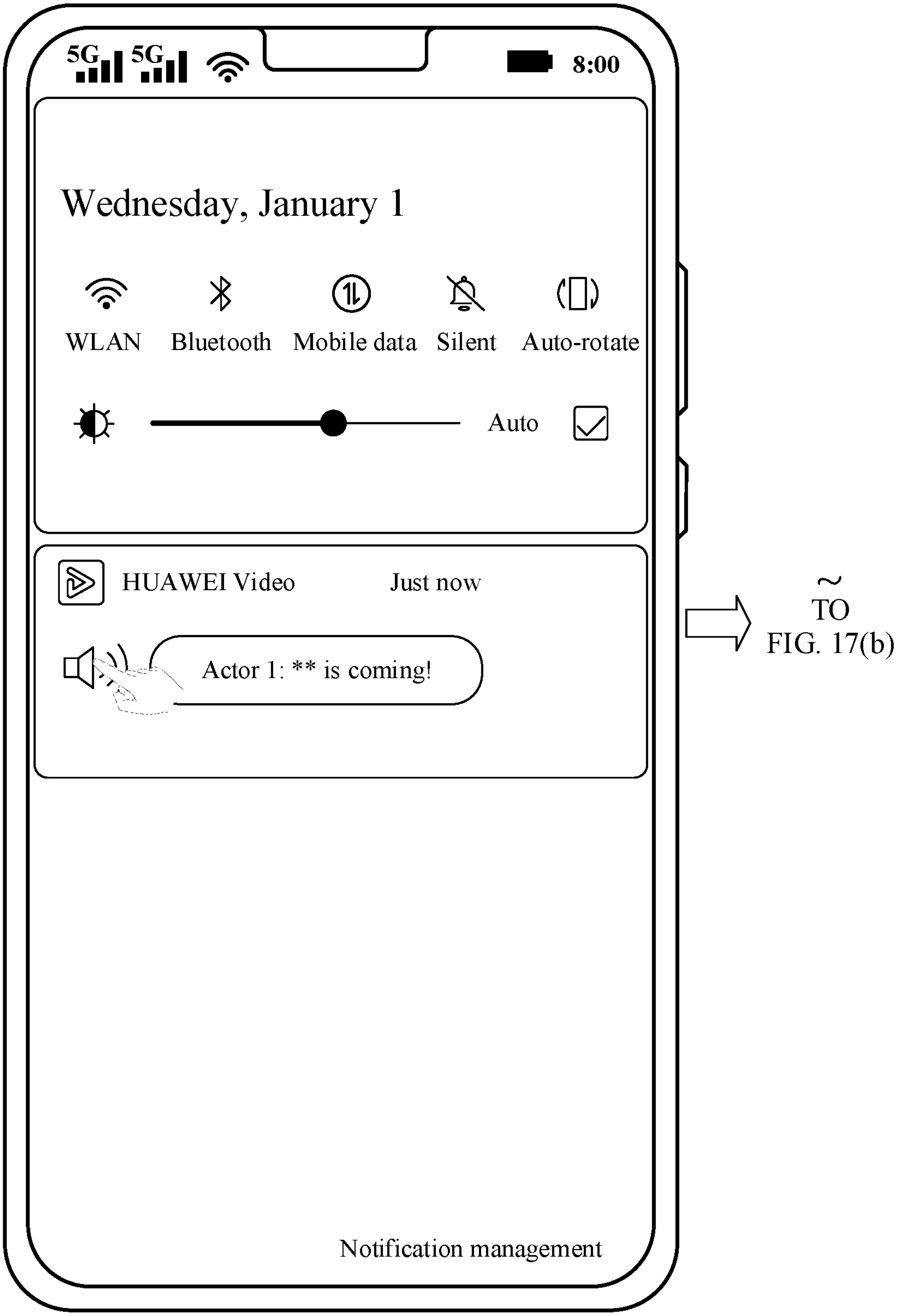
FIG. 17(*a*) and FIG. 17(*b*) are a schematic diagram of another group of interfaces according to an embodiment of this application.
Figures 17A, 17B:
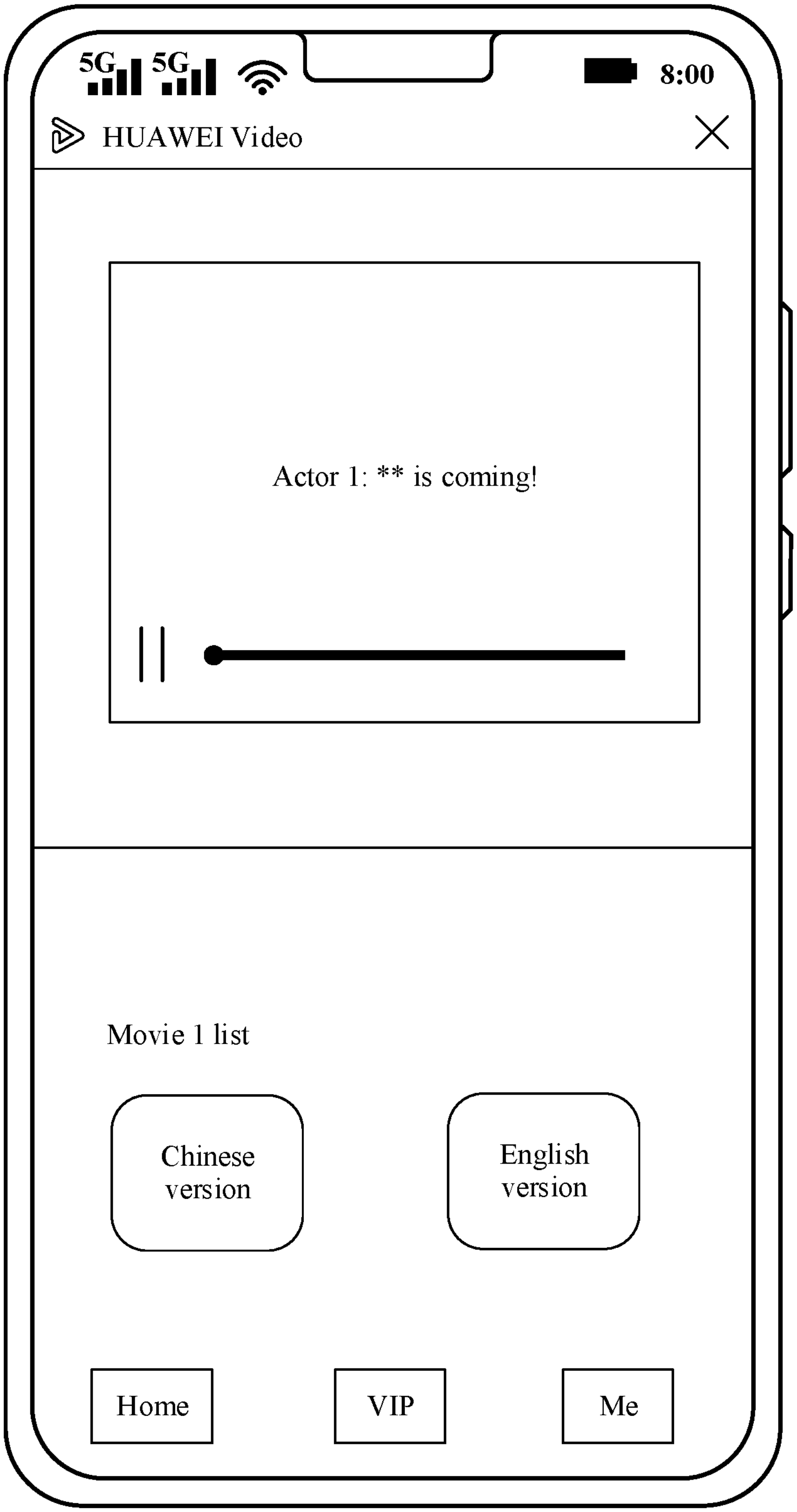

In some other embodiments, after detecting the operation 1 performed by the user on the notification message, the mobile phone 1 starts the APP 1, and plays the voice information in the notification message by using the APP 1. In this case, in the click_action field in the foregoing structure, a value of type2 may be 2. That is, it indicates that the voice information is played by using the APP 1 corresponding to the notification message. For example, after the mobile phone 1 detects an operation of tapping the play control in the notification message shown in FIG. 17(*a*) by the user, as shown in FIG. 17(*b*), the mobile phone 1 starts the APP 1 and plays the voice information in the notification message by using the APP 1. After starting the APP 1, the mobile phone 1 may automatically start to play the voice information, or may start to play the voice information after detecting an operation of a play indication of the user. After playing of the voice information is completed, the mobile phone 1 may continue to stay in the APP 1, so that the user can play another audio or watches a movie; or may return to a previous interface by using a return control, a close control, or the like.

Figure 18A:
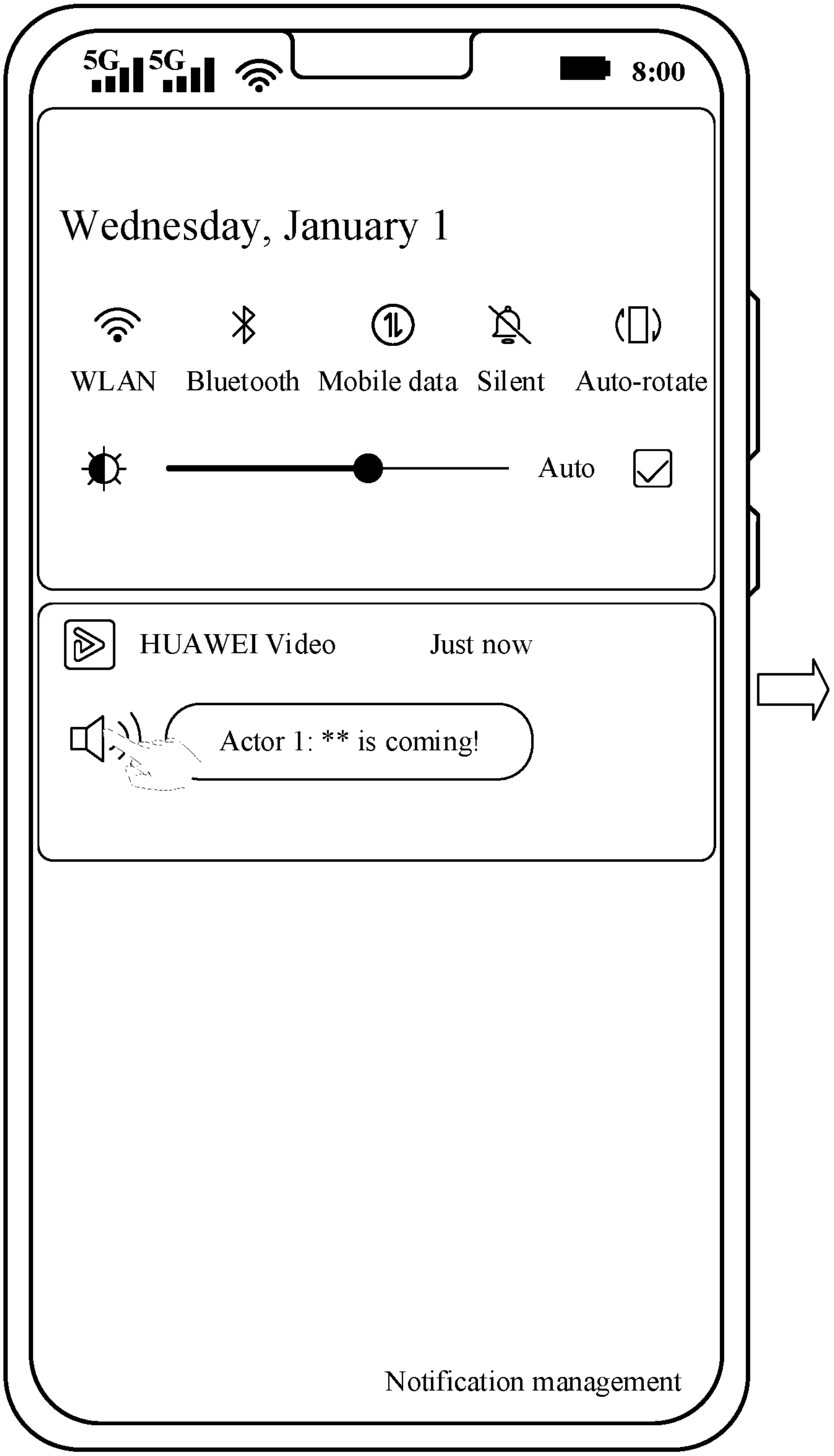
FIG. 18(*a*) to FIG. 18(*c*) are a schematic diagram of another group of interfaces according to an embodiment of this application.
Figure 18B:
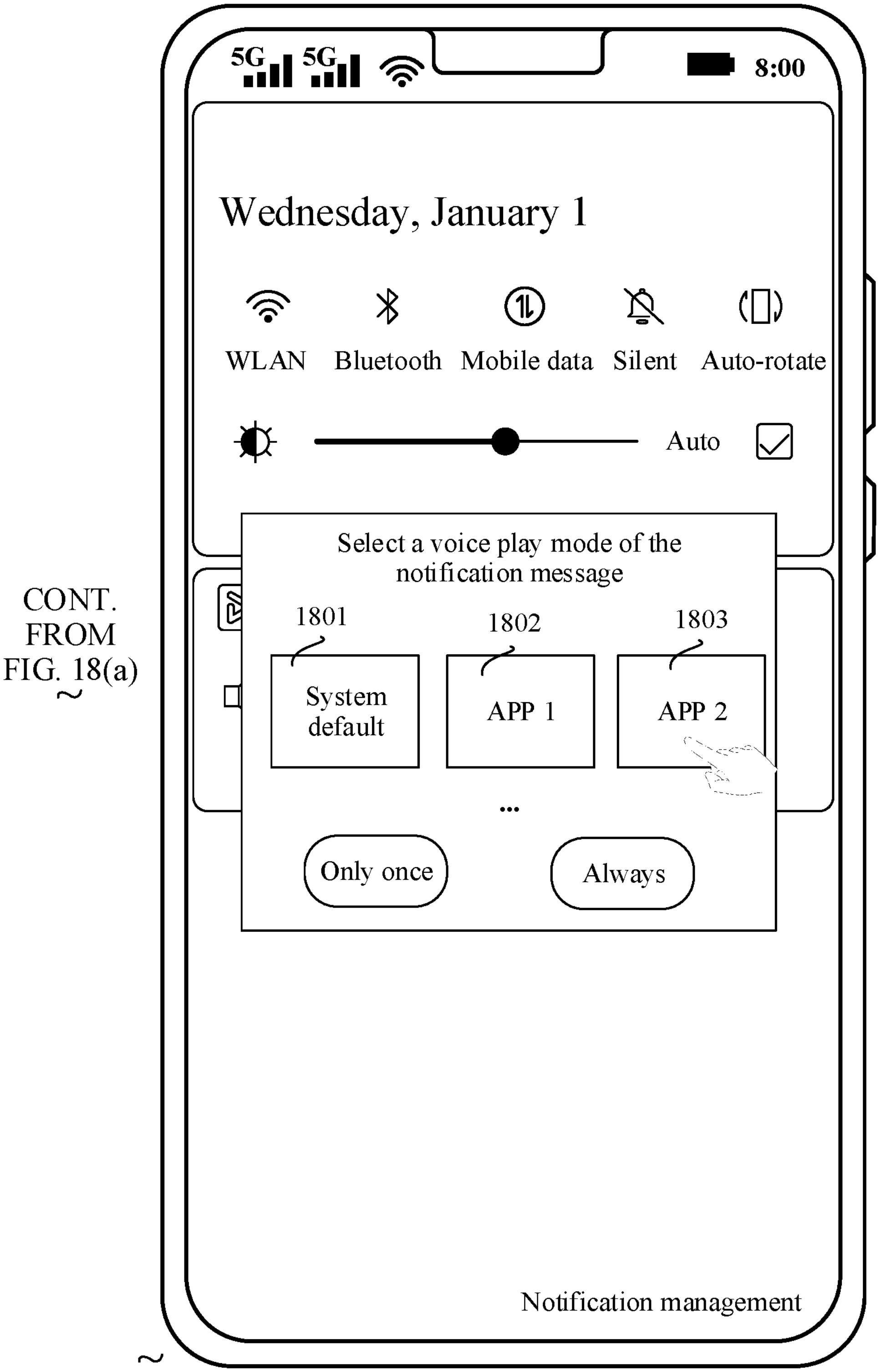
Figures 18B, 18C:
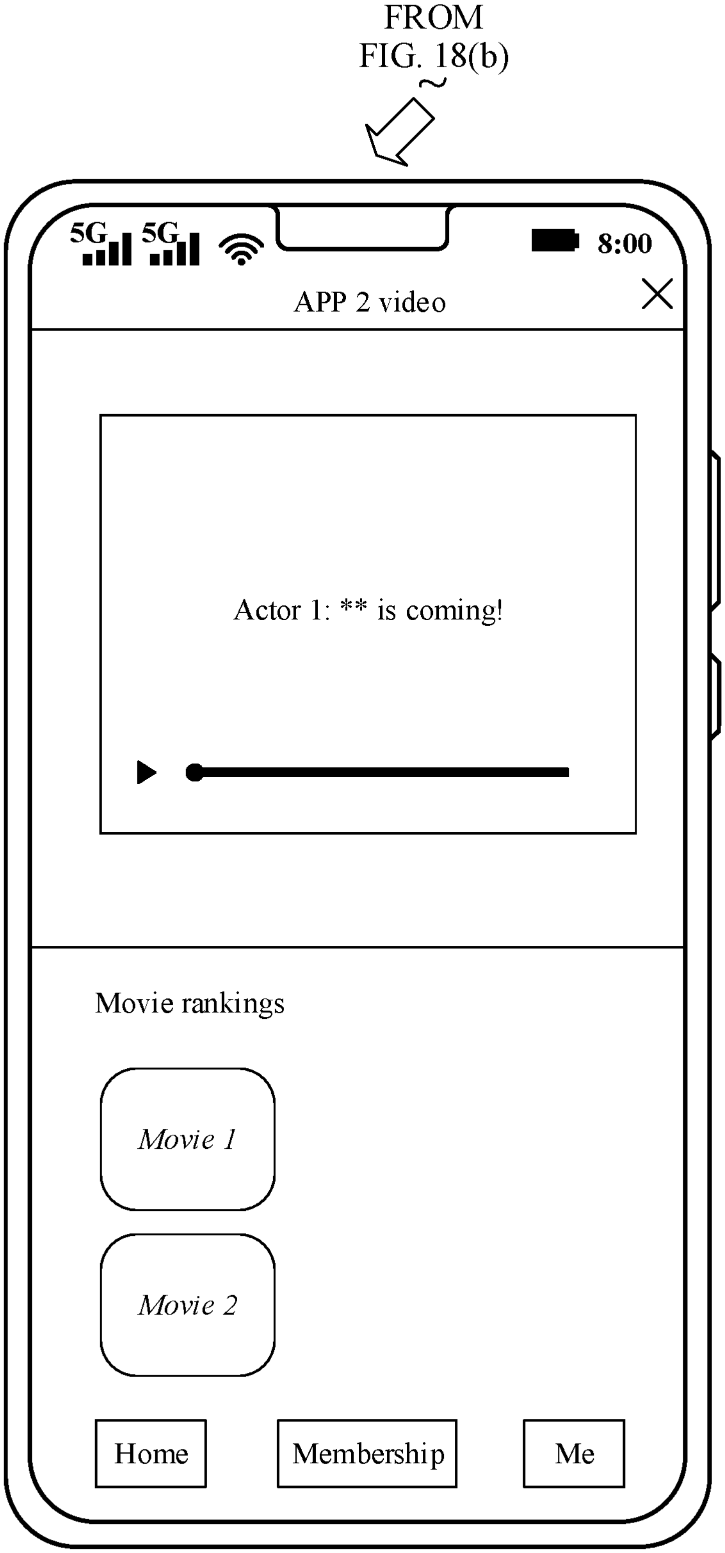

In some other embodiments, after detecting the operation 1 performed by the user on the notification message, the mobile phone 1 displays a play mode list for user selection. This can improve flexibility of playing the voice information. For example, after the mobile phone 1 detects an operation of tapping the play control in the notification message shown in FIG. 18(*a*) by the user, as shown in FIG. 18(*b*), the mobile phone 1 displays the play mode list of the voice information. The play mode list may include a play mode 1801 of a default audio player of a system, a play mode 1802 of the current APP 1, and a play mode 1803 of another audio player like an APP 2 supported by the system. This facilitates user selection. The default audio player of the system, the current APP 1, and the another audio player supported by the system are all applications. In other words, the play mode list includes a plurality of applications for playing the voice information. In this case, in the click_action field in the foregoing structure, a value of type2 may be 3. That is, it indicates that the user can select a play mode of the voice information from the list. In response to an operation of selecting the play mode 1801 shown in FIG. 18(*b*) by the user, the mobile phone 1 plays the voice information in the notification message by using an operating system basic capability of the mobile phone 1. In response to an operation of selecting the play mode 1802 shown in FIG. 18(*b*) by the user, the mobile phone 1 plays the voice information in the notification message by using the APP 1. In response to an operation of selecting the play mode 1803 shown in FIG. 18(*b*) by the user, as shown in FIG. 18(*c*), the mobile phone 1 starts the APP 2, displays a page of the APP 2, and plays the voice information in the notification message by using the APP 2 corresponding to the play mode 1803. After playing of the voice information is completed, the mobile phone 1 may continue to stay in the APP 2, so that the user can play another audio or watches a movie: or may return to a previous interface by using a return control, a close control, or the like.

The mobile phone 1 may identify a file type based on information such as a file suffix or a file name of the resource identifier. The file type is a text, an audio, a video, or another format. For example, the resource identifier is a URI, and a file suffix of the URI is ".mp3". In this case, the mobile phone 1 identifies, based on the suffix, that the file type is an audio. The mobile phone 1 obtains, based on a configuration file (for example. AndroidManifest.xml) of an operating system, a list of supported APPs, such as Storm Player® and MX Player®, corresponding to the file type. The mobile phone 1 displays a play mode list that supports opening the file type. The play modes include Storm Player, MX Player, and an audio player provided by the system. After the user selects a play mode like Storm Player, the mobile phone 1 starts Storm Player and transfers the URI, and then Storm Player accesses the URI to obtain corresponding voice information for playing.

In some embodiments, when displaying the play mode list for user selection, the mobile phone 1 may further prompt the user whether the voice information is always played in the play mode or the voice information is played in the play mode only once.

In some other embodiments, when the mobile phone 1 plays the voice information in the notification message in a specific play mode, the user may select or switch a play mode type of the voice information in the notification message. This can improve flexibility of playing the voice information. In this case, in the click_action field in the foregoing structure, a value of type2 may be empty: or a value of type2 may be 1 or (or) 2 or (or) 3. In a possible implementation, an interface of a system setting application may include a play mode type list. The type list includes a type of the default audio player of the system, a type of an APP corresponding to the notification message, a type of the play mode list, and the like. The user can specify, in the system setting application, a play mode type of the voice information in the notification message. After detecting the operation 1 performed by the user on a notification message 1, the mobile phone 1 plays the voice information by using the play mode type specified by the user.

In some other embodiments, the structure for carrying the notification message includes the click_action field, and the user customizes (for example, sets a play mode in the APP 1 or sets a play mode in a system application) a play mode of the voice information on the mobile phone 1. In this case, in an implementation, the voice information is played in a play mode specified by the click_action field. In another implementation, the voice information is played in the play mode customized by the user on the mobile phone 1.

In some other embodiments, the structure for carrying the notification message does not include the click_action field. The mobile phone 1 may play the voice information in the notification message in the play mode customized by the user on the mobile phone 1.

In another possible implementation, if the mobile phone 1 detects an operation of tapping the notification title/play control by the user, the voice information is played by using the play mode type indicated by the click_action field in the structure. If the mobile phone 1 detects an operation of touching and holding the notification title/play control by the user, the play mode type list is played, so that the user switches to another play mode in the list for playing.

Figure 19A:
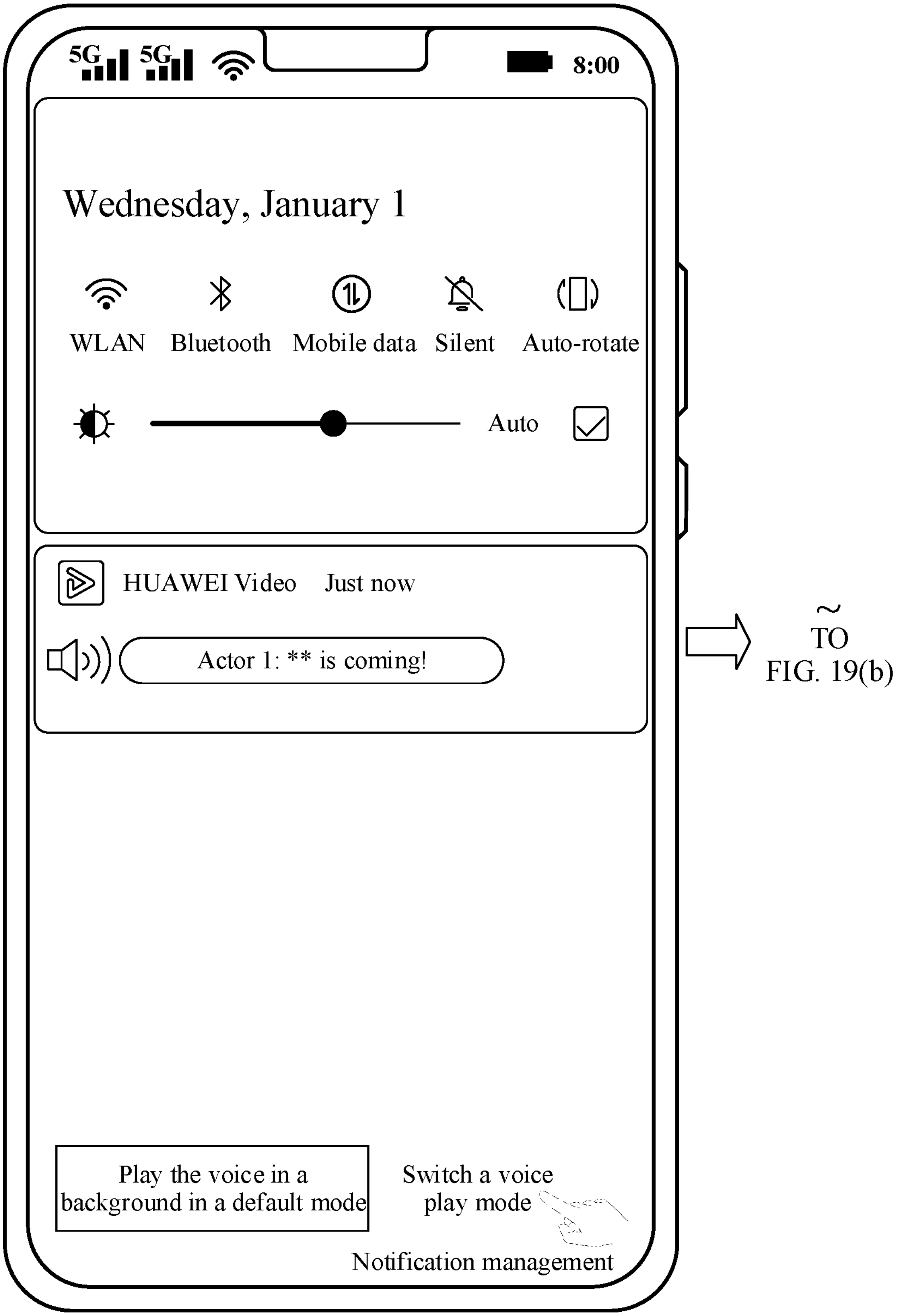
FIG. 19(*a*) and FIG. 19(*b*) are a schematic diagram of another group of interfaces according to an embodiment of this application.
Figure 19B:
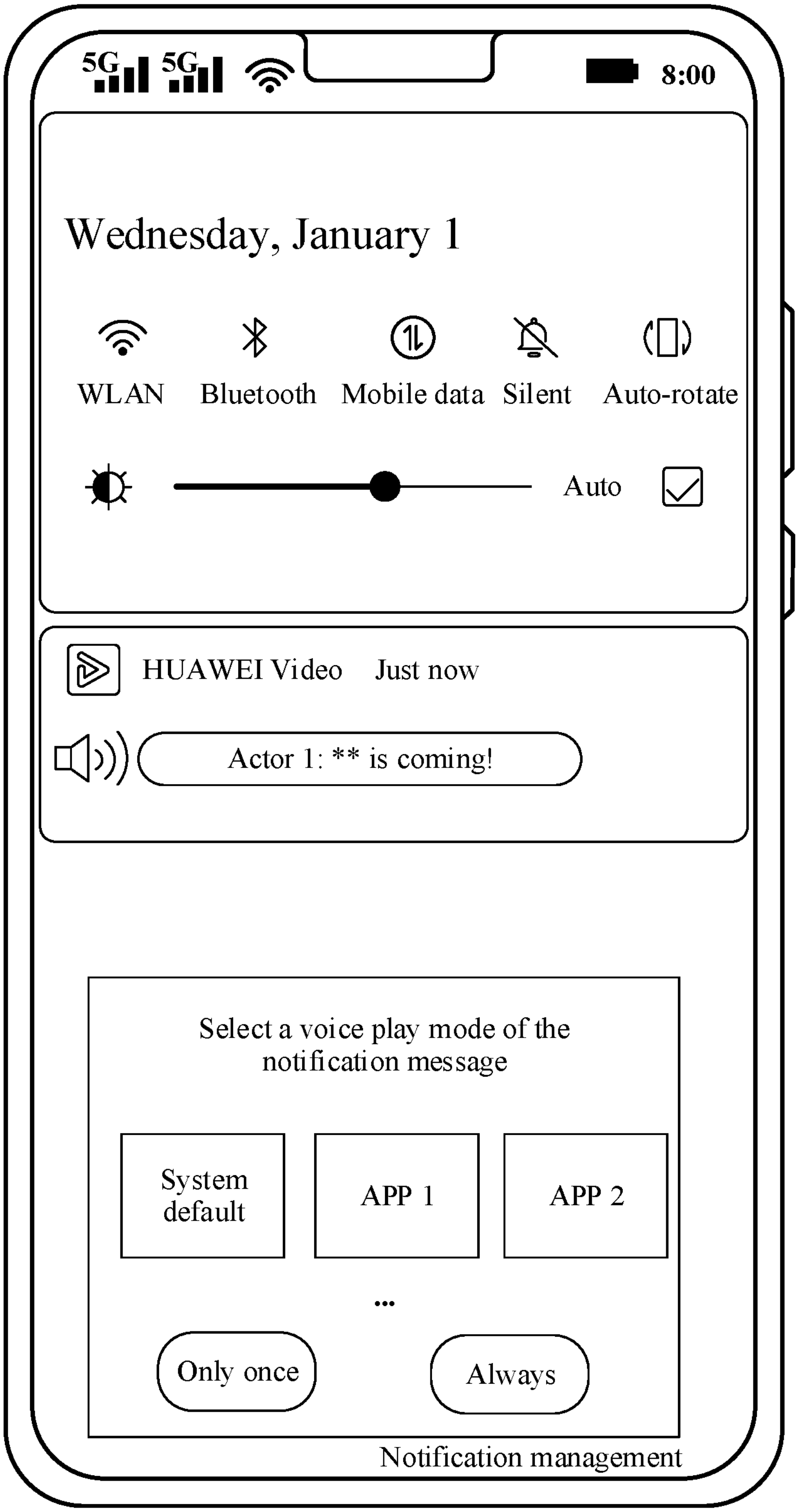

In another possible implementation, the notification message displayed by the mobile phone 1 to the user in the notification panel includes a play type control/type switching control. The mobile phone 1 may display the play mode type list in response to an operation performed by the user on the play type control/type switching control, so that the user switches to another play mode in the list for playing. In addition, the mobile phone 1 may further prompt the user with the currently used play mode of the voice information in the notification message. For example, as shown in FIG. 19(*a*), the mobile phone 1 prompts, by using a control 1901, the user that the voice information in the notification message is played in the background currently in a system default mode. After detecting an operation of tapping a type switching control 1902 by the user, as shown in FIG. 19(*b*), the mobile phone 1 displays the play mode type list of the voice information.

Descriptions are provided above by using an example in which the notification message includes rich media information, and the rich media information includes voice information (which may also be referred to as a voice notification message). In some other embodiments, the notification message may further include rich media information of another type, for example, a notification message including video information (which may also be referred to as a video notification message) or a notification message including animated image information (which may also be referred to as an animated image notification message). Similarly to the case that the notification message includes the voice information, when the notification message includes the video information, the method provided in the foregoing embodiments of this application may still be used to push the message. A difference is described below:

In some embodiments, the notification message displayed by the mobile phone 1 to the user in the notification panel may further include prompt information of the video information. For example, the prompt information is a thumbnail 2000 shown in FIG. 20A (a). The mobile phone 1 may play the video information in the notification message in response to an operation performed by the user on the thumbnail 2000.

Similar to playing the voice information in the notification message, the mobile phone 1 may play the video information in the notification message in a default video play mode (for example, a default application of the system) of the system, by using the APP 1 for pushing the notification message, or by using another application (for example, the APP 2) that can play a video and that is supported by the system.

Figure 20A:
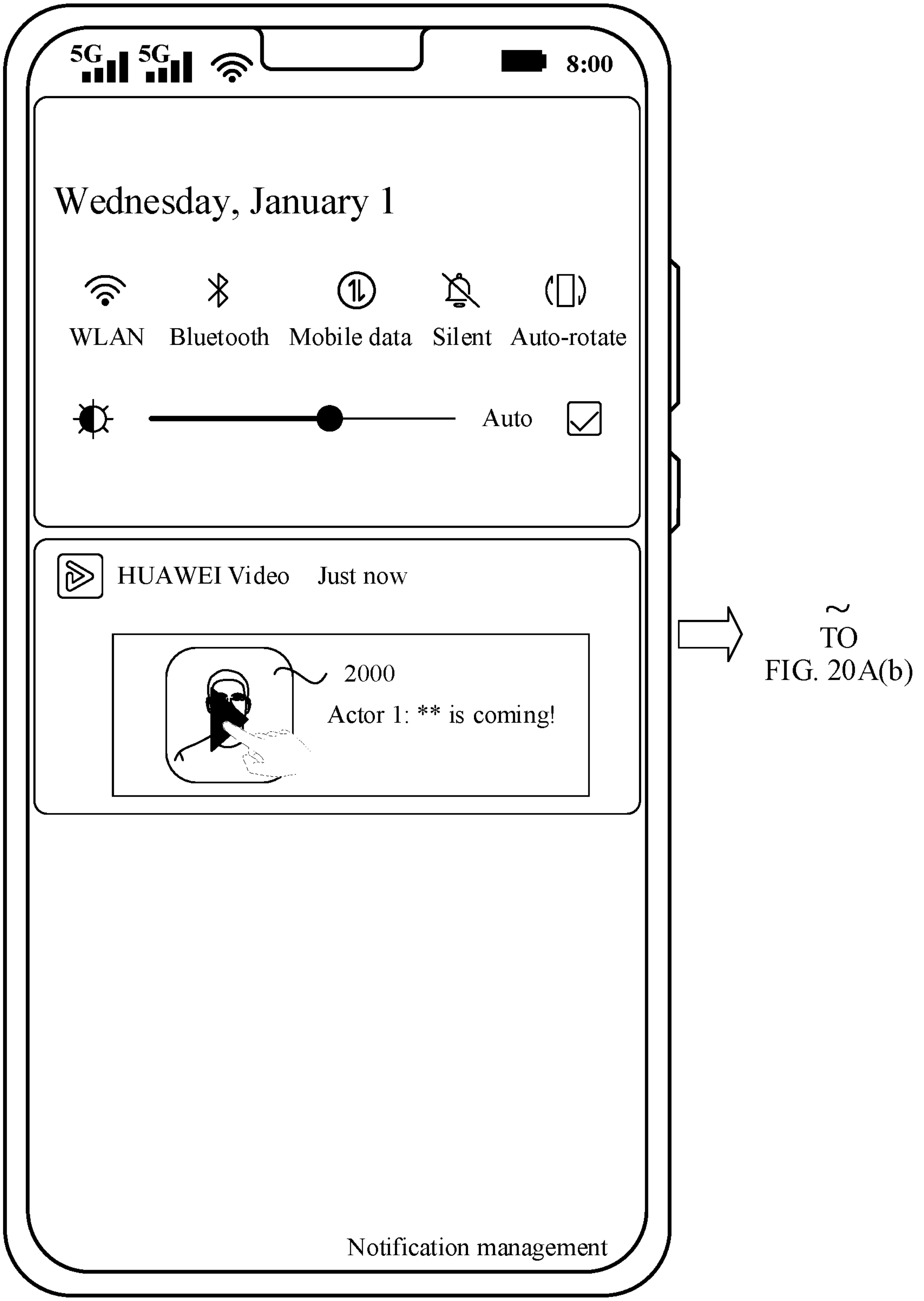
FIG. 20A(a) to FIG. 20A(d) are a schematic diagram of another group of interfaces according to an embodiment of this application.
Figure 20A:
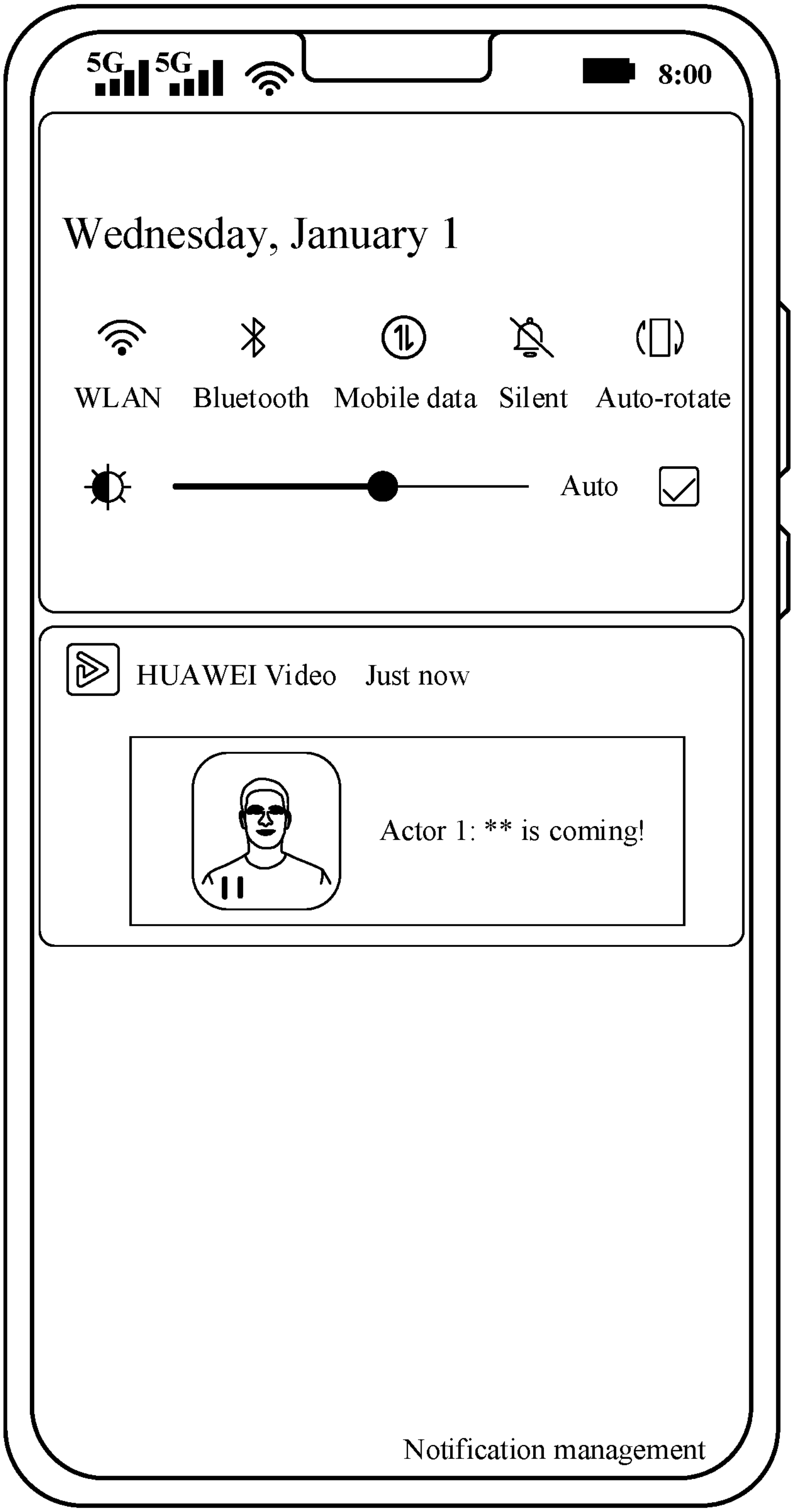
Figure 20A:
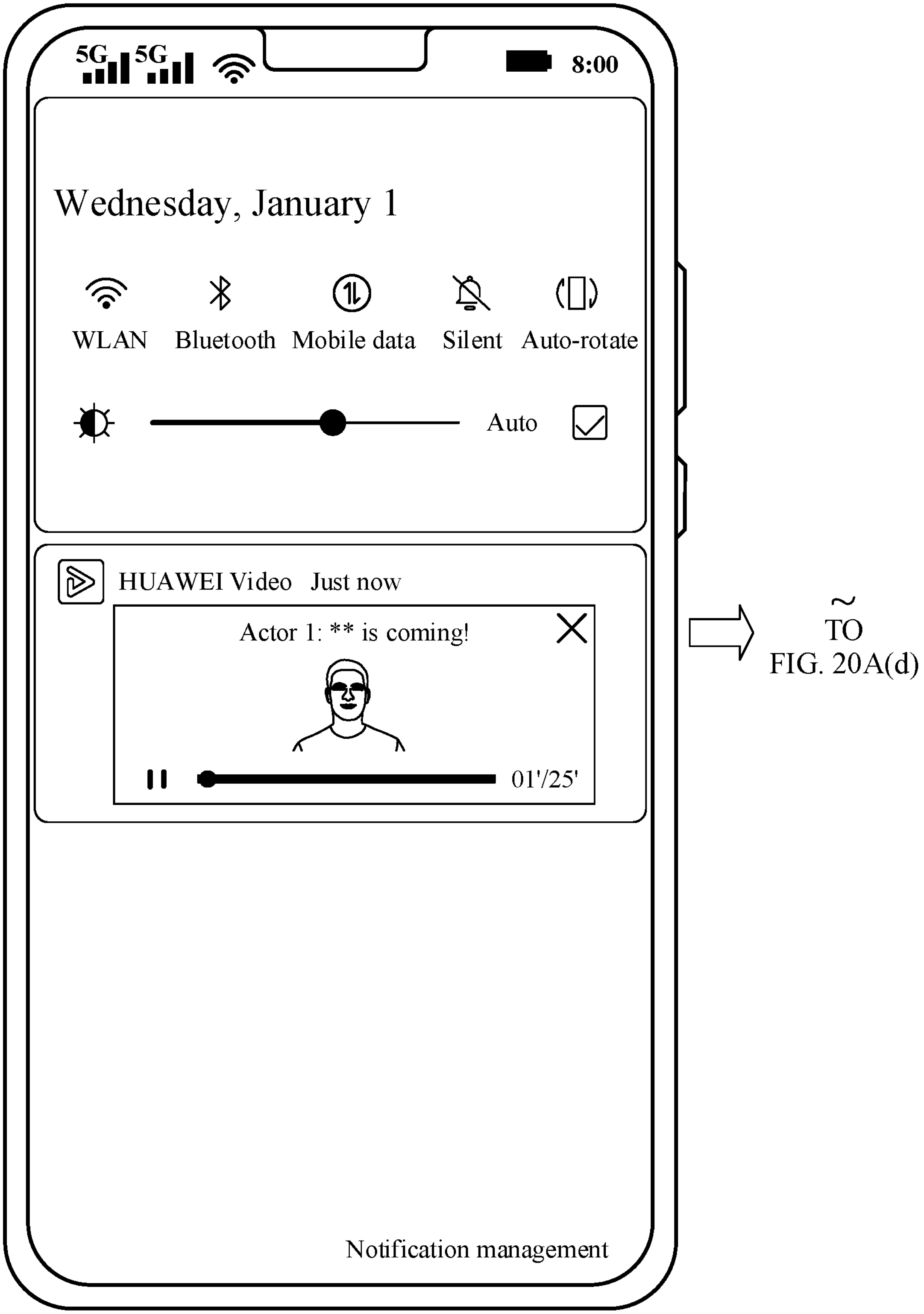
Figure 20A:
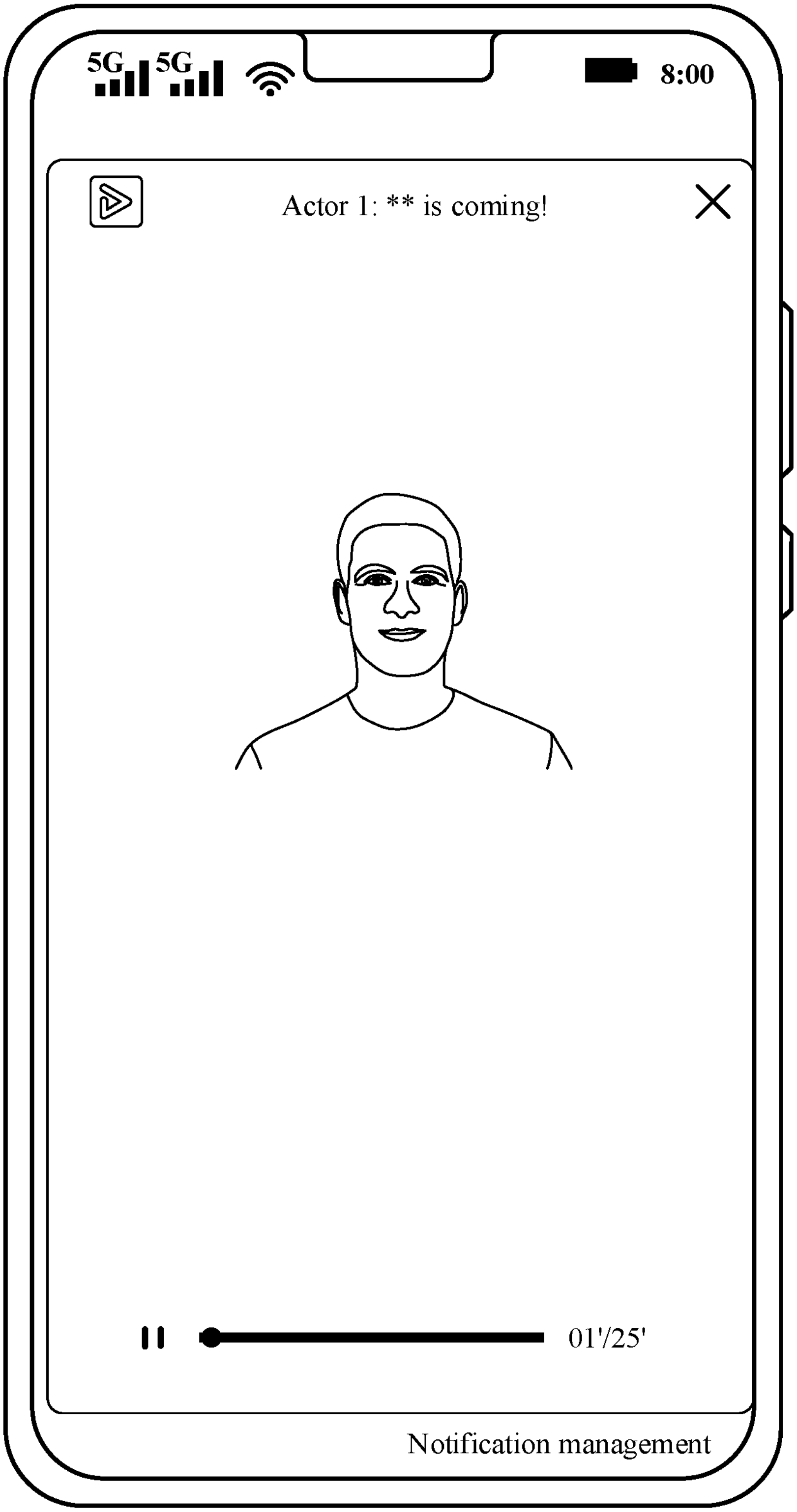

In an embodiment of this application, when the mobile phone 1 plays the video information, the video information may be played in a small window (for example, the window is located at a location of the thumbnail) in the notification message on the screen (as shown in FIG. 20A (b)), or may be played in a large window (as shown in FIG. 20A (c)), or may be played in a full-screen window (as shown in FIG. 20A(d)). This is not limited. In response to an operation of the user, the mobile phone 1 may switch between the windows for playing the video information in the notification message. In addition, a play window may further include a pause control, a next control, a play progress bar, a full-screen/small-window switching control, and the like.

In some embodiments, after playing of the video information in the notification message is completed, the mobile phone 1 automatically closes the play window.

In some other embodiments, after playing of the video information in the notification message is completed, the mobile phone 1 does not automatically close the play window, and the pause control may be switched to a play control/replay control. If duration in which the playing is stopped is greater than preset duration, the play window is automatically closed. Alternatively, the play window needs to be manually closed by the user.

Figure 20B:
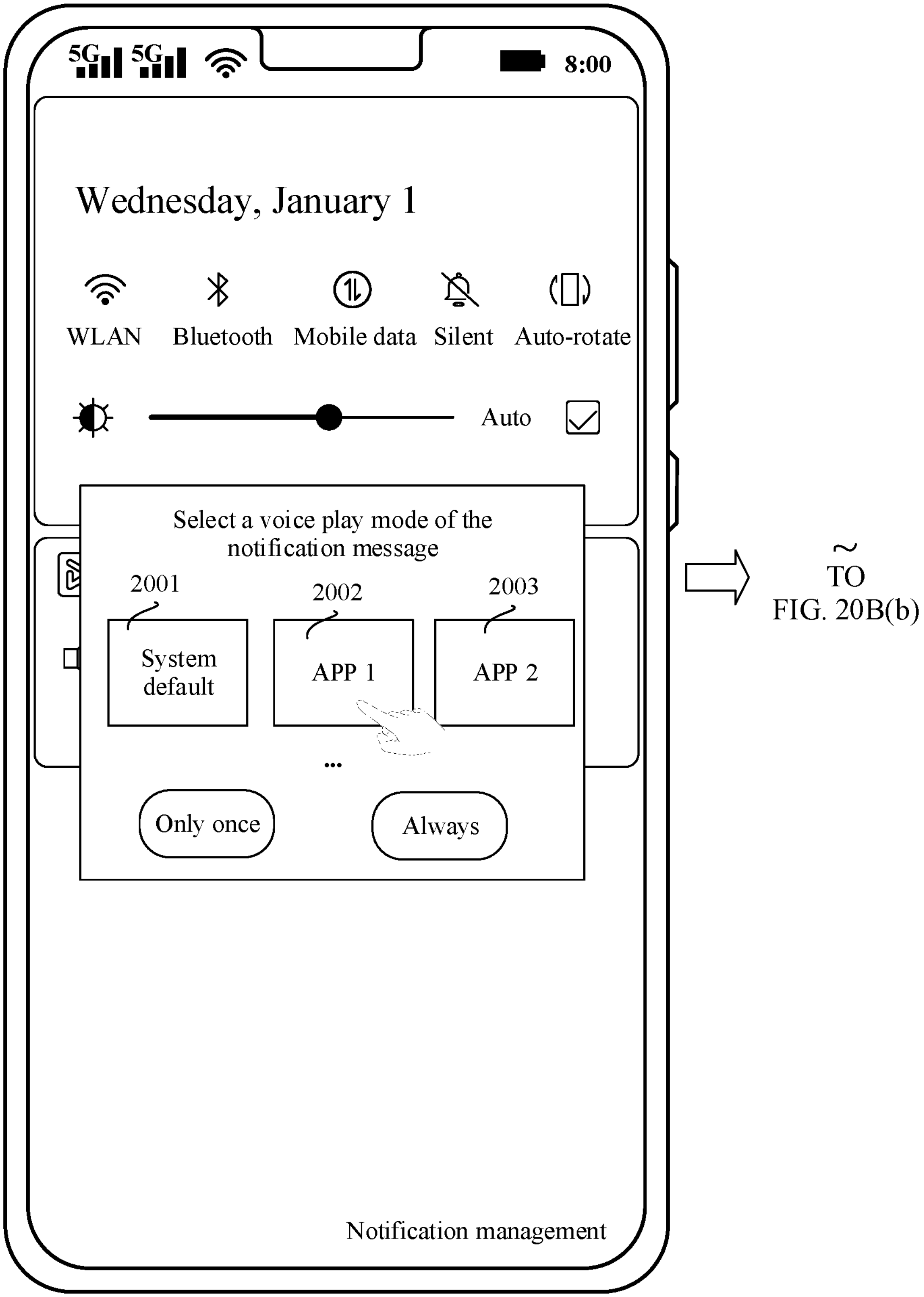
FIG. 20B(a) and FIG. 20B(b) are a schematic diagram of another group of interfaces according to an embodiment of this application.
Figure 20B:
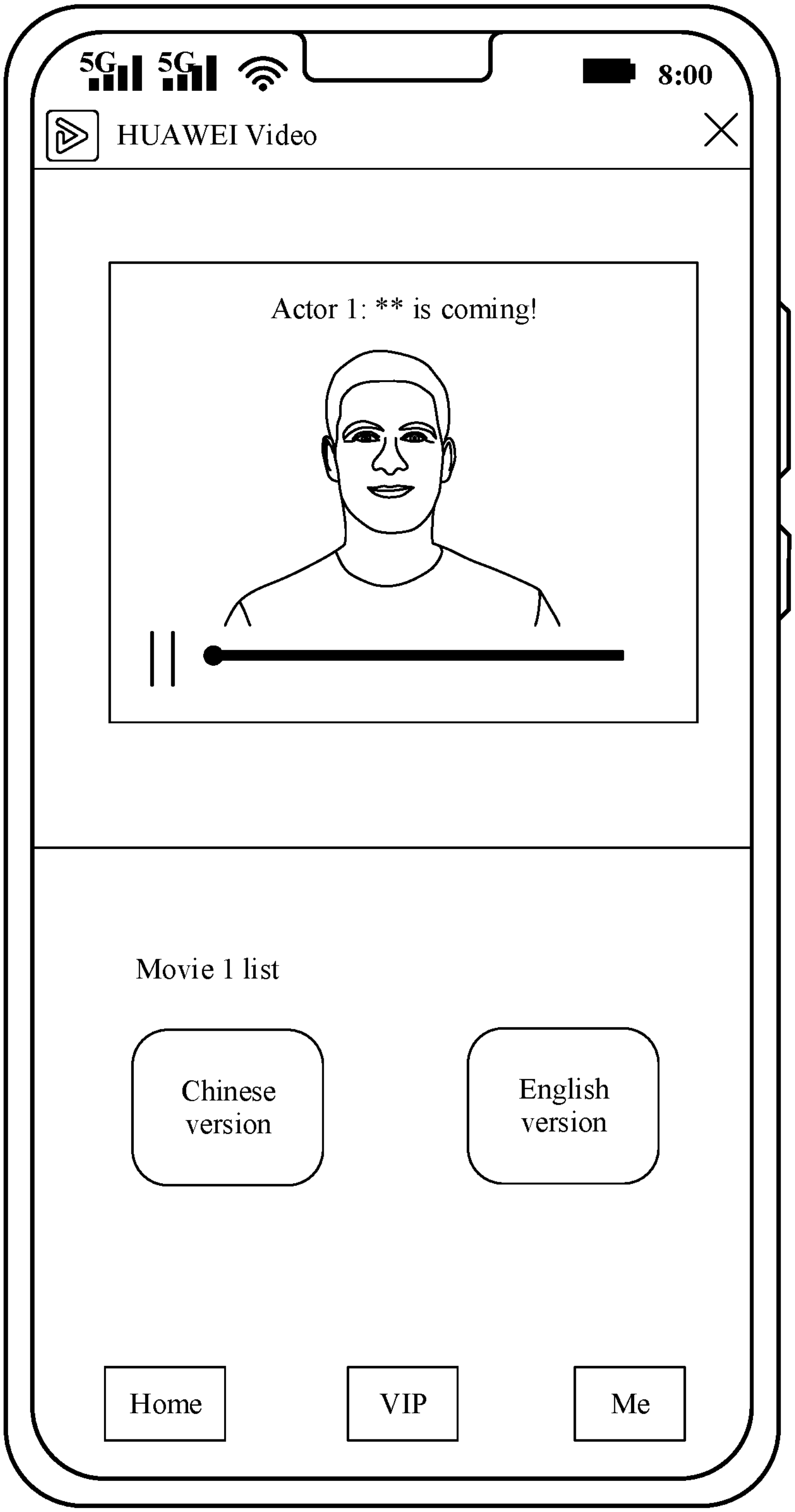

For example, in response to an operation performed by the user on the thumbnail 2000 shown in FIG. 20A (a), the mobile phone 1 may display a playlist shown in FIG. 20B (a). The play mode list may include a play mode 2001 of a default video player of the system, a play mode 2002 of the current APP 1, and a play mode 2003 of another video player like the APP 2 supported by the system. This facilitates user selection. The default video player of the system, the current APP 1 to which the notification message is pushed, and the another video player supported by the system are all applications. In other words, the play mode list includes a plurality of applications for playing the video information. In response to an operation of selecting the play mode 2001 shown in FIG. 20B (a) by the user, the mobile phone 1 plays the video information in the notification message by using an operating system basic capability of the mobile phone 1. In response to an operation of selecting the play mode 2002 shown in FIG. 20B (a) by the user, the mobile phone 1 plays the video information in the notification message by using the APP 1. In response to the operation of selecting the play mode 2002 shown in FIG. 20B (a) by the user, as shown in FIG. 20B(b), the mobile phone 1 starts the APP 1 (Huawei Video), displays a page of the APP 1, and plays the video information in the notification message by using the APP 1 corresponding to the play mode 2001. After starting the APP 1, the mobile phone 1 may automatically start to play the video information, or may start to play the video information after detecting an operation of a play indication of the user. After playing of the video information is completed, the mobile phone 1 may continue to stay in the APP 1, so that the user can play another video or watches a movie: or may return to a previous interface by using a return control, a close control, or the like.

A case in which the mobile phone 1 plays the video information in the notification message by using the APP 2 is similar to the case in which the mobile phone 1 plays the video information in the notification message by using the APP 1. Details are not described.

Descriptions are provided above by using an example in which message push is triggered after the user reserves the movie 1. When the APP 1 pushes the notification message on another occasion, the method provided in the foregoing embodiments may also be used to push the message. For example, in a non-reservation scenario, the APP 1 server may push, to the mobile phone, a notification message corresponding to a to-be-pushed media resource (for example, a movie). The to-be-pushed media resource may correspond to a plurality of pieces of rich media information (for example, voice information of a plurality of associated persons). The APP 1 server may determine, based on a user feature, rich media information corresponding to a favorite associated person of the user, and push the determined rich media information to the user in the notification message.

Descriptions are provided above by using an example in which a message is pushed after the user logs in to the APP 1. When the user does not log in to the APP 1, the method provided in the foregoing embodiments may also be used to push the message. For example, when the user does not log in to the APP 1 shown in FIG. 5A, the APP 1 server may accurately determine, based on a device identifier (for example, an OAID) of the electronic device, target voice information to be pushed to the electronic device corresponding to the device identifier, to push a personalized message. For example, the APP 1 server may accurately determine, based on an area and a location of the electronic device that correspond to the device identifier, or a user feature (for example, user behavior information or a user profile) of a user using the electronic device, the target voice information to be pushed to the electronic device corresponding to the device identifier.

Descriptions are provided above by using an example in which the APP 1 server accurately pushes, to the user, a notification message related to the movie 1. The APP server may also accurately push, to the user based on the user behavior information, the user profile, or the like, a notification message corresponding to a movie type that the user is interested in. The movie type is, for example, a comedy movie, a suspense movie, or a historical movie.

In addition, descriptions are provided above by using an example in which the APP 1 corresponding to the notification message is a video playing APP. The APP 1 may alternatively be an application of another type, and the method provided in embodiments of this application may also be used to accurately push the notification message. In this way, the user may receive a notification message that the user is interested in, and therefore is more willing to open the notification message and start a corresponding APP. For example, a news APP server may accurately push a news notification message to the user based on user behavior information, a user profile, or the like. For example, the user views daily news in a specific news APP. The APP server identifies, based on a watching record of the user, a news type that the user is interested in, for example, sports news+entertainment news. The APP server periodically pushes the latest and hot news of a current day every day. In this case, the APP server selects sports and entertainment notification messages based on an interest point of the user. For another example, the APP server accurately pushes a military notification message, a sports notification message, a health care notification message, or the like based on a preference of the user. The APP server sends notification content of a selected notification message to the user in a form of a voice.

Figure 21:
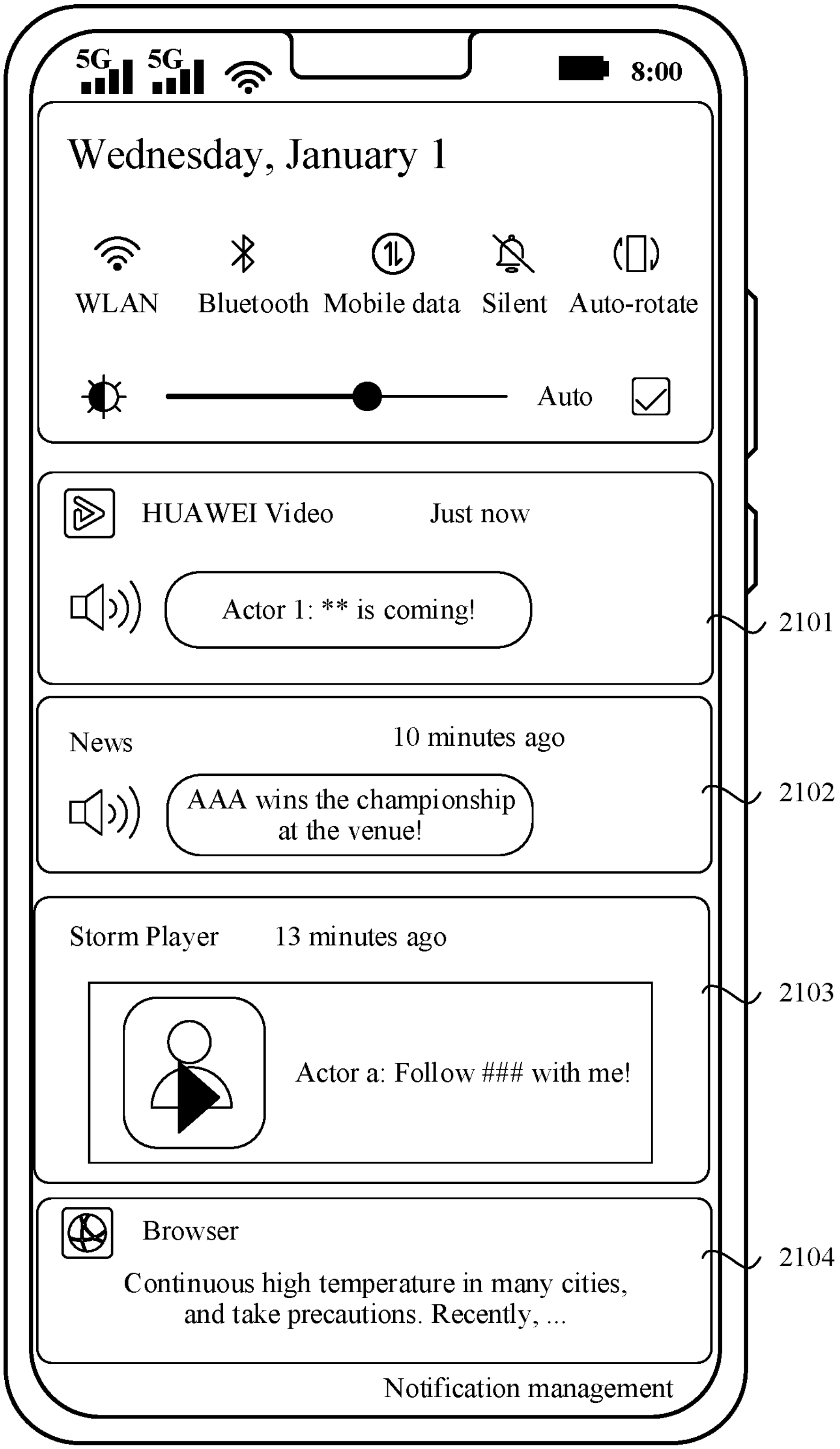
FIG. 21 is a schematic diagram of an interface according to an embodiment of this application.

In an embodiment of this application, the notification message displayed by the mobile phone in the notification panel may be a notification message including the rich media information, or may be a text notification message (similar to the notification message shown in FIG. 1) that does not include the rich media information. In addition, different notification messages may further include different types of rich media information. For example, as shown in FIG. 21, the mobile phone 1 displays notification messages of a plurality of applications to the user in the notification panel on the screen, such as a voice notification message 2101 of a Huawei Video application, a voice notification message 2102 of a News application, a video notification message 2103 of a Storm Player® application, and a text notification message 2104 of a Browser application. The voice notification message 2101 is voice information that is of the actor 1 and that is accurately recommended to the user, and the voice notification message 2102 is a sports notification message accurately recommended to the user.

In some other embodiments of this application, the user may set, on a system setting interface or on a setting interface of an application, a type of a notification message pushed by the application, for example, a voice notification message, a video notification message, an animated image notification message, a text notification message, or another type of notification message.

In some other embodiments of this application, in response to an operation of the user, the mobile phone 1 may switch, to a conventional text notification message, the notification message that includes the rich media information and that is displayed to the user on the screen: or switch between a text notification message, a voice notification message, a video notification message, an animated image notification message, and another type of notification message.

Descriptions are provided below by using an example in which the electronic device is the mobile phone. When the electronic device is a tablet computer or another device, the method described in the foregoing embodiments may still be used to push a message. Details are not described again.

Figure 22:
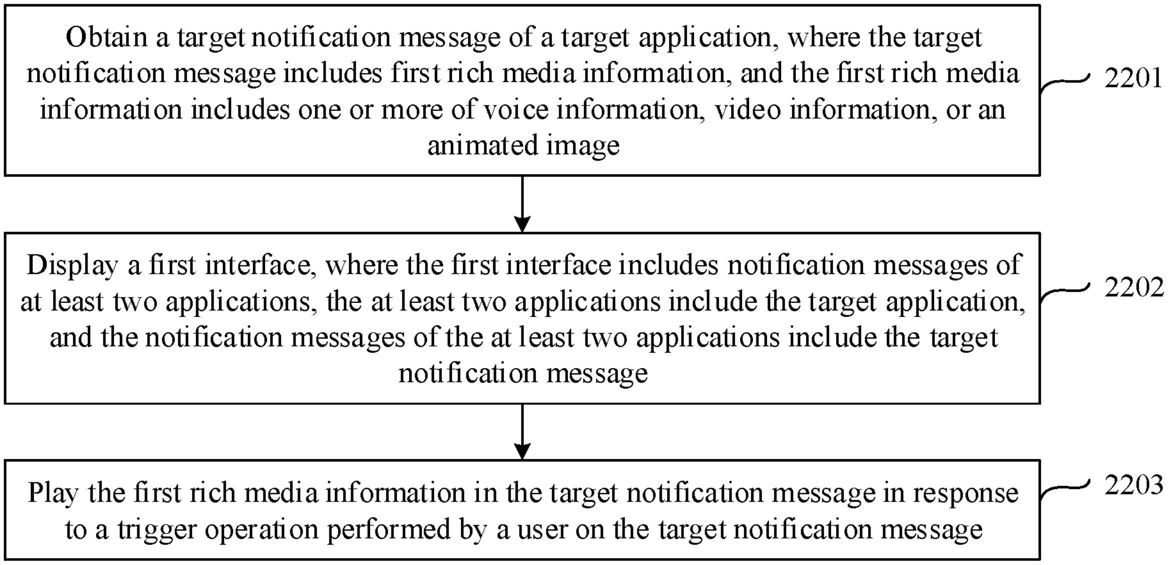
FIG. 22 is a flowchart of processing a notification message according to an embodiment of this application.

With reference to the foregoing embodiments and the corresponding accompanying drawings, another embodiment of this application provides a notification message processing method. The method may be implemented on the electronic device having the structure shown in FIG. 1. As shown in FIG. 22, the method includes the following steps.

2201: An electronic device obtains a target notification message of a target application, where the target notification message includes first rich media information, and the first rich media information includes one or more of voice information, video information, or an animated image.

A server of the target application may forward the target notification message to the electronic device through the push server, and the electronic device may obtain the target notification message of the target application. The target application may be any application like a system application or a third-party application, for example, may be a video playing application, an audio playing application, a music playing application, a news application, a game application, an e-book application, or a financial application. The target notification message includes the first rich media information, and the first rich media information includes one or more of the voice information, the video information, or the animated image.

For example, refer to the foregoing embodiments. The target application is Huawei Video, and the first rich media information includes the voice information.

2202: The electronic device displays a first interface, where the first interface includes notification messages of at least two applications, the at least two applications include the target application, and the notification messages of the at least two applications include the target notification message.

The electronic device may display, to a user on a screen, notification messages that are of a plurality of applications and that include the target notification message of the target application.

For example, the target notification message may be the notification message pushed by Huawei Video shown in FIG. 9(*a*) to FIG. 21, rich media information included in the target notification message is voice information, and the voice information is the voice information of the actor 1.

2203: The electronic device plays the first rich media information in the target notification message in response to a trigger operation performed by the user on the target notification message.

The electronic device may play the first rich media information in the target notification message in response to the trigger operation performed by the user on the target notification message. For example, the trigger operation may be an operation of tapping a notification title in the target notification message by the user, an operation of tapping a play control, an operation of tapping a rich media information identifier (for example, when rich media is voice information, the rich media information identifier is a voice identifier), or the like that is performed by the user.

In this solution, the electronic device can push, to the user, rich media information such as a voice in a notification message pushed by an APP, so that a form and content of the notification message are novel and vivid, and therefore are attractive to the user. After playing the rich media information such as the voice in the notification message, the user is more likely to get interested and starts the APP. This can improve usage of the APP.

It may be understood that, to implement the foregoing functions, the electronic device includes a corresponding hardware and/or software module for performing each function. With reference to algorithm steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, the electronic device may be divided into functional modules according to the foregoing method examples. For example, each functional module may be obtained through division based on each corresponding function, or two or more functions may be integrated into one module. The integrated module may be implemented in a form of hardware. It should be noted that, in embodiments, division into the modules is an example, is merely logical function division, and may be other division during actual implementation.

When each function module is obtained through division based on each corresponding function, in an example, the electronic device may include an obtaining unit, a display unit, a play unit, a processing unit, and the like. It should be noted that all related content of the steps in the foregoing method embodiments may be cited in function descriptions of corresponding functional modules. Details are not described herein again.

Figure 23:
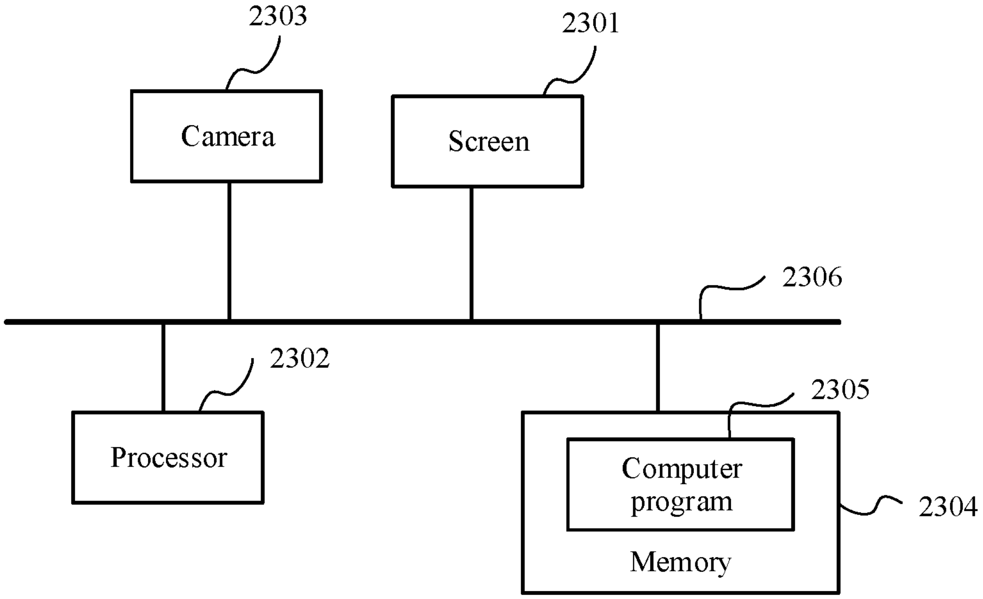
FIG. 23 is a schematic diagram of a hardware structure of another electronic device according to an embodiment of this application.

An embodiment of this application further provides an electronic device. As shown in FIG. 23, the electronic device includes a screen 2301, one or more processors 2302, a memory 2303, and one or more computer programs 2304. The foregoing components may be connected through one or more communication buses 2305. The one or more computer programs 2304 are stored in the memory 2303, and are configured to be executed by the one or more processors 2302. The one or more computer programs 2304 include instructions, and the instructions may be used to perform steps in the foregoing embodiments. All related content of the steps in the foregoing method embodiments may be cited in function descriptions of corresponding physical components. Details are not described herein again.

For example, the processor 2302 may be specifically the processor 110 shown in FIG. 3, the memory 2303 may be specifically the internal memory 121 shown in FIG. 3, and the screen 2301 may be specifically the display 194 shown in FIG. 3.

An embodiment of this application further provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps to implement the notification message processing method in the foregoing embodiments.

An embodiment of this application further provides a server, including one or more processors and one or more memories. The one or more memories are coupled to the one or more processors. The one or more memories are configured to store computer program code, and the computer program code includes computer instructions. When the one or more processors execute the computer instructions, the server is enabled to perform the foregoing related method steps to implement the notification message processing method in the foregoing embodiments.

An embodiment of this application further provides a computer-readable storage medium. The computer-readable storage medium stores computer instructions. When the computer instructions are run on an electronic device or a server, the electronic device or the server is enabled to perform the foregoing related method steps to implement the notification message processing method in the foregoing embodiments.

An embodiment of this application further provides a computer program product. When the computer program product runs on a computer, the computer is enabled to perform the foregoing related steps to implement the notification message processing method performed by the electronic device in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, so that the apparatus performs the notification message processing method performed by the electronic device or the server in the foregoing method embodiments.

The electronic device, the server, the computer-readable storage medium, the computer program product, or the apparatus provided in embodiments is configured to perform the corresponding method provided above. Therefore, for beneficial effects that can be achieved, refer to the beneficial effects of the corresponding methods provided above. Details are not described herein again.

The foregoing descriptions about implementations allow a person skilled in the art to understand that, for a purpose of convenient and brief description, division of the foregoing functional modules is taken as an example for illustration. During actual application, the foregoing functions may be allocated to different functional modules for implementation based on a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on an actual requirement to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A notification message processing method, applied to an electronic device, wherein the method comprises:

obtaining, by the electronic device, a target notification message of a target application, wherein the target notification message of a target application is generated by a server of the target application, wherein the target notification message comprises first rich media information, and the first rich media information comprises one or more of voice information, video information, or an animated image;

displaying, by the electronic device, a first interface, wherein the first interface comprises notification messages of at least two applications, the at least two applications comprise the target application, and the notification messages of the at least two applications comprise the target notification message; and playing, by the electronic device, the first rich media information in the target notification message in response to a trigger operation performed by a user on the target notification message, wherein the first interface is a notification panel, and the target notification message comprises at least one of a save control or a share control.

2. The method according to claim 1, wherein on the first interface, the target notification message comprises a prompt identifier, and the prompt identifier is for prompting that the target notification message comprises rich media information.

3. The method according to claim 2, wherein the playing, by the electronic device, the first rich media information in the target notification message in response to the trigger operation performed by the user on the target notification message comprises:

playing, by the electronic device, the first rich media information in the target notification message in response to an operation of tapping the prompt identifier in the target notification message by the user.

4. The method according to claim 2, wherein the prompt identifier on the first interface is in a first state, and the playing, by the electronic device, the first rich media information in the target notification message comprises:

displaying, by the electronic device, a second interface, and playing the first rich media information in the target notification message, wherein the second interface comprises the prompt identifier, the prompt identifier on the second interface is in a second state, and the second state is different from the first state.

5. The method according to claim 2, wherein the playing, by the electronic device, the first rich media information in the target notification message in response to a trigger operation performed by a user on the target notification message comprises:

displaying, by the electronic device, a third interface in response to the trigger operation performed by the user on the target notification message, wherein the third interface is an application interface of the target application; and playing, by the electronic device, the first rich media information in the target notification message by using the target application.

6. The method according to claim 5, wherein the target notification message comprises a notification title and prompt information of the target application, and the prompt information of the target application comprises an icon and/or a name of the target application; and the displaying, by the electronic device, the third interface in response to the trigger operation performed by the user on the target notification message, wherein the third interface is an application interface of the target application comprises:

displaying, by the electronic device, the third interface in response to an operation of tapping the notification title or the prompt information of the target application in the target notification message by the user, wherein the third interface is the application interface of the target application.

7. The method according to claim 6, wherein the target notification message comprises the notification title, and the displaying, by the electronic device, the third interface in response to the trigger operation performed by the user on the target notification message, wherein the third interface is an application interface of the target application comprises:

displaying, by the electronic device, the third interface in response to an operation of touching and holding the notification title in the target notification message by the user, wherein the third interface is the application interface of the target application.

8. The method according to claim 1, wherein the target notification message comprises a play control, and the playing, by the electronic device, the first rich media information in the target notification message in response to the trigger operation performed by the user on the target notification message comprises:

playing, by the electronic device, the first rich media information in the target notification message in response to an operation of tapping the play control in the target notification message by the user.

9. The method according to claim 1, wherein the first rich media information in the target notification message is determined by a server of the target application based on a user feature corresponding to the electronic device, and the user feature comprises user behavior information or a user profile.

10. The method according to claim 9, wherein the first rich media information in the target notification message corresponds to a target media resource, the target media resource corresponds to a plurality of pieces of rich media information, and the first rich media information is one piece of rich media information determined, based on the user feature corresponding to the electronic device, by the server from the plurality of pieces of rich media information corresponding to the target media resource.

11. The method according to claim 10, wherein the target media resource is a media resource reserved by the user, the target media resource corresponds to rich media information of a plurality of associated persons, and wherein the first rich media information is rich media information that is of a favorite associated person of the user corresponding to the electronic device and that is determined by the server from the plurality of pieces of rich media information corresponding to the target media resource, based on the user feature corresponding to the electronic device.

12. The method according to claim 10, wherein the target notification message further comprises a switching control, and the method further comprises:

playing, by the electronic device in response to an operation performed by the user on the switching control in the target notification message, second rich media information corresponding to the target media resource.

13. The method according to claim 1, wherein on the first interface, the target notification message comprises first prompt information, and the first prompt information is for prompting play duration of the first rich media information comprised in the target notification message.

14. The method according to claim 1, wherein the method further comprises:

displaying, by the electronic device, second prompt information, wherein the second prompt information is for prompting play progress of the first rich media information.

15. The method according to claim 1, wherein the playing, by the electronic device, the first rich media information in the target notification message in response to the trigger operation performed by the user on the target notification message comprises:

displaying, by the electronic device, a play mode list in response to the trigger operation performed by the user on the target notification message, wherein the play mode list comprises at least one application for playing the rich media information; and playing, by the electronic device in response to an operation of selecting an application from the play mode list by the user, the first rich media information in the target notification message by using the selected application.

16. The method according to claim 1, wherein the electronic device stores a correspondence that is preset by the user and that is between an application and a rich media information type, the rich media information type comprises a voice information type, a video information type, or an animated image type, and a first rich media information type is consistent with a rich media information type corresponding to the target application in the correspondence.

17. The method according to claim 1, wherein the target notification message that is of the target application and that is obtained by the electronic device comprises a resource identifier of the first rich media information, and the playing, by the electronic device, the first rich media information in the target notification message comprises:

obtaining, by the electronic device, data content of the first rich media information based on the resource identifier of the first rich media information in the target notification message; and playing, by the electronic device, the first rich media information based on the data content of the first rich media information.

18. A notification message processing method, applied to a server, wherein the method comprises:

generating, by the server, a target notification message of a target application, wherein the target notification message comprises first rich media information, and the first rich media information comprises one or more of voice information, video information, or an animated image; and pushing, by the server, the target notification message to an electronic device, wherein the target notification message is displayed in a notification panel of the electronic device, and the target notification message comprises at least one of a save control or a share control.

19. The method according to claim 18, wherein the first rich media information in the target notification message corresponds to a target media resource, and the method further comprises:

determining, by the server based on a user feature corresponding to the electronic device, the first rich media information from a plurality of pieces of rich media information corresponding to the target media resource.

20. An electronic device, comprising:

a screen, configured to display an interface;

one or more processors;

a memory storing one or more computer programs which comprise instructions, and when the instructions are executed by the one or more processors of the electronic device, the electronic device is enabled to perform the following:

obtaining, a target notification message of a target application, wherein the target notification message of a target application is generated by a server of the target application, wherein the target notification message comprises first rich media information, and the first rich media information comprises one or more of voice information, video information, or an animated image;

displaying, a first interface, wherein the first interface comprises notification messages of at least two applications, the at least two applications comprise the target application, and the notification messages of the at least two applications comprise the target notification message; and playing, the first rich media information in the target notification message in response to a trigger operation performed by a user on the target notification message, wherein the first interface is a notification panel, and the target notification message comprises at least one of a save control or a share control.

* * * * *